US012772169B2

(12) United States Patent
Ahn et al.

(10) Patent No.: US 12,772,169 B2
(45) Date of Patent: *Oct. 20, 2026

(54) WIRELESS COMMUNICATION METHOD AND WIRELESS COMMUNICATION TERMINAL USING WAKE-UP RADIO

(71) Applicant: WILUS INSTITUTE OF STANDARDS AND TECHNOLOGY INC., Gyeonggi-do (KR)

(72) Inventors: Woojin Ahn, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 203 days.

This patent is subject to a terminal disclaimer.

(21) Appl. No.: 18/769,756

(22) Filed: Jul. 11, 2024

(65) Prior Publication Data

US 2024/0365233 A1 Oct. 31, 2024

Related U.S. Application Data

(63) Continuation of application No. 18/233,868, filed on Aug. 14, 2023, now Pat. No. 12,041,546, which is a (Continued)

(30) Foreign Application Priority Data

Oct. 27, 2017 (KR) ........................ 10-2017-0141206
Mar. 22, 2018 (KR) ........................ 10-2018-0033252
Sep. 7, 2018 (KR) ........................ 10-2018-0107278

(51) Int. Cl.
*H04W 52/02* (2009.01)
*H04W 12/06* (2021.01)
(Continued)

(52) U.S. Cl.
CPC ....... *H04W 52/0229* (2013.01); *H04W 12/06* (2013.01); *H04W 52/0235* (2013.01);
(Continued)

(58) Field of Classification Search
CPC ............. H04W 52/0229; H04W 12/06; H04W 52/0235; H04W 74/0808; H04W 80/02;
(Continued)

(56) References Cited

U.S. PATENT DOCUMENTS 9,351,249 B2 * 5/2016 Somasundaram .... H04W 36/04
10,477,479 B2 11/2019 Adachi et al.
(Continued)

FOREIGN PATENT DOCUMENTS

WO 2005/069806 8/2005
WO 2018/139432 8/2018
(Continued)

OTHER PUBLICATIONS

Deng, Der-Jiunn, et al. "IEEE 802.11 ba wake-up radio: Performance evaluation and practical designs." IEEE Access 8 (2020): 141547-141557. (Year: 2020).*
(Continued)

*Primary Examiner* — Sharad Rampuria
(74) *Attorney, Agent, or Firm* — WOMBLE BOND DICKINSON (US) LLP

(57) ABSTRACT

Disclosed is a wireless communication terminal to communicate wirelessly. The wireless communication terminal includes: a first wireless transceiver configured to transmit and receive signals modulated by a first modulation method; a second wireless receiver configured to receive a signal modulated by a second modulation method different from the first modulation method; and a processor. The processor is configured to sequentially receive a plurality of fields of a wake-up radio (WUR) frame included in a WUR physical
(Continued)

layer processing data unit (PPDU) transmitted by the second modulation method, and when a predetermined condition for the plurality of fields is satisfied, stop receiving the WUR frame without determining whether values of the plurality of fields are valid.

13 Claims, 27 Drawing Sheets

Related U.S. Application Data continuation of application No. 17/535,643, filed on Nov. 25, 2021, now Pat. No. 11,770,770, which is a continuation of application No. 16/759,320, filed as application No. PCT/KR2018/012948 on Oct. 29, 2018, now Pat. No. 11,218,966.

(51) Int. Cl.
*H04W 74/0808* (2024.01)
*H04W 80/02* (2009.01)
*H04W 84/12* (2009.01)

(52) U.S. Cl.
CPC ....... *H04W 74/0808* (2013.01); *H04W 80/02* (2013.01); *H04W 84/12* (2013.01)

(58) Field of Classification Search
CPC ..... H04W 84/12; H04W 12/69; H04W 48/08; H04W 48/16; H04W 52/02; H04W 52/0216; H04W 52/0225; H04W 52/0212; H04W 52/46; Y02D 30/70; H04B 10/293; H04B 10/294; H04B 10/296; H04B 10/564; H04J 14/0221
See application file for complete search history.

(56) References Cited

U.S. PATENT DOCUMENTS

| | | | | |
|---|---|---|---|---|
| 10,856,228 | B1 | 12/2020 | Chu et al. | |
| 11,438,840 | B2 | 9/2022 | Ahn et al. | |
| 11,576,123 | B2 | 2/2023 | Kristem et al. | |
| 11,800,451 | B2 | 10/2023 | Ahn et al. | |
| 2008/0049654 | A1 | 2/2008 | Otal et al. | |
| 2008/0181156 | A1 | 7/2008 | Ecclesine | |
| 2008/0310391 | A1 | 12/2008 | Schneidma et al. | |
| 2016/0007288 | A1 | 1/2016 | Zija et al. | |
| 2016/0057703 | A1* | 2/2016 | Benoit | H04W 56/00 370/311 |
| 2016/0128024 | A1 | 5/2016 | Frederiks et al. | |
| 2016/0353465 | A1 | 12/2016 | Vrzic et al. | |
| 2017/0026151 | A1 | 1/2017 | Adachi | |
| 2017/0134943 | A1 | 5/2017 | Min et al. | |
| 2018/0317172 | A1 | 11/2018 | Lepp et al. | |
| 2019/0007904 | A1 | 1/2019 | Asterjadhi et al. | |
| 2019/0116554 | A1 | 4/2019 | Kristem et al. | |
| 2019/0174413 | A1 | 6/2019 | Huang et al. | |
| 2020/0037251 | A1 | 1/2020 | Du et al. | |
| 2020/0178171 | A1 | 6/2020 | Lou et al. | |
| 2020/0187120 | A1* | 6/2020 | Alanen | H04W 52/0212 |
| 2020/0288397 | A1 | 9/2020 | Ahn et al. | |
| 2020/0367157 | A1 | 11/2020 | Kim et al. | |
| 2022/0110056 | A1 | 4/2022 | Ahn et al. | |
| 2022/0232473 | A1 | 7/2022 | Son et al. | |
| 2023/0403649 | A1 | 12/2023 | Ahn et al. | |

FOREIGN PATENT DOCUMENTS

| | | |
|---|---|---|
| WO | 2018/143580 | 8/2018 |
| WO | 2018/155835 | 8/2018 |
| WO | 2019/035682 | 2/2019 |
| WO | 2019/139432 | 7/2019 |

OTHER PUBLICATIONS

Notice of Allowance dated Oct. 15, 2024 for U.S. Appl. No. 18/219,617.
Notice of Allowance dated Dec. 5, 2024 for Korean Patent Application No. 10-2020-7012499 and its English translation provided by Applicant's foreign counsel.
Office Action (1st) dated Jul. 14, 2025 for Korean Patent Application No. 10-2020-7030181 and its English translation provided by Applicant's foreign counsel.
Alfred Asterjadhi et al.: "Considerations on VL WUR frames", doc.: IEEE 802.11-18/0420r0, Mar. 5, 2018, slides 1-9.
Lei Huang et al.: "Discussion on Group ID Structure", doc.: IEEE 802.11-18/0472r3, Mar. 8, 2018, slides 1-7.
International Search Report for PCT/KR2018/012948 mailed on Feb. 13, 2019 and its English translation from WIPO (now published as WO2019/083346).
Written Opinion of the International Searching Authority for PCT/KR2018/012948 mailed on Feb. 13, 2019 and its English machine translation by Google Translate (now published as WO2019/083346).
Sonn, John et al., "WUR Signaling Field", IEEE 802.11-17/0049r0, Jan. 14, 2017. See slides 3, 6.
Lim, Dong Guk et al. "Consideration on WUR Frame Structure," IEEE 802.11-17/0036r2, Jan. 17, 2017. See slides 2, 8, 12.
International Preliminary Report on Patentability (Chapter I) for PCT/KR2018/012948 issued on Apr. 28, 2020 and its English translation from WIPO.
International Search Report for PCT/KR2019/003409 mailed on Jul. 11, 2019 and its English translation from WIPO.
Written Opinion of the International Searching Authority for PCT/KR2019/003409 mailed on Jul. 11, 2019 and its English translation from WIPO.
International Preliminary Report on Patentability for PCT/KR2019/003409 issued on Sep. 22, 2020 and its English translation from WIPO.
Alfred Asterjadhi et al.: "Considerations on VL WUR frames", IEEE 802.11-18/0420r0, Mar. 5, 2018, slides 1-9.
Lei Huang et al..: "Discussion on Group ID Structure", IEEE 802.11-18/0472r3, Mar. 8, 2018, slides 1-7.
Woojin Ahn et al.: "Discussion on WUR identifiers", IEEE 802.11-18/0507r2, Mar. 14, 2018, slides 1-8.
Suhwook Kim et al.: "Data transmission detail in WUR mode", IEEE 802.11-18/0154r0, Jan. 14, 2018, slides 1-21.
Jeongki Kim et al.: "Clarification for Variable-length WUR frame", IEEE 802.11-17/0104rl, Jan. 18, 2018, slides 1-6.
Office Action dated May 31, 2021 for Indian Patent Application No. 202027018219.
Liu Yang et al.: "Energy Efficiency and Resource Allocation of IEEE 802.15.6 IR-UWB WGANs: Current State-of-the-Art and Future Directions", 2017 Information Theory and Applications Workshop (ITA). IEEE, 2017. (Year of 2017).
Williams, Jennifer M. et al.: "Weaving the wireless web: toward a low- power, dense wireless sensor network for the industrial IoT", IEEE Microwave Magazine 18.7 (Nov./Dec 2017); pp. 40-63.
Office Action dated Nov. 12, 2021 for U.S. Appl. No. 17/040,188.
Notice of Allowance dated Oct. 15, 2021 for U.S. Appl. No. 16/759,320 (now published as US 2020/0288397).
Office Action dated Jun. 23, 2021 for U.S. Appl. No. 16/759,320 (now published as US 2020/0288397).
Notice of Allowance dated Mar. 30, 2023 for U.S. Appl. No. 17/871,891.
Elena Lopez-Aguilera et al.: "Design and Implementation of a Wake-Up Radio Receiver for Fast 250 kb/s Bit Rate", IEEE 802.11ba Wireless Communications Letters, vol. 8, No. 6, Dec 2019, pp. 1-4.
Corrected Notice of Allowance dated Dec. 3, 2021 for U.S. Appl. No. 16/759,320.
Notice of Allowance dated Apr. 20, 2022 for U.S. Appl. No. 17/040,188.
Office Action dated Dec. 21, 2022 for U.S. Appl. No. 17/871,891.
Corrected Notice of Allowance dated Jun. 29, 2023 for U.S. Appl. No. 17/535,643 (now published as US 2022/0110056).

(56) References Cited

OTHER PUBLICATIONS

Notice of Allowance dated May 11, 2023 for U.S. Appl. No. 17/535,643 (now published as US 2022/0110056).
Office Action dated May 9, 2024 for U.S. Appl. No. 18/219,617.
Office Action dated Apr. 25, 2024 for Korean Patent Application No. 10-2020-7012499 and its English translation provided by Applicant's foreign counsel.
Deng, Der-Jiunn, et al.: "IEEE 802.11ba Wake-Up Radio: Performance Evaluation and Practical Designs", (Year: 2020).
Notice of Hearing dated Nov. 13, 2023 for Indian Patent Application No. 202027018219.
Notice of Allowance dated Mar. 4, 2024 for U.S. Appl. No. 18/233,868 (now published as US 2023/0403649).
Office Action (2nd) dated Apr. 28, 2026 for Korean Patent Application No. 10-2020-7030181 and its English translation provided by Applicant's foreign counsel.

* cited by examiner

WIRELESS COMMUNICATION METHOD AND WIRELESS COMMUNICATION TERMINAL USING WAKE-UP RADIO

CROSS-REFERENCE TO RELATED APPLICATIONS

This application is a continuation of U.S. patent application Ser. No. 18/233,868 filed on Aug. 14, 2023, which is a continuation of U.S. patent application Ser. No. 17/535,643 filed on Nov. 25, 2021, issued as U.S. Pat. No. 11,770,770 on Sep. 26, 2023, which is a continuation of U.S. patent application Ser. No. 16/759,320 filed on Apr. 24, 2020, issued as U.S. Pat. No. 11,218,966 on Jan. 4, 2022, which is the U.S. National Stage of International Patent Application No. PCT/KR2018/012948 filed on Oct. 29, 2018, which claims the priority to Korean Patent Application No. 10-2017-0141206 filed in the Korean Intellectual Property Office on Oct. 27, 2017, Korean Patent Application No. 10-2018-0033252 filed in the Korean Intellectual Property Office on Mar. 22, 2018, and Korean Patent Application No. 10-2018-0107278 filed in the Korean Intellectual Property Office on Sep. 7, 2018, the entire contents of which are incorporated herein by reference.

TECHNICAL FIELD

The present invention relates to a wireless communication method and a wireless communication terminal using a wake-up radio.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial **11*ac*** chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHZ, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Particularly, as a mobile device including an embedded battery as a power source is spread and the use time of the mobile device becomes important, the energy efficiency of wireless communication terminals is also becoming important. Therefore, there is a need for a wireless communication method capable of increasing the energy efficiency of a wireless communication terminal. In relation to the main method used to increase energy efficiency in a wireless LAN, the wireless communication terminal may enter the power saving mode when the wireless communication terminal is not used. However, since the wireless communication terminal entering the power save mode does not perform wireless communication, wireless communication between the wireless communication terminal and the external device may be restricted. Also, in order to receive a wireless signal from an external device to the wireless communication terminal, the wireless communication terminal may have to periodically stop the power save mode. Accordingly, suggested is a method of a wireless communication terminal to use a separate wake-up radio that triggers the interruption of the power save mode. When the wireless communication terminal uses the wake-up radio, the wireless communication terminal includes a wake-up radio receiver for receiving a wake-up radio at a low power. In the power save mode, the wireless communication terminal may receive the wake-up radio through the wake-up radio receiver.

DISCLOSURE

Technical Problem

An embodiment of the present invention is to provide a wireless communication terminal using a wake-up radio.

Technical Solution

A wireless communication terminal to communicate wirelessly according to an embodiment of the present invention includes: a first wireless transceiver configured to transmit and receive signals modulated by a first modulation method; a second wireless receiver configured to receive a signal modulated by a second modulation method different from the first modulation method; and a processor. The processor is configured to sequentially receive a plurality of fields of a wake-up radio (WUR) frame included in a WUR physical layer processing data unit (PPDU) transmitted by the second modulation method, and when a predetermined condition for the plurality of fields is satisfied, stop receiving the WUR frame without determining whether values of the plurality of fields are valid.

The predetermined condition may include a case where the wireless communication terminal is not an intended recipient of the WUR frame.

The processor may be configured to determine whether the wireless communication terminal is not the intended recipient of the WUR frame based on whether the WUR frame does not indicate an identifier of the wireless communication terminal as the recipient of the WUR frame.

The processor may be configured to determine whether the wireless communication terminal is not the intended recipient of the WUR frame based on whether the WUR frame does not indicate an identifier of a group including the wireless communication terminal as the recipient of the WUR frame.

The plurality of fields of the WUR frame may include a plurality of reception terminal fields indicating a wireless communication terminal to receive the WUR frame, and the plurality of reception terminal fields may be located in the WUR frame based on the order of the size of the value of the identifier of the wireless communication terminal indicated by each of the plurality of reception terminal fields. The processor may be configured to compare the value of the received reception terminal field with the value of the identifier of the wireless communication terminal and determine whether the wireless communication terminal is not the intended recipient of the WUR frame based on a result of the comparison.

When it is necessary to determine whether any one of the plurality of fields is valid even if the wireless communication terminal is not the intended recipient of the WUR frame, the processor may be configured not to stop receiving the WUR frame.

The predetermined condition may include a case where the wireless communication terminal does not support the reception of the WUR frame.

When the WUR frame has a length not supported by the wireless communication terminal, the processor may be configured to determine that the wireless communication terminal does not support the reception of the WUR frame.

When the WUR frame has a length not supported by the wireless communication terminal, the processor may be configured to determine that the wireless communication terminal does not support the reception of the WUR frame.

When the WUR frame is a type not supported by the wireless communication terminal, the processor may be configured to determine that the wireless communication terminal does not support the reception of the WUR frame.

When the WUR frame indicates a protocol not supported by the wireless communication terminal, the processor may be configured to determine that the wireless communication terminal does not support the reception of the WUR frame.

When a predetermined condition for the plurality of fields is satisfied, the processor be configured to stop receiving the WUR frame without determining whether values of the plurality of fields of the WUR frame are valid through a frame check sequence (FCS) value generated based on the values of the plurality of fields.

The processor may be configured to stop receiving the radio signal modulated according to the second modulation method, and stop receiving the WUR frame by transmitting a command for requesting to restart clear channel assessment (CCA) from a medium access control (MAC) layer to a physical layer.

A method of operating a wireless communication terminal for wirelessly transmitting and receiving a signal modulated by a first modulation method, and receiving a signal modulated by a second modulation method different from the first modulation method according to an embodiment of the present invention includes: sequentially receiving a plurality of fields of a wake-up radio (WUR) frame included in a WUR physical layer processing data unit (PPDU) transmitted by the second modulation method, and when a predetermined condition for the plurality of fields is satisfied, stopping receiving the WUR frame without determining whether values of the plurality of fields are valid.

The predetermined condition may include a case where the wireless communication terminal is not an intended recipient of the WUR frame.

The stopping the receiving the WUR frame may include determining whether the wireless communication terminal is not the intended recipient of the WUR frame based on whether the WUR frame does not indicate an identifier of the wireless communication terminal as the recipient of the WUR frame.

The plurality of fields of the WUR frame may include a plurality of reception terminal fields indicating a wireless communication terminal to receive the WUR frame, and the plurality of reception terminal fields may be located in the WUR frame based on the order of the size of the value of the identifier of the wireless communication terminal indicated by each of the plurality of reception terminal fields. The stopping the receiving the WUR frame may include comparing the value of the received reception terminal field with the value of the identifier of the wireless communication terminal and determining whether the wireless communication terminal is not the intended recipient of the WUR frame based on a result of the comparison.

The stopping the receiving the WUR frame may include determining whether the wireless communication terminal is not the intended recipient of the WUR frame based on whether the WUR frame does not indicate an identifier of a group including the wireless communication terminal as the recipient of the WUR frame.

The stopping the receiving the WUR frame may include not stopping receiving the WUR frame when it is necessary to determine whether any one of the plurality of fields is valid even if the wireless communication terminal is not the intended recipient of the WUR frame.

The predetermined condition may include a case where the wireless communication terminal does not support the reception of the WUR frame.

The stopping the receiving the WUR frame may include when the WUR frame has a length not supported by the wireless communication terminal, determining that the wireless communication terminal does not support the reception of the WUR frame.

The stopping the receiving the WUR frame may include when the WUR frame has a length not supported by the wireless communication terminal, determining that the wireless communication terminal does not support the reception of the WUR frame.

Advantageous Effects

An embodiment of the present invention provides a wireless communication method using a wake-up radio and a wireless communication terminal using the same.

MODE FOR CARRYING OUT THE INVENTION

Figure 1:
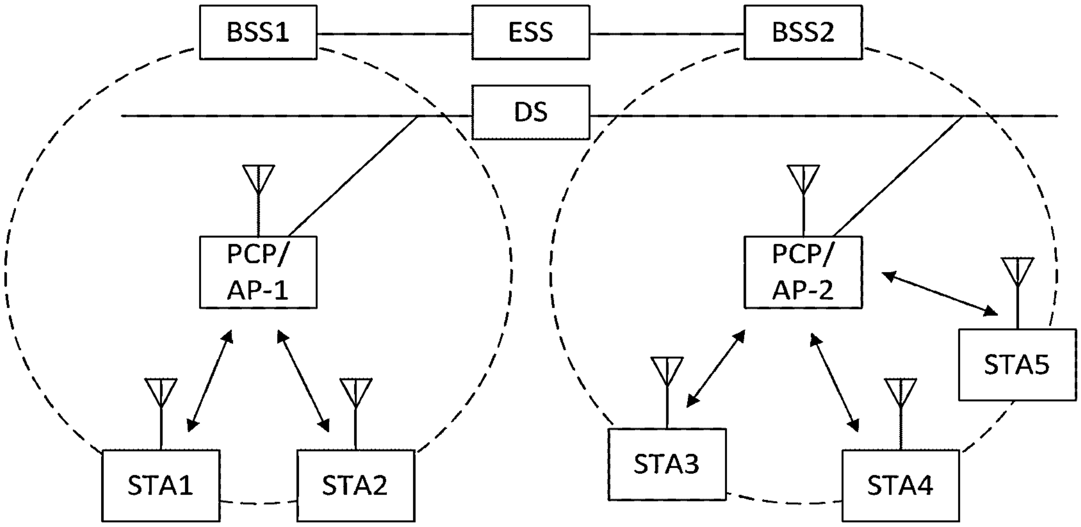
FIG. 1 shows a wireless LAN system according to an embodiment of the present disclosure.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Also, when a part "includes" a component, this means that, unless specifically stated otherwise, it may further include other components rather than excluding other components.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
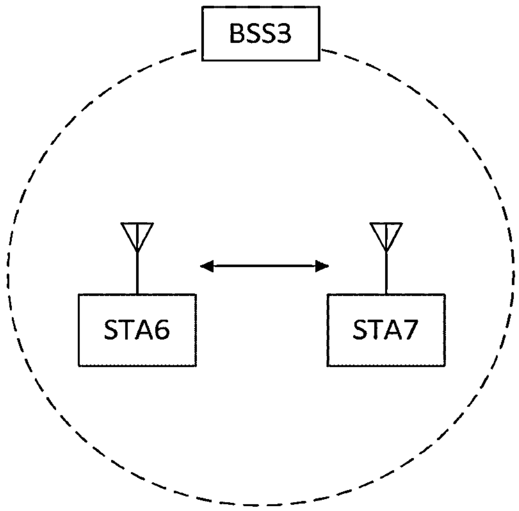
FIG. 2 shows a wireless LAN system according to another embodiment of the present disclosure.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
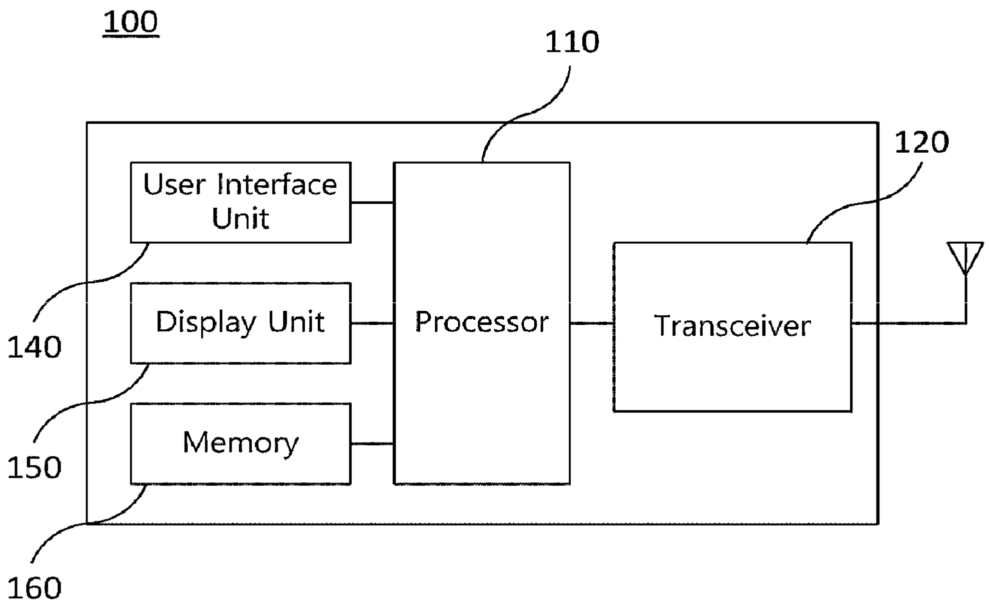
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHZ, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
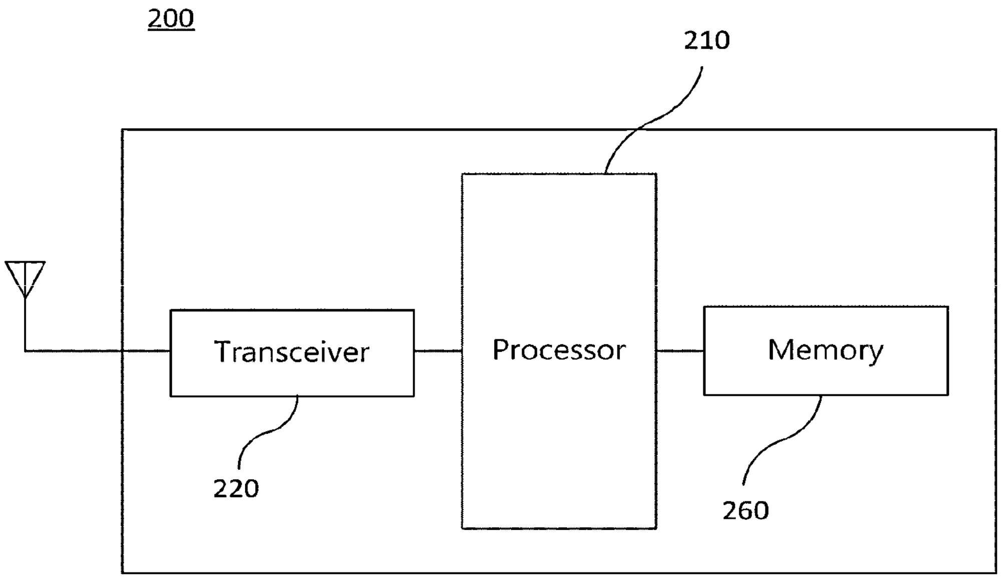
FIG. 4 shows a block diagram illustrating a configuration of an access point according to an embodiment of the present disclosure.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHZ, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
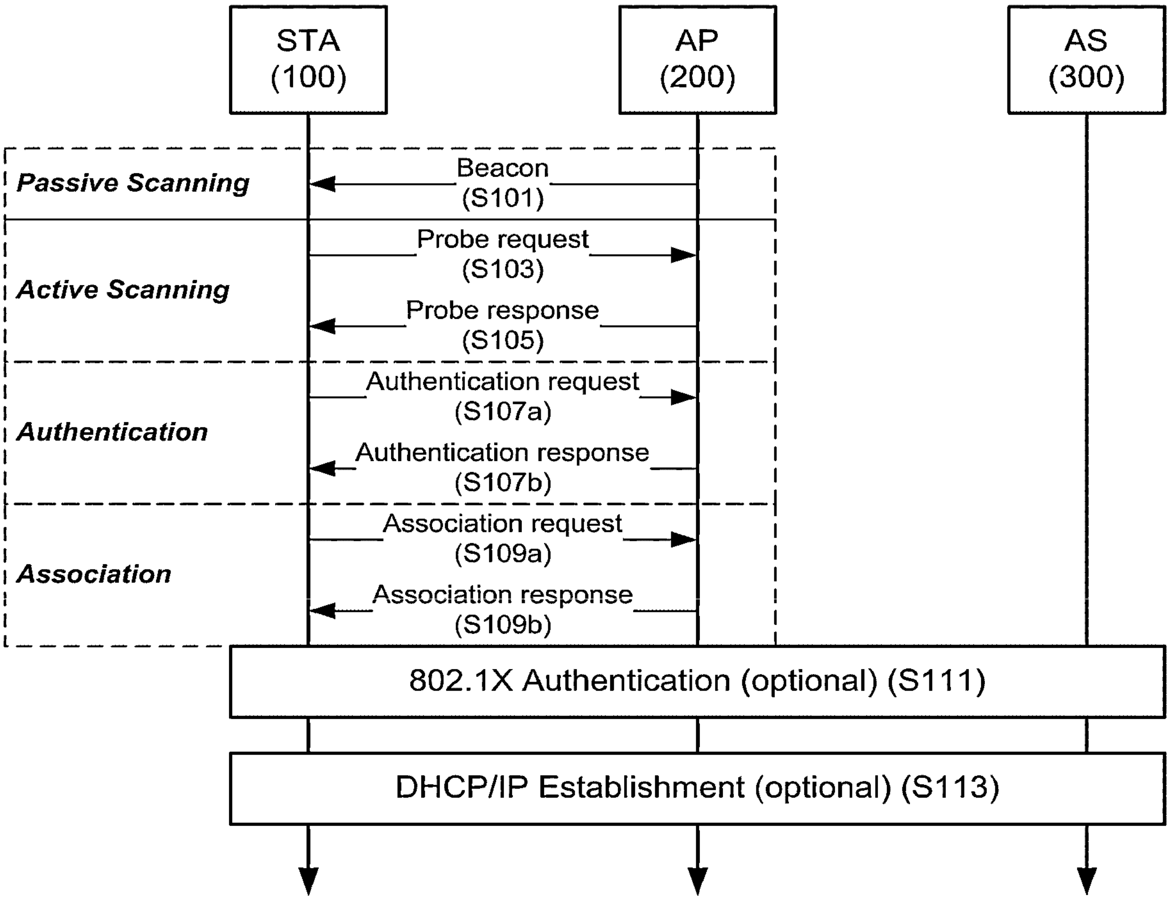
FIG. 5 shows a process that a station sets an access point and a link according to an embodiment of the present disclosure.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

In the doze state, the wireless communication terminal may stop transmitting and receiving a wireless LAN radio and receive a wake-up radio (WUR) to increase energy efficiency. In this case, the magnitude of the power used for the wake-up radio transmission and reception may be smaller than the magnitude of the power used for the wireless LAN signal transmission. A general wireless LAN radio distinguished from the WUR may be referred to as a primary connectivity radio (PCR). A typical wireless LAN may indicate a radio capable of transmitting and receiving a 20 MHz non-high throughput (HT) physical layer protocol data unit (PPDU) defined in IEEE 802.11. In addition, the wireless communication terminal may enter a PCR doze state that blocks power supply to some functions including a PCR transmission/reception function. In the PCR doze state, supplying the power blocked by the wireless communication terminal again is referred to as PCR wake-up. Also, a state in which PCR transmission and reception can be performed is referred to as a PCR awake state. The wireless communication terminal may stop the PCR doze state and enter the PCR awake state to receive the PCR signal from an external device. In this case, the wireless communication terminal may receive the WUR signal and wake-up in the PCR doze state. This power save operation is referred to as a WUR-based power save operation. For WUR-based power save operation, the wireless communication terminal may include a wake-up receiver (hereinafter referred to as "WURx") that operates at a lower power than the PCR transceiver. In addition, when the wireless communication terminal needs to transmit a WUR signal, the wireless communication terminal may include a wake-up transmitter. Through the WUR-based power save operation, the wireless communication terminal can reduce unnecessary wake-up operation. In addition, when WUR is used, the time during which the wireless communication terminal stays in the PCR dose state may be increased.

A part of the WUR signal may be transmitted in a different modulation method than the modulation of the PCR signal. For example, a part of the WUR signal may be transmitted through On-Off Keying (OOK). Specifically, the PCR transceiver may transmit and receive modulated signals through a wave-form modulation method using WURx and other wave forms. Hereinafter, an operation of a wireless communication terminal including a WURx and a wireless communication method using WUR will be described according to an embodiment of the present invention.

Figure 6:
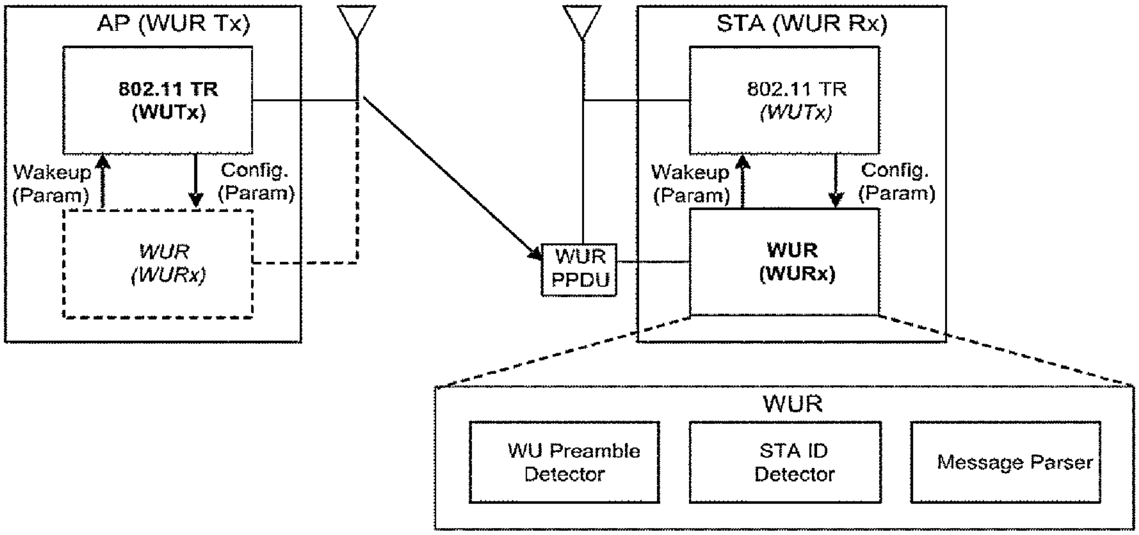
FIGS. 6 and 7 are diagrams illustrating a network including wireless communication terminals supporting the WUR-based power save according to an embodiment of the present disclosure.
Figure 7:
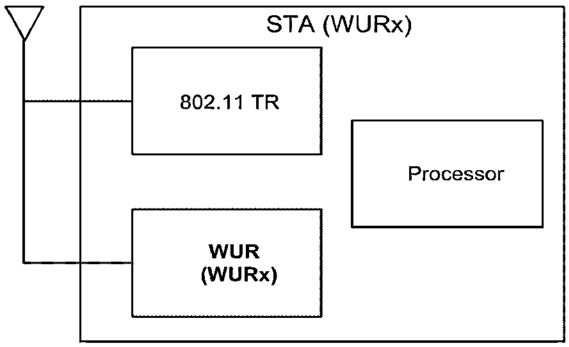

FIGS. 6 and 7 are diagrams illustrating a network including wireless communication terminals supporting WUR based power save according to an embodiment of the present disclosure.

Referring to FIG. 6, the network may include an AP and a station supporting WUR based power save. The AP may transmit a WUR frame to the WUR terminal. Specifically, the AP may wake-up the terminal by transmitting a wake-up frame to the WUR terminal. In the present specification, unless otherwise specified, a frame indicates a MAC frame. Meanwhile, the AP and the station of FIG. 6 may include a PCR transmission/reception function supporting at least one of 802.11a/b/g/n/ac/ax, which is a general wireless LAN standard. In addition, the AP and the station in FIG. 6 may coexist in one network and a general station that supports only PCR transmission/reception without supporting WUR transmission/reception. For example, the network of FIG. 6 may include a general station that does not have a WUR function.

According to an embodiment, the AP may include a first wireless transceiver (TR) supporting a communication method using PCR. The first wireless transceiver may transmit and receive PPDU through PCR. The AP may include a second wireless transmitter that performs WUR PPDU transmission. The second wireless transmitter may be referred to as a wake-up transmitter (WUTx). Here, a part of the WUR signal may be a signal transmitted in a second modulation method different from the first modulation method used in the PCR signal. Specifically, a part of the WUR signal may be transmitted through OOK. For example, the second wireless transmitter may transmit the WUR PPDU to the station through WUR. Also, if the AP additionally includes WURx, the AP may receive the WUR PPDU from the outside through the WURx.

Meanwhile, according to another embodiment, the first wireless transceiver and the second wireless transmitter may be implemented as one transceiver. For example, an AP may perform transmission and reception of a PCR signal and transmission of a WUR signal through one transceiver.

As shown in FIG. 6, the AP may transmit the WUR PPDU including a wake-up frame that triggers a wake-up of the PCR transceiver of the station to a station that supports WUR-based power save. According to an embodiment, the AP may wake up only a station entering a WUR based power save mode among a plurality of stations belonging to the AP's BSS. In addition, when the station receives a wake-up frame including an identifier indicating the station, the station may wake-up in the PCR doze state. For example, the WUR frame may include identification information identifying at least one station. The wake-up frame may include identification information identifying at least one station to wake-up. When the first station receives a wake-up frame including identification information indicating the first station, the first station may wake-up. Also, a station other than the first station belonging to the AP's BSS or another BSS may not wake-up.

According to an embodiment, a station supporting the WUR-based power save may include a WURx for receiving a wake-up frame. The station may include a first wireless transceiver that supports PCR transmission and reception and a WURx, that is, a second wireless receiver that exists separately. Here, the first wireless transceiver may be referred to as a PCR transceiver. The wireless communication terminal may transmit and receive PCR signals using a PCR transceiver. Also, the second wireless receiver may receive a signal transmitted in a second modulation method different from the first modulation method of the signal transmitted/received through the first wireless transceiver. The WURx may receive a wake-up frame from the AP and wake-up the PCR transceiver. If the WURx receives a wake-up frame while the PCR transceiver of the station operates in the PCR doze state, the WURx may wake-up the PCR transceiver by using an internal wake-up signal.

For example, the station may have an interface between the PCR transceiver and the WURx. At this point, the WURx may wake-up the PCR transceiver of the station by using the internal interface. Specifically, the WURx may wake-up a PCR transceiver by transmitting an internal signal to the PCR transceiver, but it is not limited thereto. For example, the station may have a processor that controls the overall operation of the station. At this point, the WURx may wake-up the PCR transceiver over the processor. Specifically, the station may cut off the power supply of the PCR and the processor in the PCR doze state. In this case, the WURx may operate in a manner that stops cutting off the power supply of the processor and wakes-up the PCR transceiver over the processor by receiving a wake-up frame.

According to an embodiment, the WURx may deliver information received through the wake-up frame to the PCR transceiver. The WURx may transmit information on subsequent operations following the wake-up to the PCR transceiver by using the internal interface. Specifically, the information on the subsequent operations may be a Sequence ID (SID) that identifies each of the subsequent operations. In addition, PCR may set WURx parameters required for the WUR based power save operation by using the internal interface. For example, the WURx may include a wake-up preamble detector (WU Preamble Detector), a wireless communication terminal identifier detector (STA ID Detector), and a message parser. The WU preamble detector detects a wake-up frame by identifying a sequence of signal patterns included in the wake-up frame. In addition, the WU preamble detector may perform automatic gain control (AGC) and synchronization on WUR based on the detected signal pattern sequence.

The wireless communication terminal identifier detector detects the recipient of the WUR frame. In this case, the recipient indicates a recipient intended by the wireless communication terminal that has transmitted the WUR frame. In addition, the wireless communication terminal identifier detector may obtain information identifying the recipient of the WUR frame based on the WU signaling field of the WUR PPDU. In addition, the wireless communication terminal identifier detector may obtain information identifying the recipient of the WUR frame based on the WU preamble and WU signaling field of the WUR PPDU. The WU preamble and WU signaling field of the WUR PPDU will be described later with reference to FIG. 8. The message parser parses the message included in the WUR frame. Specifically, the message parser may obtain a message indicated by the WUR frame by parsing the message included in the WUR frame.

According to an embodiment, the wireless communication terminal may determine a condition for maintaining the wireless communication terminal in a state where WUR PPDU reception is possible through the WURx of the communication terminal. In a specific embodiment, the wireless communication terminal may maintain WURx to be available for reception until a certain condition is satisfied. For example, until the wireless communication terminal recognizes that the PCR transceiver of the wireless communication terminal succeeds in wake-up, the wireless communication terminal may maintain the WURx in a state capable of transmitting and receiving.

Figure 8:
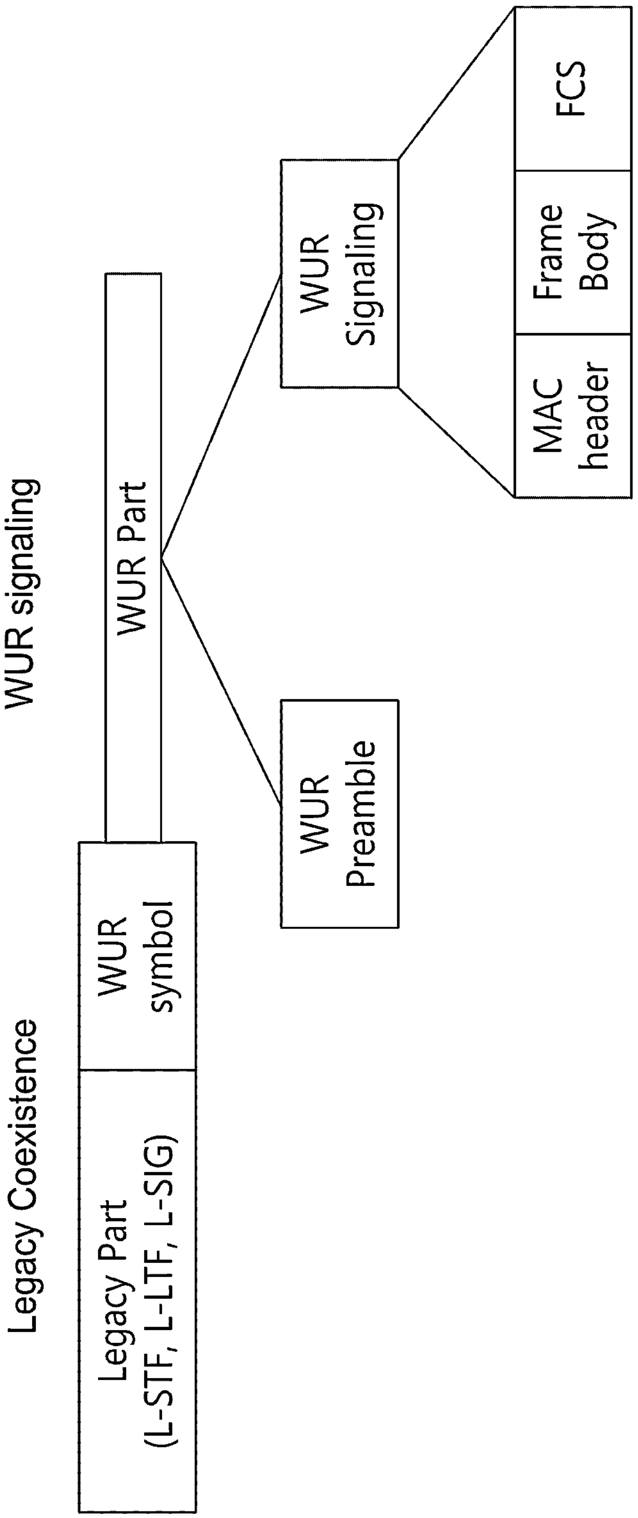
FIG. 8 is a diagram illustrating a format of a WUR PPDU according to an embodiment of the present disclosure.

FIG. 8 is a diagram illustrating a format of a WUR PPDU according to an embodiment of the present disclosure.

The WUR PPDU may include a legacy part that the PCR transceiver is capable of demodulating. Specifically, the WUR PPDU may be divided into a legacy part that the PCR transceiver is capable of demodulating and a wake-up part that the PCR transceiver is not capable of demodulating. As described above, the BSS may simultaneously include a wireless communication terminal that supports WUR-based power save and a legacy wireless communication terminal that does not support WUR-based power save. In this case, it is necessary that the operation of the wireless communication terminal supporting the WUR-based power save does not prevent the operation of the legacy wireless communication terminal existing in the BSS.

Specifically, the legacy part may include a legacy preamble (L-Preamble) used in the existing 802.11 standard. Specifically, the legacy preamble may include an L-STF including a short training signal, an L-LTF including a long training signal, and an L-SIG including signaling information for a legacy wireless communication terminal. The legacy wireless communication terminal may determine the length of the WUR PPDU using the legacy preamble. Accordingly, the legacy wireless communication terminal may not access the frequency band in which the WUR PPDU is transmitted while the WUR PPDU is transmitted. Though the legacy wireless communication terminal prevents interference with signals including the WUR part following the legacy part.

In addition, the WUR PPDU may include a WUR symbol. For example, the WUR symbol may be one OFDM symbol following L-SIG. The WUR symbol may be an OFDM symbol modulated by a Binary Phase Shift Keying (BPSK) scheme. The WUR symbol may include information indicating a BSSID. In addition, the WUR symbol may include information indicating the transmission type of the WUR part. For example, the transmission type may be unicast, multicast, or broadcast. When the transmission type is unicast, a WUR part to be described later may include identification information indicating a wireless communication terminal to be waked up. In this case, the identification information may be an association identifier (AID) used in the PCR. Alternatively, the identification information may be a WUR unique identifier (WUR ID) used in the WUR.

A wireless communication terminal supporting WUR-based power save can demodulate the WUR part through WURx. In this case, the WUR part may include a wake-up preamble and a wake-up signaling part. The WUR preamble may include a signal pattern sequence indicating a WUR frame. Specifically, the base wireless communication terminal may insert a pseudo noise sequence based on WURx modulation into the WUR preamble. The base wireless communication terminal can insert a pseudo noise sequence using OOK in the WUR preamble. The signal pattern sequence may be a pattern applied equally regardless of a wireless communication terminal receiving a WUR frame.

The WUR signaling field may be divided into a MAC header, a frame body, and a frame check sequence (FCS) field.

A wireless communication terminal supporting WUR-based power save may parse the WUR signaling field of the WUR frame to determine the recipient of the received WUR frame. For example, the MAC header may include an address field indicating the recipient of the WUR frame. Specifically, the MAC header may include a WUR identifier (WUR ID) that identifies a wireless communication terminal receiving a WUR frame. When the wireless communication terminal receives a wake-up frame including a WUR ID indicating the wireless communication terminal, the wireless communication terminal may wake-up the PCR transceiver. In order to wake-up a PCR transceiver of a specific wireless communication terminal among a plurality of wireless communication terminals included in the BSS using a wake-up frame, the base wireless communication terminal may allocate different WUR IDs to the plurality of wireless communication terminals, respectively.

According to one embodiment, when the wake-up frame triggers the wake-up of the PCR transceiver of a plurality of wireless communication terminals, the MAC header of the WUR signaling field may include a group identifier (Group ID) that identifies a group including a plurality of wireless communication terminals. Here, the Group ID may include a group address (GA). Further, the base wireless communication terminal may insert subsequent operation information indicating a subsequent operation of the wireless communication terminal to be the target of wake-up in the MAC header of the WUR signaling field. For example, the WUR signaling field may additionally include a subsequent operation identifier (SID) that identifies subsequent operations after wake-up.

For convenience of explanation, in the following, unless otherwise stated, it is assumed that the wireless communication terminal and the base wireless communication terminal are a wireless communication terminal and a base wireless communication terminal supporting WUR-based power save.

Figure 9:
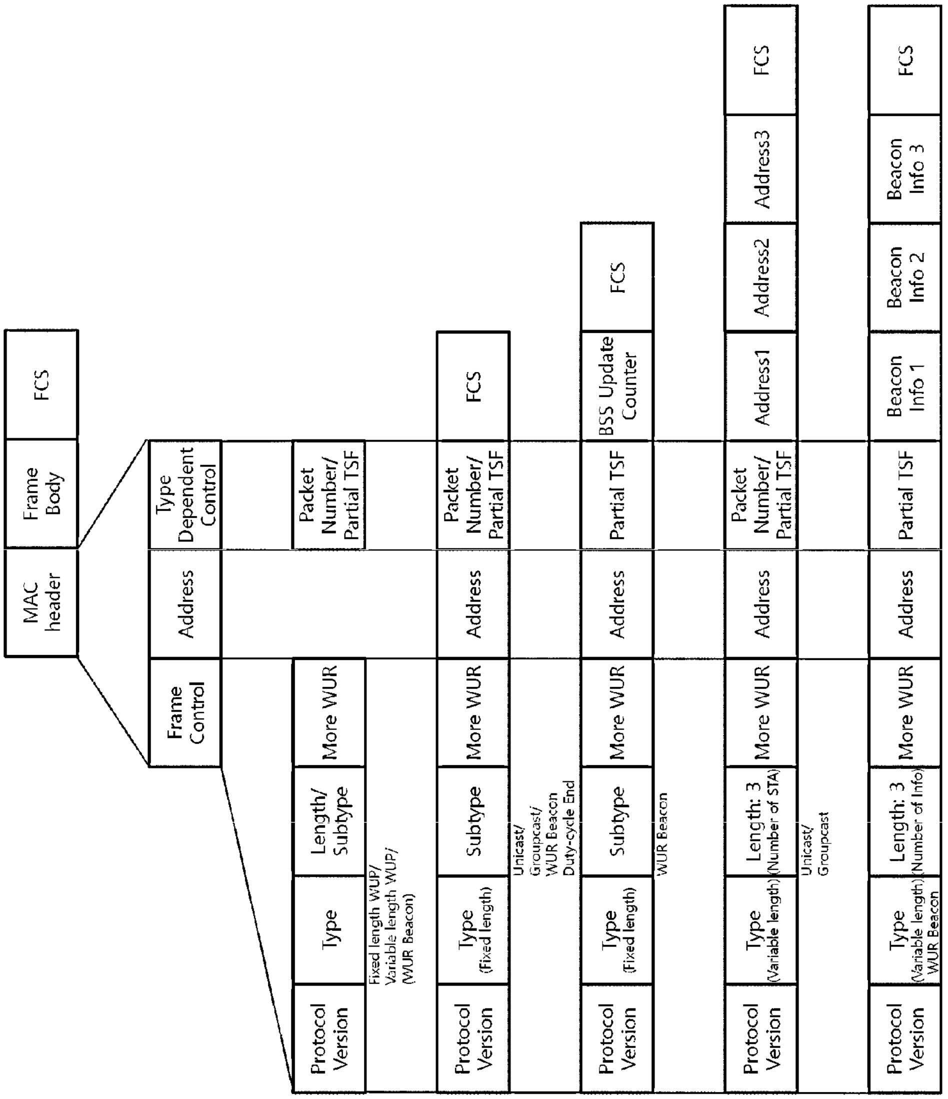
FIGS. 9 to 10 show a specific format of a WUR frame according to an embodiment of the present invention.
Figure 10:
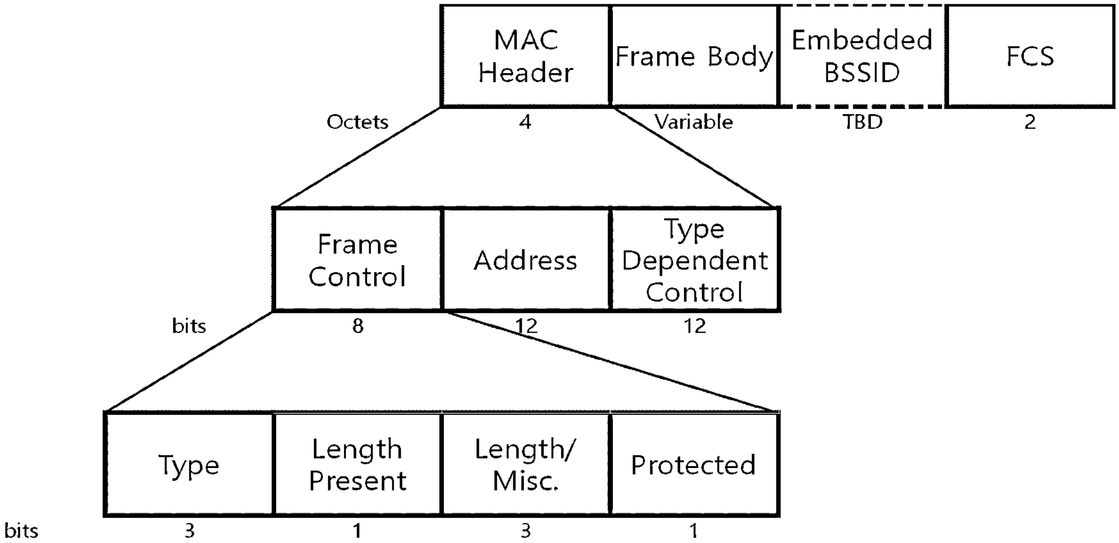

FIGS. 9 to 10 show a specific format of a WUR frame according to an embodiment of the present invention.

The MAC header of the WUR signaling field described through FIG. 8 may be divided into a frame control field, an address field, and a type dependent control field. In this case, the Frame Control field indicates basic control information on the WUR frame. In addition, the Address field may indicate information on the address of the transmitter of the WUR frame or the address of the recipient. Specifically, the Address field may include at least one of information indicating the address of the transmitter of the WUR frame and information indicating the address of the recipient. In addition, the Type Dependent Control field indicates variable control information changed according to the type of the WUR frame.

The Frame Control field may include information on the protocol version followed by the WUR frame. In this case, a field indicating information on a protocol version followed by the WUR frame may be referred to as a Protocol Version field. In addition, the Frame Control field may include information indicating the type of WUR frame. In this case, the information indicating the type of the WUR frame may indicate whether the length of the WUR frame is a predetermined fixed length or variable. Or, information indicating the type of the WUR frame may indicate the role of the WUR frame. For example, information indicating the type of the WUR frame may indicate that the WUR frame is a WUR beacon. Further, information indicating the type of the WUR frame may indicate that the WUR frame is a wake-up frame. A field indicating information indicating the type of the WUR frame may be referred to as a Type field.

In addition, the Frame Control field may include a field indicating the length of the WUR frame or a subtype of the WUR frame. When the length of the WUR frame is fixed, a field indicating the length of the WUR frame or a subtype of the WUR frame may indicate a subtype of the WUR frame. This is because when the length of the WUR frame is fixed, the WUR frame has a predetermined length. The field indicating the subtype of the WUR frame may indicate whether the WUR frame is a WUR frame for unicast, a WUR frame is a WUR frame for broadcast, or a WUR frame is a WUR frame for groupcast. When the WUR frame is a WUR frame for unicast, the address field of the WUR frame may indicate a unique WUR ID. When the WUR frame is a WUR frame for groupcast, the Address field of the WUR frame may indicate a group WUR ID that identifies a plurality of WUR wireless communication terminals. When the WUR frame is a WUR frame for broadcast, the Address field of the WUR frame may indicate a broadcast WUR ID. A field indicating a subtype of the WUR frame may indicate that the WUR frame is a WUR beacon frame. In this case, the Address field of the WUR frame may include an identifier of the base wireless communication terminal. Specifically, the Address field of the WUR frame may include the WUR ID of the base wireless communication terminal. A field indicating a subtype of the WUR frame may indicate that the frame indicates a duty-cycle end. When the wireless communication terminal receives a frame indicating the duty-cycle end, the wireless communication terminal may determine that there is no WUR frame to be transmitted to the wireless communication terminal until On Duration corresponding to the next transmission period. In this case, the wireless communication terminal may enter a WUR doze state that turns off the WURx when the WUR frame is received.

In addition, the Frame Control field may include information indicating that there is no additional WUR frame transmission to a terminal operating according to a duty-cycle among terminals associated with the base wireless communication terminal within a corresponding period after a corresponding WUR frame. In this case, the absence of additional WUR frame transmission may indicate that there is no additional wake-up frame transmission. Further, the absence of additional WUR frame transmission may indicate that there is no additional WUR beacon frame transmission. A field indicating information indicating that there is no additional WUR frame transmission may be referred to as a More WUR field.

As described above, the Address field may indicate a unique WUR ID. Also, the Address field may indicate the group WUR ID. In addition, when the WUR frame is transmitted in a broadcast, the Address field may indicate the identifier of the base wireless communication terminal.

The Type Dependent Control field may include information on a partial timing synchronization function for time synchronization between terminals receiving a WUR frame according to the type of the WUR frame. In addition, the Type Dependent Control field may include information indicating whether to change the BSS management parameter according to the type of the WUR frame. In this case, information indicating whether the BSS management parameter is changed may be referred to as a BSS update counter. Also, when the WUR frame is a unicast wake-up frame, the Type Dependent Control field may include information indicating how many WUR frames the base wireless communication terminal has transmit to the recipients of the WUR frame. Information indicating how many WUR frames the base wireless communication terminal has transmit to the corresponding terminal may be referred to as packet number information. The packet number information may indicate how many WUR frames the base wireless communication terminal has transmitted to the recipients of the WUR frame in a circular counter format. When the base wireless communication terminal successfully receives the response of the wireless communication terminal for the WUR frame, the base wireless communication terminal may increase the counter value indicated by the packet number information. When the WURx operation starts after receiving the wake-up frame and performing the PCR operation, the wireless communication terminal may store the counter value obtained by incrementing the counter obtained from the WUR frame. Also, the wireless communication terminal may store the counter value obtained from the WUR frame. In addition, when the packet number information of the WUR frame does not indicate the counter value expected by the wireless communication terminal, the wireless communication terminal may request the base wireless communication terminal to change the WUR ID of the wireless communication terminal. In this case, the wireless communication terminal may transmit a frame requesting the WUR ID change of the wireless communication terminal to the base wireless communication terminal using PCR. When the packet number information of the WUR frame does not indicate the counter value expected by the wireless communication terminal, this is because the wireless communication terminal may determine that the base wireless communication terminal associated with the wireless communication terminal has not transmitted the corresponding WUR frame. For example, the wireless communication terminal may determine that there is an external attack.

In another specific embodiment, the Type Dependent Control field may include a TID or Access Category (AC) of data that the base wireless communication terminal intends to transmit to the wireless communication terminal together with a sequence number. In this case, the sequence number is the lowest number among the sequence numbers of the MAC service data unit (MSDU) corresponding to the TID corresponding to the highest user priority among the TIDs of data that the base wireless communication terminal intends to transmit to the wireless communication terminal. In another specific embodiment, the sequence number may correspond to the TID corresponding to the highest user priority among the TIDs of data that the base wireless communication terminal intends to transmit to the wireless communication terminal, and may be a sequence number of an MSDU that successfully transmitted among the MSDUs corresponding to the TID. In a WUR doze state, the wireless communication terminal may determine whether a WUR frame received according to the sequence number of the MSDU successfully received from the base wireless communication terminal for each TID is a WUR frame transmitted by a base wireless communication terminal associated with the corresponding wireless communication terminal. In the Type Dependent Control field, the number of bits in the field indicating the sequence number may be 12 bits.

In addition, the AC of the data may be the AC of the TID having the highest user priority among the TIDs of data that the base wireless communication terminal intends to transmit to the wireless communication terminal. In the Type Dependent Control field, the number of bits of the field indicating AC may be 2 bits. The TID of data may be a TID having the highest user priority among TIDs of data that the base wireless communication terminal intends to transmit to the wireless communication terminal. In the Type Dependent Control field, the number of bits indicating the TID may be 3 bits. The value of the field indicating the sequence number of the Type Dependent Control field may be a partial bit of the sequence number. In this case, the value of the field indicating the sequence number may be a value corresponding to the number of bits of the field indicating the sequence number from the least significant bit (LSB). The wireless communication terminal receiving the WUR frame can access the channel based on the AC indicated by the WUR frame. In addition, the wireless communication terminal receiving the WUR frame may determine a method of transmitting a response frame for data depending on whether data corresponding to the TID indicated by the WUR frame is transmitted in unscheduled-automatic power save delivery (U-APSD) mode or normal PS mode.

When the sequence number indicated by the WUR frame does not indicate the sequence number expected by the wireless communication terminal, the wireless communication terminal may request the base wireless communication terminal to change the WUR ID of the wireless communication terminal. In this case, the wireless communication terminal may transmit a frame requesting the WUR ID change of the wireless communication terminal to the base wireless communication terminal using PCR. When the sequence number indicated by the WUR frame does not indicate the sequence number expected by the wireless communication terminal, this is because the wireless communication terminal may determine that the base wireless communication terminal associated with the wireless communication terminal has not transmitted the corresponding WUR frame. For example, the wireless communication terminal may determine that there is an external attack.

When the WUR frame is a WUR frame for groupcast transmission or a WUR frame for broadcast transmission, the Type Dependent Control field may not include packet number related information. In this case, the Type Dependent Control field may include Predictive Timer Synchronization Function (PTSF) related information instead of packet number information. In addition, even if the WUR frame is a WUR frame for unicast transmission, when the More WUR field indicates that there is no additional WUR frame transmission within a corresponding period, the Type Dependent Control field may include PTSF-related information instead of packet number information. This is because the operation of the wireless communication terminal receiving the WUR frame may affect the operation of other wireless communication terminals in duty cycle operation.

When the WUR frame corresponds to a WUR frame format of variable length, the length of the Frame Body field may be variable. In this case, the Type field may indicate that the length of the WUR frame is variable. In addition, the subtype field indicating the subtype of the WUR frame may indicate the length of the Frame Body field. Specifically, the subtype field may indicate the length of the WUR frame based on a predetermined information unit, not a bit unit. For example, the Frame Body field may include a plurality of subfields indicating information on each of the plurality of WUR wireless communication terminals. Specifically, the Frame Body field may include a first subfield indicating information on the first WUR wireless communication terminal and a second subfield indicating information on the second WUR wireless communication terminal. In addition, one subfield may indicate information on a plurality of WUR IDs corresponding to the group WUR ID. When the Frame Body field includes a plurality of subfields indicating information on each of the plurality of WUR wireless communication terminals, the subtype field may indicate information on the length of the Frame Body field using the number of subfields. For example, when the Frame Body field includes subfields for each of the two WUR IDs, the subtype field may indicate that the number of subfields included in the Frame Body field is 2. When the WUR frame is a WUR Beacon frame and corresponds to a variable length WUR frame format, the Frame Body field may include information related to management. In this case, the length of the Frame Body field may be indicated based on a predetermined information unit as described above.

FIG. 9 shows a specific format of a MAC header of a WUR frame according to a specific embodiment of the present invention. FIG. 10 shows a specific format of a MAC header of a WUR frame according to another specific embodiment of the present invention.

The Frame Control field may include a Type field. The Type field may indicate whether the WUR frame is a WUR beacon frame, a wake-up frame, a WUR discovery frame for discovering a BSS using WUR, or a vendor specific frame. Also, the Frame Control field may include a Length Present field. The Length Present field may indicate whether the corresponding WUR frame corresponds to a fixed-length WUR frame format not including the Frame Body field, or whether the corresponding WUR frame corresponds to a variable-length WUR frame format including the Frame Body field.

In addition, the Frame Control field may include a Length/Misc field. The Length/Misc field may indicate the length of the WUR frame or additional information other than the length of the WUR frame depending on whether the WUR frame corresponds to the variable length WUR frame format. Specifically, when the WUR frame corresponds to a variable-length WUR frame format, the Length/Misc field may indicate information on the length of the WUR frame. The information on the length of the WUR frame may indicate the length of the WUR frame. When the WUR frame corresponds to a variable-length WUR frame format, the Length/Misc field may indicate a length of 2 to 16 octets in units of 2 octets. When the WUR frame corresponds to the variable length WUR frame format, the Length/Misc field may indicate the length of the WUR frame based on a predetermined information unit. For example, the frame body may include a subfield indicating information on a wireless communication terminal corresponding to the WUR ID for each WUR ID. In this case, the Length/Misc field may indicate the number of subfields included for each WUR ID in the Frame Body.

In addition, the Frame Control field may include a Protected field indicating whether the frame requires verification by a message integrity check (MIC). In this case, the Protected field may be a 1-bit field. When the Protected field indicates that MIC is required, the wireless communication terminal receiving the WUR frame may check whether the WUR frame is valid using the MIC. When the wireless communication terminal determines that the WUR frame is not valid through the MIC, the wireless communication terminal may process the WUR frame. The wireless communication terminal may discard the WUR frame. Specifically, when frame validation is required through the MIC, the FCS field of the WUR frame may indicate a message integrity value. The wireless communication terminal receiving the WUR frame may perform MIC using the encryption key previously received.

The Address field may indicate information on the address of the transmitter of the WUR frame or the address of the recipient. The identifier included in the Address field may vary depending on the role of the WUR frame. When the WUR frame is a WUR beacon frame, the Address field may indicate a transmission ID (TXID) that is an identifier of the base wireless communication terminal. In addition, when the WUR frame is a wake-up frame for broadcast transmission, the Address field may indicate TXID. In addition, when the WUR frame is a wake-up frame to wake-up a plurality of wireless communication terminals corresponding to a specific group, the Address field may indicate the group WUR ID. In another specific embodiment, when the WUR frame is a wake-up frame for waking up a specific plurality of wireless communication terminals, the Frame Body field of the corresponding WUR frame may indicate at least one WUR ID among the plurality of wireless communication terminals. When the WUR frame is a wake-up frame to wake-up a specific wireless communication terminal, the address field may indicate the WUR ID of the corresponding wireless communication terminal.

The WUR frame may include an FCS field indicating a value used to validate the WUR frame. The wireless communication terminal receiving the WUR frame may determine whether an error is included in the process of transmitting and receiving the WUR frame based on the values of the fields included in the WUR frame and the values of the FCS field. Specifically, the wireless communication terminal receiving the WUR frame performs a CRC operation based on the values of the fields included in the WUR frame to generate the FCS value, and compares the generated FCS value with the value of the FCS field. When the generated FCS value and the value of the FCS field are the same, the wireless communication terminal may determine that no error is included in the process of transmitting and receiving the WUR frame. When the generated FCS value and the value of the FCS field are different, the wireless communication terminal may determine that an error is included in the process of transmitting and receiving the WUR frame. The WUR frame may not include the identifier of the base wireless communication terminal. Also, the WUR frame may be transmitted without being encrypted. Therefore, an external wireless communication device can copy the field value of the WUR frame and retransmit it. Through this, an external wireless communication device can induce a power consumption by allowing the wireless communication terminal to wake-up unnecessarily. In order to prevent this, the following embodiments can be applied to a wireless communication terminal and a base wireless communication terminal.

In a specific embodiment, the wireless communication terminal receiving the WUR frame may perform the CRC operation to generate the FCS value considering not only the values of the fields included in the WUR frame, but also the values of virtual fields not included in the WUR frame. The wireless communication terminal may compare the generated FCS value with the FCS field value. Therefore, the base wireless communication terminal may also perform the CRC operation to configure the value of the FCS field considering not only the values of the fields included in the WUR frame, but also the values of virtual fields not included in the WUR frame. In this case, the value of the virtual field may be a value previously negotiated between the base wireless communication terminal and the wireless communication terminal. In addition, when there is no Frame Body field of the WUR frame, when generating the FCS value, the wireless communication terminal and the base wireless communication terminal may consider that the virtual field is located after the MAC header. In addition, if there is a Frame Body field of the WUR frame, when generating the FCS value, the wireless communication terminal and the base wireless communication terminal may consider that the virtual field is located after the MAC header. The virtual field may be referred to as an embedded BSSID field. Through this operation, the wireless communication terminal may determine whether the WUR frame includes an error and also determine whether a WUR frame is transmitted from a base wireless communication terminal associated with the wireless communication terminal. The specific format of the WUR frame may be the same as that shown in FIG. 10.

For WUR-related operations, it is necessary to exchange information on whether the base wireless communication terminal and the wireless communication terminal support the WUR operations and to negotiate the WUR operations. The base wireless communication terminal and the wireless communication terminal may use PCR to exchange information on whether to support the WUR operation and negotiate the WUR operation. This will be described with reference to FIG. 11.

Figure 11:
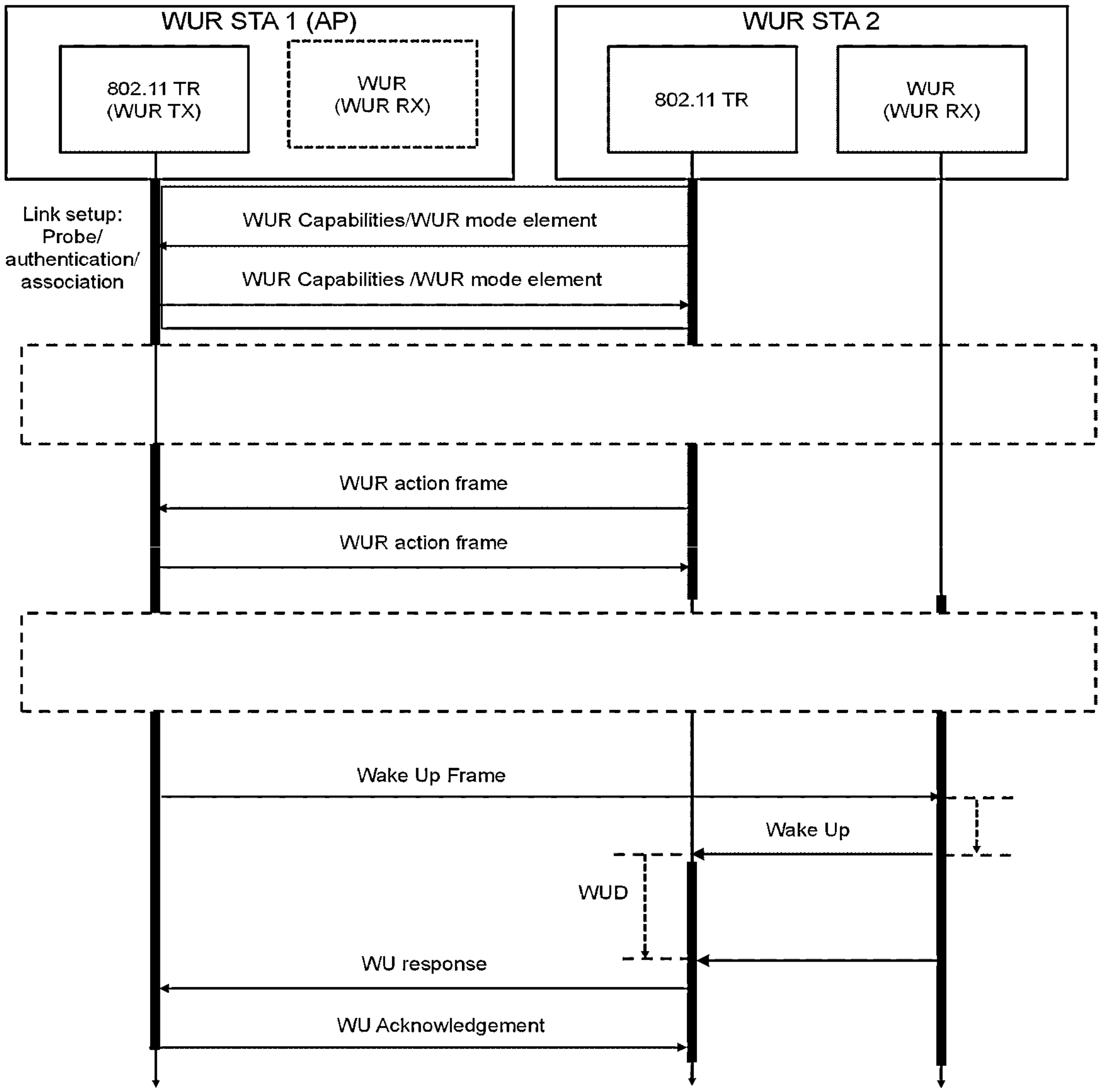
FIG. 11 shows that a wireless communication terminal and a base wireless communication terminal according to an embodiment of the present invention perform negotiations for WUR-related operations and perform WUR-related operations.

FIG. 11 shows that a wireless communication terminal and a base wireless communication terminal according to an embodiment of the present invention perform negotiations for WUR-related operations and perform WUR-related operations.

The base wireless communication terminal and the wireless communication terminal may exchange information on whether to support WUR operation in a link setup procedure. Specifically, the wireless communication terminal may transmit a WUR capability element to the base wireless communication terminal through a probe request frame, an authentication request frame, and an association request frame. The WUR capability element is an element indicating the capabilities supported by the wireless communication terminal in relation to WUR operation. In addition, the wireless communication terminal may transmit a WUR capability element to the base wireless communication terminal using a separate action frame. In addition, the base wireless communication terminal and the wireless communication terminal may transmit a WUR mode element including information on WUR operation-related parameters in a link setup procedure. In addition, the base wireless communication terminal and the wireless communication terminal may transmit WUR mode elements through an action frame. The WUR mode element will be described in detail with reference to FIG. 12.

The wireless communication terminal may perform WUR-related operations after connection with the base wireless communication terminal. When the wireless communication terminal wants to enter the PCR doze state, the wireless communication terminal may transmit a WUR action frame to the base wireless communication terminal. WUR action frames are exchanged to configure parameters related to WUR operation. WUR action frames can be exchanged through PCR. Further, the WUR action frame may request an ACK from the recipient of the WUR action frame. When it is determined that the base wireless communication terminal receiving the WUR action frame needs to change or check the parameters related to the WUR operation, the base wireless communication terminal may transmit an additional WUR action frame to the base wireless communication terminal. The parameter related to the WUR operation may include at least one of a duty-cycle period and a length of on duration. The exchange process of the WUR action frame may be repeated until the configuration of parameters related to the WUR operation is completed. When the parameter agreement related to the WUR operation is completed, the wireless communication terminal may change the power management mode to the power save mode and enter the PCR doze state.

When the wireless communication terminal of the PCR doze state receives a wake-up frame indicating a WUR ID that identifies the wireless communication terminal or a WUR ID that identifies a plurality of wireless communication terminals including the wireless communication terminal, the wireless communication terminal stores the information indicated by the wake-up and turns on the PCR transceiver. Specifically, the wireless communication terminal stores the information indicated by the wake-up and transmits a signal for turning on the PCR transceiver. When the PCR transceiver is turned on, the wireless communication terminal may transmit information obtained from the wake-up frame to the PCR transceiver. In this case, the information obtained from the wake-up frame may include at least one of the packet number and Timer Synchronization Function (TSF) described above.

After PCR is turned on, the wireless communication terminal may transmit a Wake-up (WU) response frame indicating that the wireless communication terminal successfully wakes up to the base wireless communication terminal. This is because the base wireless communication terminal needs to check whether the wireless communication terminal wakes up successfully. Specifically, when a WUR frame is transmitted through WUR, 1 bit is transmitted through one OFDM symbol. Therefore, the transmission time of the WUR frame through WUR is very long. In addition, a wake-up delay (WUD), which is a time required to turn on a PCR transceiver in a PCR doze state, may also be a relatively long time. Therefore, even if the wireless communication terminal fails to wake up, when the base wireless communication terminal attempts transmission through PCR, the wake-up process needs to be performed again and it takes a relatively long time again until the wireless communication terminal wakes up. The wireless communication terminal can reduce the time required to transmit the WU response frame by transmitting the WU response frame using PCR rather than WUR. The wireless communication terminal may transmit a WU response frame according to a channel access method for PCR. The WU response frame may be a separate control frame defined for WUR operation. In addition, the WU response frame may be a frame used in an existing wireless LAN standard, such as a PS-poll frame. When the base wireless communication terminal wants to receive a WU response frame after designating a specific wireless time, the wireless communication terminal may attempt to access a channel for transmitting a WU response frame after a corresponding time elapses after wake-up. In this case, the wireless communication terminal may obtain information on a specific time through the WUR capability element. As described above, the WUR capability element may be transmitted through a probe request frame, an authentication request frame, and an association request frame. Also, the wireless communication terminal may obtain information on a specific time through a WUR action frame.

The base wireless communication terminal receiving the WU response frame may transmit a WU Acknowledgement (ACK) frame to the wireless communication terminal. The WU ACK frame may be an immediate response frame. Specifically, the WU ACK frame may be an ACK frame. Further, the WU ACK frame may be a separately defined control frame for WUR operation. In addition, the WU ACK frame may be QoS data. The wireless communication terminal receiving the WU ACK frame may perform general PCR operation.

When the base wireless communication terminal does not receive a WU response frame from a time point that transmits a wake-up frame to a predetermined time, the base wireless communication terminal may determine that the wake-up of the wireless communication terminal fails. In this case, the base wireless communication terminal may transmit a wake-up frame to the wireless communication terminal again. In order to determine whether a predetermined time elapses, the base wireless communication terminal may configure a timer after transmitting a wake-up frame. The predetermined time may be a time longer than the sum of the WUD and NAVSyncDelay values of the wireless communication terminal. NAVSyncDelay indicates a time during which the transmission of the wireless communication terminal is prohibited so that the wireless communication terminal may configure the NAV based on a frame or PPDU transmitted through PCR after wake-up.

In the embodiment of FIG. 11, the first WUR station WUR STA1 and the second WUR station WUR STA2, which are APs, perform a link setup procedure. In this case, the first WUR station WUR STA1 and the second WUR station WUR STA2 exchange WUR capability elements and WUR mode elements. In addition, the second WUR station WUR STA2 transmits a WUR action frame to the base wireless communication terminal to enter the WUR doze state. The first WUR station WUR STA1 and the second WUR station WUR STA2 exchange action frames to configure WUR operation-related parameters. When the first WUR station WUR STA1 has data to be transmitted to the second WUR station WUR STA2, the first WUR station WUR STA1 transmits a wake-up frame to the second WUR station WUR STA2. The second WUR station WUR STA2 receives the wake-up frame and turns on the PCR transceiver. In this case, it takes a time by WUD until the PCR transceiver is turned on. After the PCR transceiver is turned on, the second WUR station WUR STA2 transmits a WU response frame to the base wireless communication terminal. The first WUR station WUR STA1 transmits a WU ACK frame to the second WUR station WUR STA2. Through these operations, the wireless communication terminal can enter the PCR doze state and wake-up again.

The format of the WUR capability element described with reference to FIG. 11 will be described in detail with reference to FIG. 12.

Figure 12:
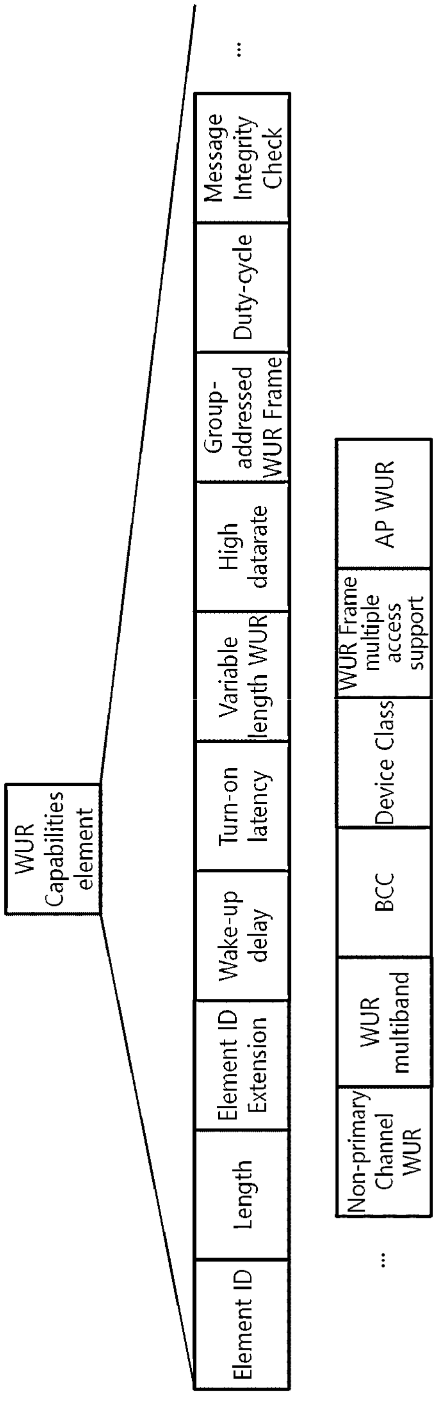
FIG. 12 shows a format of a WUR capability element according to an embodiment of the present invention.

FIG. 12 shows a format of a WUR capability element according to an embodiment of the present invention.

The WUR capability element may follow the format of the general extension element of the 802.11 standard. Specifically, the WUR capability element may include an Element ID field, a Length field, and an Element ID extension field.

The WUR capability element may include information on WUD, which is a time required for the wireless communication terminal that transmits the WUR capability element to turn on the PCR transceiver in the PCR doze state. This information may be referred to as wake-up delay information. The base wireless communication terminal transmitting the wake-up frame may determine whether the wake-up fails based on a time longer than the sum of time required for transmitting the WUD and WU response frames. Specifically, after transmitting the wake-up frame, the base wireless communication terminal may configure a timer having a period longer than the sum of the time required for transmitting the WUD and WU response frames. When the timer expires, the base wireless communication terminal may determine that the wake-up fails.

The WUR capability element may include information on the time required for the wireless communication terminal that transmits the WUR capability element to turn on the WURx. This information may be referred to as turn-on latency information. The base wireless communication terminal may transmit a WUR frame to the wireless communication terminal in consideration of turn-on latency information. Specifically, the base wireless communication terminal may transmit a WUR frame to the wireless communication terminal after the time indicated by the turn-on latency information elapses from the time point at which the wireless communication terminal enters the PCR power saving mode. Wake-up delay information and turn-on latency information may be indicated in microsecond units. In addition, wake-up delay information and turn-on latency information may be indicated by values in a predetermined range.

The WUR capability element may include information indicating whether a wireless communication terminal transmitting the WUR capability element may receive a variable length WUR frame. The information may be referred to as variable length WUR information. When the WUR capability element indicates that a variable length WUR frame cannot be received, the base wireless communication terminal may transmit only the WUR frame corresponding to the fixed-length WUR frame format to the wireless communication terminal that transmits the WUR capability element. The WUR capability element may include information indicating whether a wireless communication terminal transmitting the WUR capability element can receive a WUR frame transmitted at a predetermined reference data rate or higher. This information may be referred to as high data rate information. Specifically, the WUR frame can be transmitted at 62.5 Kbps or 250 Kbps. The high data rate information may indicate whether the wireless communication terminal transmitting the WUR capability element can receive the WUR frame transmitted at 250 Kbps. In addition, when a WUR frame having a variable length can be transmitted only above a predetermined reference data rate, the high data rate information may be integrated with the variable length WUR information described above.

The WUR capability element may include information indicating whether the wireless communication terminal transmitting the WUR capability element can receive a WUR frame identifying a recipient by a group WUR ID in addition to a unique WUR ID. This information may be referred to as group-addressed WUR frame information. The base wireless communication terminal transmits a WUR frame identifying the recipient with a unique WUR ID to the wireless communication terminal signaling that the WUR frame identifying the recipient with the group WUR ID cannot be received through the group-address WUR frame information. The base wireless communication terminal cannot transmit the WUR frame identifying the recipient with the group WUR ID to the wireless communication terminal signaling that the WUR frame identifying the recipient with the group WUR ID cannot be received through the group-address WUR frame information. The field indicating the group-address WUR frame information may be a 1-bit field.

Even a wireless communication terminal capable of receiving a WUR frame identifying a recipient with a group WUR ID may not process a plurality of group WUR IDs. Specifically, the number of group WUR IDs that the wireless communication terminal can store may be limited. Accordingly, the group-address WUR frame information may indicate the maximum number of group WUR IDs that can be processed by the wireless communication terminal that has transmitted the WUR capability element. The base wireless communication terminal may allocate a group WUR ID of a maximum number or less that the corresponding wireless communication terminal has signaled through the group-address WUR frame information to the wireless communication terminal that has transmitted the WUR capability element. In addition, the base wireless communication terminal cannot allocate a group WUR ID of more than the maximum number that the corresponding wireless communication terminal has signaled through the group-address WUR frame information to the wireless communication terminal that has transmitted the WUR capability element.

The WUR capability element may include information indicating whether the wireless communication terminal transmitting the WUR capability element supports the duty-cycle operation of WURx. This information may be referred to as duty-cycle information. The duty-cycle operation of WURx will be described in detail with reference to FIGS. 16 and 20 to 21. The wireless communication terminal signaling that the duty-cycle operation of WURx is not supported through the duty-cycle information may always turn on the WURx when entering the PCR doze state. In addition, the corresponding wireless communication terminal may not perform a duty-cycle-related parameter exchange process with the base wireless communication terminal.

The WUR capability element may include information indicating whether the wireless communication terminal transmitting the WUR capability element supports MIC operation. This information may be referred to as MIC information. The base wireless communication terminal may transmit a WUR frame using the MIC instead of the FCS to the wireless communication terminal signaling to support MIC operation through MIC information. The base wireless communication terminal may not be allowed to transmit the WUR frame using the MIC instead of the FCS to the wireless communication terminal signaling not to support the MIC operation through the MIC information. A wireless communication terminal supporting MIC can detect an external attack or the like through MIC operation. In this case, the wireless communication terminal may transmit an action frame requesting a new WUR ID to the base wireless communication terminal.

The WUR capability element may include information indicating whether the wireless communication terminal transmitting the WUR capability element supports performing a WUR operation in a channel different from the operating channel of the PCR. This information may be referred to as non-primary channel WUR information. When the wireless communication terminal signals that it does not support performing the WUR operation in a channel different from the operating channel of the PCR through the non-primary channel WUR information, the base wireless communication terminal may be limited to using the same channel as the operating channel of PCR in communication using the corresponding wireless communication terminal and WUR. In this case, when the same channel as the operating channel of the PCR cannot be used, the base wireless communication terminal may change the operating channel of the PCR. In addition, when the same channel as the operating channel of the PCR cannot be used, the base wireless communication terminal may not allow the corresponding wireless communication terminal to enter the PCR power saving mode.

The WUR capability element may include information indicating whether the wireless communication terminal transmitting the WUR capability element can perform a WUR operation in a plurality of frequency bands. This information may be referred to as WUR multiband information. Specifically, the WUR multi-band information may indicate whether the wireless communication terminal transmitting the WUR capability element supports each of the multi-bands. In this case, the field indicating WUR multiband information may be an n-bit field, and n may be the number of frequency bands included in the multiband. In another specific embodiment, the WUR multiband information may indicate whether the wireless communication terminal transmitting the WUR capability element supports an additional frequency band as well as a basic frequency band. In this case, the field indicating WUR multi-band information may be a 1-bit field. Also, the plurality of frequency bands may include frequency bands of 2.4 GHz and 5 GHz. In addition, the basic frequency band described above may be 2.4 GHZ, and the additional frequency band may be 5 GHz.

The WUR capability element may include information indicating whether the wireless communication terminal transmitting the WUR capability element can receive a WUR frame encoded with a binary convolution code (BCC). This information may be referred to as BCC information. When the wireless communication terminal signals that the BCC-encoded WUR frame can be received through BCC information, the base wireless communication terminal may transmit a BCC encoded WUR frame to the corresponding wireless communication terminal.

The WUR capability element may include information indicating the class of the wireless communication terminal that has transmitted the WUR capability element. The information may be referred to as device class information. In addition, the device class information may be classified into a wireless communication terminal as a sink device and a sensor device. In addition, the device class information may classify a wireless communication terminal into a mobile device and a stationary device.

The WUR capability element may include information indicating whether the wireless communication terminal that has transmitted the WUR capability element can receive a WUR PPDU in which a plurality of WUR frames are multiplexed to frequency division multiple access (FDMA) and transmitted in a frequency domain in a unit channel. In this case, the unit channel is a minimum frequency bandwidth in which WUR PPDUs can be transmitted. The minimum channel bandwidth may be 20 MHz. This information may be referred to as WUR frame multiple access support information. When the WUR frame multiple access support information indicates that the wireless communication terminal does not support reception of WUR PPDUs in which multiple WUR frames are multiplexed in the frequency domain and transmitted, the base wireless communication terminal may not be allowed to multiplex and transmit multiple WUR frames in the WUR frame frequency domain. In this case, the base wireless communication terminal may transmit the WUR part using 13 subcarriers in the center of the 20 MHz channel.

The WUR capability element may include information indicating whether the wireless communication terminal transmitting the WUR capability element supports WUR frame transmission. This information may be referred to as AP WUR information. PCR doze state entry of the base wireless communication terminal may be allowed only when all wireless communication terminals connected to the base wireless communication terminal indicate whether to support WUR frame transmission. In addition, when the base wireless communication terminal transmits AP WUR information, the AP WUR information may indicate whether the corresponding base wireless communication terminal supports PCR doze state entry.

FIG. 12 shows a specific format of the WUR capability element including the above-described information.

Referring to FIG. 11, it has been described that the base wireless communication terminal and the wireless communication terminal may configure parameters related to WUR operation through action frame exchange. The WUR action frame that the wireless communication terminal transmits to configure parameters related to WUR operation will be described with reference to FIGS. 13 to 14. In addition, the WUR mode element used for configuring parameters related to the WUR operation will also be described.

Figure 13:
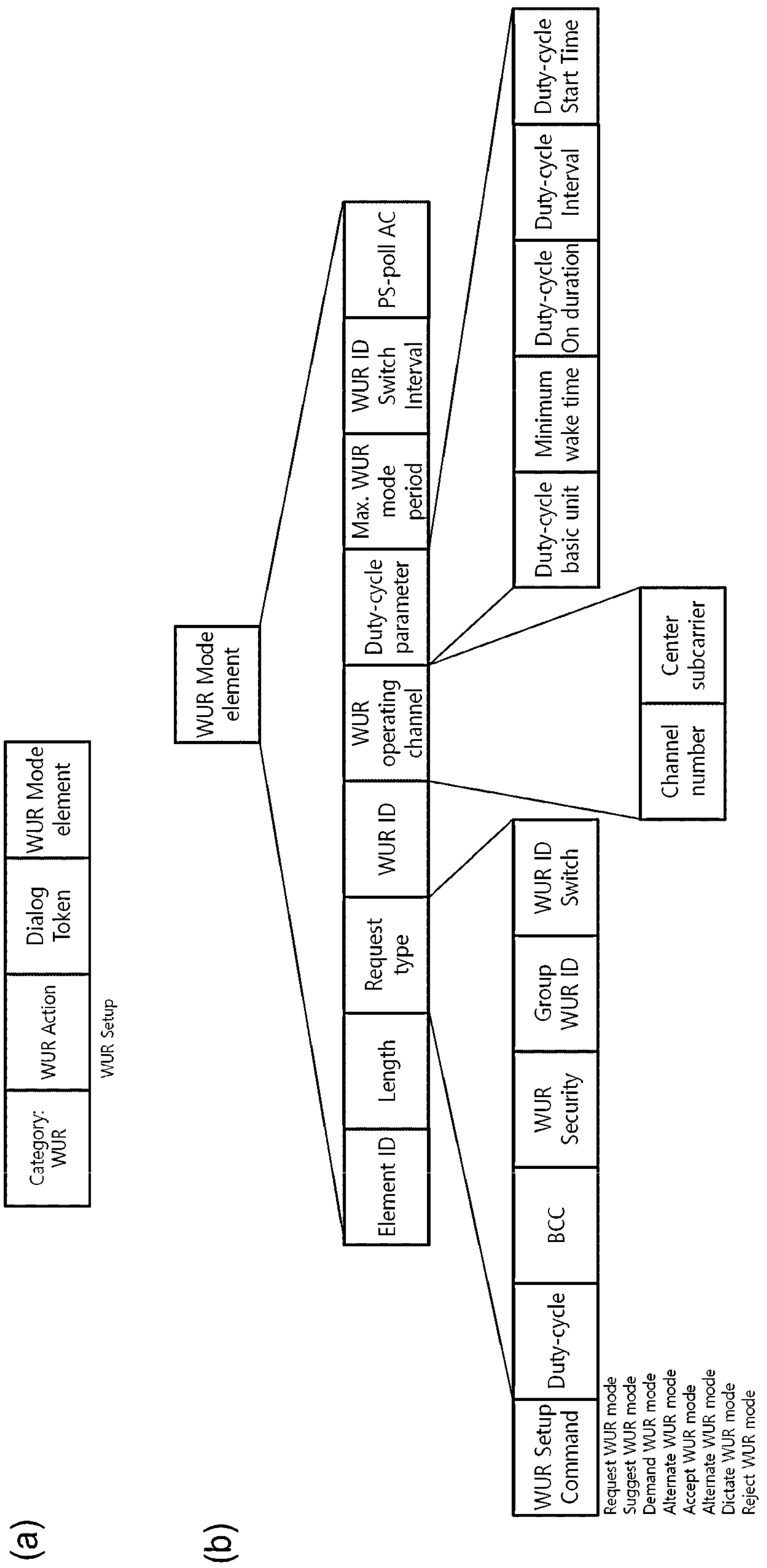
FIG. 13 shows a specific format of a PCR power saving WUR action frame and a specific format of a WUR mode element in a wireless communication terminal according to an embodiment of the present invention.

FIG. 13 shows a specific format of a PCR power saving WUR action frame and a specific format of a WUR mode element in a wireless communication terminal according to an embodiment of the present invention.

The wireless communication terminal may configure a parameter related to the WUR operation by transmitting a WUR mode element to the base wireless communication terminal. As described above, the wireless communication terminal may transmit the WUR mode element in the link setup process. Also, the wireless communication terminal may transmit a WUR mode element through an action frame.

FIG. 13(*a*) shows a specific format of a WUR action frame according to an embodiment of the present invention. The WUR action frame may include information indicating the role of the WUR action frame. Information indicating the role of the WUR action frame may be referred to as WUR action information. The wireless communication terminal may transmit WUR mode elements through the WUR action frame by setting the WUR action information to WUR Setup. In this case, the WUR action frame may include a WUR Action field indicating WUR action information, a Dialog Token field, and a field indicating WUR mode elements.

FIG. 13(*b*) shows a specific format of a WUR mode element according to an embodiment of the present invention. The WUR mode element may include information indicating what stage the transmission of the WUR action frame is in the WUR operation-related parameter configuration process. This information may be referred to as WUR setup command information. The wireless communication terminal requesting WUR operation-related parameter configuration may configure WUR setup command information of the WUR mode element as a WUR setup command indicating a WUR operation-related parameter setting request. In this case, the WUR setup command may be referred to as a request WUR mode command. For convenience of description, a wireless communication terminal transmitting a WUR mode element, which is a WUR setup command, is referred to as a request terminal. In addition, a wireless communication terminal transmitting a WUR mode element in response to a WUR mode element transmitted by the request terminal is referred to as a response terminal. The WUR setup command that accepts the WUR operation-related parameter setting request may be referred to as an accept WUR mode command.

When all WUR operation-related parameters indicated by the WUR mode element received by the response terminal are accepted, the response terminal may transmit to the request terminal a WUR mode element in which the WUR setup command is the accepted WUR mode command and the WUR operation related parameter is configured equal to the received WUR mode element. When the response terminal does not accept any of the WUR operation-related parameters indicated by the received WUR mode element, the response terminal may suggest WUR operation-related parameters by transmitting a WUR mode element to the request terminal. In this case, the request terminal may re-suggest parameters related to WUR operation to the request terminal according to the WUR setup command value configured by the response terminal. Specifically, when the WUR setup command configured by the response terminal is a Dictate WUR mode command, the request terminal may accept the parameters related to the WUR operation suggested by the response terminal through the WUR mode element or stop configuring the WUR operation related parameter. When the request terminal accepts the parameters related to WUR operation suggested by the response terminal through the WUR mode element, the request terminal may transmit a WUR mode element configured equal to the WUR mode element received by the WUR operation related parameter. When the request terminal does not accept the parameters related to WUR operation suggested by the response terminal through the WUR mode element, the request terminal may not transmit the WUR mode element to the response terminal. When the WUR operation-related parameter configuration is stopped, the wireless communication terminal cannot enter the PCR doze state.

Specifically, when the WUR setup command configured by the response terminal is an alternative WUR mode command, the request terminal can accept the parameters related to the WUR operation suggested by the response terminal through the WUR mode element or suggest new WUR operation related parameters. When the request terminal accepts the parameters related to WUR operation suggested by the WUR mode element, the request terminal may transmit a WUR mode element in which the WUR setup command is a suggest WUR mode command or demand, and transmit a WUR mode element in which the parameters related to the suggested WUR operation are configured. The response terminal that receives the suggest WUR mode command may transmit the WUR mode element to suggest the WUR operation-related parameters again. The response terminal receiving the demand WUR mode command may accept the WUR operation related parameter suggested by the request terminal through the WUR mode element or stop configuring the WUR operation related parameter. When the request terminal accepts the parameters related to WUR operation suggested by the WUR mode element, the response terminal can transmit to the request terminal a WUR mode element in which the WUR setup command is configured as the accept WUR mode command and the WUR operation-related parameters are configured equal to the received WUR mode elements. When the request terminal does not accept the parameters related to WUR operation suggested through the WUR mode element, the response terminal may transmit a WUR mode element which is a reject WUR mode command. WUR operation-related parameters may be configured through such operations. In addition, the wireless communication terminal and the base wireless communication terminal may perform a WUR-based power save operation according to the parameters related to the configured WUR operation.

The WUR mode element may include information indicating whether the WURx operates according to a duty-cycle. This information may be referred to as duty-cycle information.

The WUR mode element may include information indicating whether the WUR frame is encoded with the BCC. This information may be referred to as BCC information. When either the request terminal or the response terminal signals that the BCC encoding is not supported by the WUR capability element, the BCC information should indicate that the WUR frame is not encoded with the BCC.

The WUR mode element may include information indicating whether the WUR frame is encoded with the BCC. This information may be referred to as WUR security information. If either the request terminal or the response terminal signals that the WUR capability element does not support MIC, the WUR security information should indicate that the MIC is not used in the WUR frame.

The WUR mode element may include information indicating whether a group WUR ID is used in a WUR frame transmitted between a request terminal and a response terminal. This information may be referred to as group WUR ID information. When the group WUR ID is used, the wireless communication terminal may transmit a WUR action frame requesting a group WUR ID allocation to the base wireless communication terminal. The wireless communication terminal receiving the WUR action frame requesting the group WUR ID allocation may allocate the group WUR ID to the wireless communication terminal transmitting the corresponding WUR action frame. In another specific embodiment, the WUR mode element may include information indicating the group WUR ID together with the group WUR ID information.

The WUR mode element may include information indicating whether the WUR ID is periodically changed. This information may be referred to as WUR ID switch information. Periodically changing the WUR ID of the wireless communication terminal may help prevent external attacks. Therefore, when there is an external attack threat, the WUR ID may be configured to be periodically changed through the WUR ID switch information. When the WUR ID switch information indicates that the WUR ID is periodically changed, the wireless communication terminal may periodically request to change the WUR ID of the wireless communication terminal. In this case, the period in which the WUR ID change is requested may be a predetermined period. In another specific embodiment, the period in which the WUR ID change is requested may be configured through the WUR mode element. Specifically, the WUR mode element may include information on a period in which a WUR ID change is requested. This information may be referred to as WUR switch interval information. When the WUR ID switch information indicates that the WUR ID is not periodically changed, the WUR mode element may not include WUR switch interval information.

The WUR mode element may include information indicating a WUR ID to be used by the wireless communication terminal. This information may be referred to as WUR ID information.

The WUR mode element may include information on a WUR operating channel to be used for WUR frame transmission. This information may be referred to as WUR operating channel information. WUR operating channel information may be indicated for each unit channel. In addition, operating channel information may be indicated by a channel number. As described above, the unit channel is a minimum frequency bandwidth in which WUR PPDUs can be transmitted. The minimum channel bandwidth may be 20 MHz. A channel signaling that the request terminal and the response terminal are usable in the WUR capability element may be configured as a WUR operating channel. When the wireless communication terminal indicates that the WUR capability element supports WUR frame multiple access, the base wireless communication terminal may signal a center subcarrier of a channel to transmit a WUR frame in an operating channel through a WUR mode element.

The WUR mode element may include information indicating a parameter used in the WUR duty-cycle operation. This information may be referred to as WUR duty-cycle parameter information. The duty-cycle parameter information may include information indicating a unit of the duty-cycle period. This information may be referred to as duty-cycle basic unit information. Further, the duty-cycle parameter information may include information indicating the minimum awake holding time of WURx. This information may be referred to as minimum wake-up time information. Further, the duty-cycle parameter information may include information indicating on duration of the duty cycle. This information may be referred to as duty-cycle on duration information. Further, the duty-cycle parameter information may include information indicating the interval of the duty cycle. This information may be referred to as duty-cycle interval information. Further, the duty-cycle parameter information may include information indicating the start time of the duty cycle. This information may be referred to as duty-cycle start time information. In this case, duty-cycle basic unit information and minimum wake-up time information may be configured by a response terminal. Duty-cycle on duration information, duty-cycle interval information, and duty-cycle start time information may be configured by negotiation of a response terminal and a request terminal. When the duty-cycle information indicates that the WURx duty-cycle operation is not used, the WUR mode element may not include duty-cycle parameter information.

The WUR mode element may include information indicating a maximum time for the wireless communication terminal to continuously maintain the PCR doze state. This information may be referred to as Max WUR Mode Period information. In this case, the wireless communication terminal may request the base wireless communication terminal to transmit the PCR frame successfully from the time of entering the PCR doze state, before the time indicated by the maximum WUR all period information elapses. When the base wireless communication terminal does not receive the PCR frame from the wireless communication terminal from the time when the wireless communication terminal enters the PCR doze state until the time indicated by the maximum WUR all period information elapses, the base wireless communication terminal may release association with the corresponding wireless communication terminal.

The WUR mode element may include information indicating an access category (AC) to be used when a wireless communication terminal accesses a channel to transmit a PS-poll frame as a WU response frame for receiving a wake-up frame. This information may be referred to as PS-poll AC information. In the existing wireless LAN, the PS-poll frame may be used by many wireless communication terminals to access the channel. Therefore, the AC of the PS-poll frame was configured with AC_BE with relatively low priority. When the PS-poll frame is used as a WU response frame, configuring AC of the PS-poll frame with AC_BE may be inefficient. Therefore, when a PS-poll frame is transmitted as a WU response frame, the AC used may be configured through a WUR mode element. In this case, when the wireless communication terminal receives a wake-up frame indicating the recipient of a unique WUR ID, the wireless communication terminal may be allowed to transmit the PS-poll frame as a WU response frame using AC indicated by the PS-poll AC information. In addition, when the wireless communication terminal receives a wake-up frame having a fixed length, the wireless communication terminal may be allowed to transmit the PS-poll frame as a WU response frame using AC indicated by the PS-poll AC information.

Figure 14:
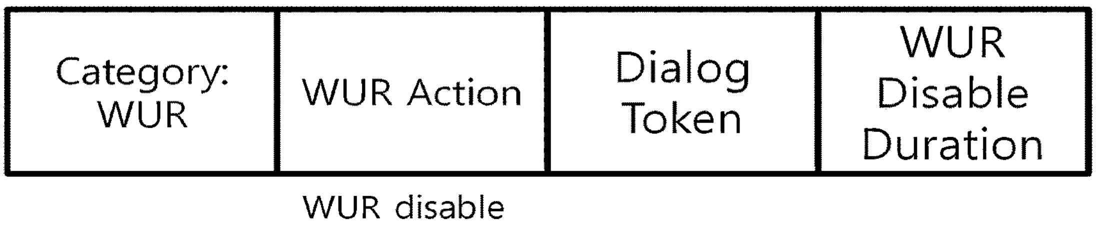
FIG. 14 shows a specific format of a WUR disable action frame for stopping a WUR-based power save operation according to an embodiment of the present invention.

FIG. 14 shows a specific format of a WUR disable action frame for stopping a WUR-based power save operation according to an embodiment of the present invention.

The base wireless communication terminal may stop performing the WUR-based power save operation by transmitting an action frame to the wireless communication terminal performing the WUR-based power save operation. In this case, the action frame may be referred to as a WUR disable action frame. The WUR disable action frame may have the same format as the specific format of the action frame described through FIG. 13(*a*). However, the WUR action field information may be referred to as a WUR disable action frame. In a specific embodiment, the WUR disable action frame may include information indicating a time when the WUR-based power save operation is stopped. This information may be referred to as WUR disable duration information. When the WUR-based power save operation is permanently stopped, the base wireless communication terminal may configure WUR disable duration information with a predetermined value. In addition, the base wireless communication terminal may transmit a wake-up frame to the wireless communication terminal in PCR doze state to wake up the wireless communication terminal, and then transmit a WUR disable action frame.

When the wireless communication terminal receives the WUR disable action frame, the wireless communication terminal may stop the WUR-based power save operation. Specifically, the wireless communication terminal may stop the WUR-based power save operation for a time indicated by the WUR disable duration information. When the time indicated by the WUR disable duration information elapses, the wireless communication terminal may automatically restart the WUR-based power save operation. When the WUR disable duration information indicates a predetermined value indicating that the WUR-based power save operation is permanently stopped, the wireless communication terminal may not be allowed to perform the WUR-based power save operation until the WUR-related parameters are configured again.

It has been described that the WUR ID may be changed in the above-described embodiments. An action frame related to a WUR ID change request will be described with reference to FIG. 13. The action frame may be referred to as a WUR ID action frame.

Figure 15:
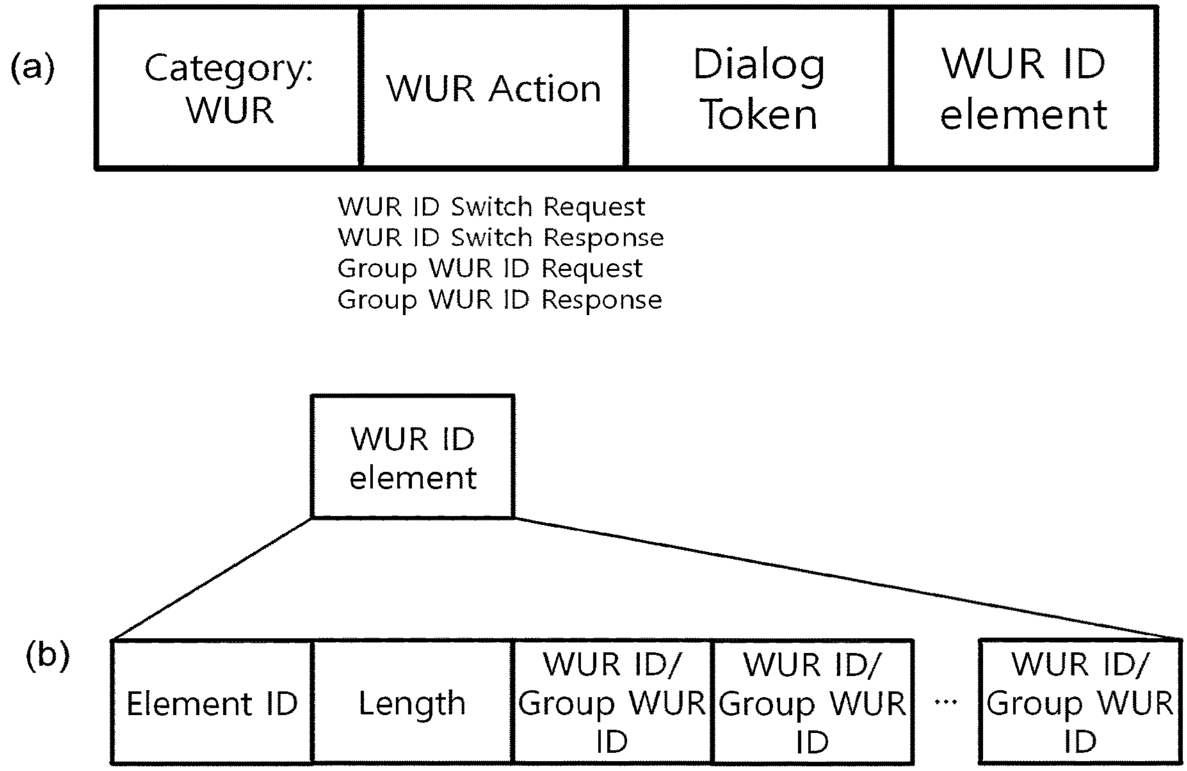
FIG. 15 shows a specific format of a WUR ID action frame according to an embodiment of the present invention.

FIG. 15 shows a specific format of a WUR ID action frame according to an embodiment of the present invention.

When the wireless communication terminal intends to change the WUR ID, the wireless communication terminal may transmit a WUR ID action frame to the base wireless communication terminal. Specifically, when the wireless communication terminal detects an attack from the outside while performing the WUR-based power save operation, the wireless communication terminal may request to change the WUR ID of the wireless communication terminal by transmitting a WUR ID action frame to the base wireless communication terminal through PCR. In addition, when the WUR ID is configured to be changed periodically in the process of configuring WUR operation-related parameters, the wireless communication terminal may request to change the WUR ID of the wireless communication terminal by transmitting a WUR ID action frame to the base wireless communication terminal through PCR.

When the wireless communication terminal requests to change the WUR ID of the wireless communication terminal, the WUR action information may be configured as a WUR ID Switch Request. Further, the WUR ID element may include information indicating the WUR ID to be changed. Further, the wireless communication terminal may request to change the group WUR ID of the wireless communication terminal by transmitting a WUR ID action frame to the base wireless communication terminal through PCR. In this case, the WUR action information may be configured as a group WUR ID Switch Request. In addition, the WUR ID element may include information indicating a group WUR ID to be changed. Further, the wireless communication terminal may request to change the WUR ID and the group WUR ID together by transmitting one WUR action frame. In this case, the WUR ID element may include information indicating the WUR ID of the wireless communication terminal and information indicating the group WUR ID.

When the base wireless communication terminal receives the WUR ID action frame from the wireless communication terminal requesting to change the WUR ID or the group WUR ID, the base wireless communication terminal may signal the changed WUR ID or group WUR ID by transmitting a WUR ID action frame to the wireless communication terminal. In this case, the base wireless communication terminal may configure WUR action information as a WUR ID switch response or a group WUR ID response. The WUR ID element of the WUR ID action frame transmitted by the base wireless communication terminal may have the same format as the WUR ID element of the WUR ID action frame transmitted by the wireless communication terminal. Further, the WUR ID element may include a WUR ID or a group WUR ID to be used by the wireless communication terminal.

Also, even when the wireless communication terminal does not request to change the WUR ID or the group WUR ID, the base wireless communication terminal may change the WUR ID or the group WUR ID of the wireless communication terminal by transmitting a WUR ID action frame to the wireless communication terminal. In this case, the base wireless communication terminal may configure WUR action information as a WUR ID switch response or a group WUR ID response. Specifically, when the base wireless communication terminal detects an external attack on the wireless communication terminal, even if the wireless communication terminal does not request to change the WUR ID or the group WUR ID, the base wireless communication terminal may change the WUR ID or the group WUR ID of the wireless communication terminal by transmitting a WUR ID action frame to the wireless communication terminal. Even if the wireless communication terminal did not request to change the WUR ID or the group WUR ID, when the base wireless communication terminal changes the WUR ID or the group WUR ID of the wireless communication terminal, the base wireless communication terminal may change all WUR IDs and group WUR IDs allocated to the corresponding wireless communication terminal. In this case, the WUR ID action frame may include a WUR ID/Group WUR ID field as many as all WUR IDs and group WUR IDs allocated to the corresponding wireless communication terminal. In addition, the base wireless communication terminal may insert a WUR ID into a first WUR ID/group WUR ID field among a plurality of WUR ID/group WUR ID fields.

In addition, when the group WUR ID is configured to be used in the WUR operation related parameter configuration process, the wireless communication terminal may request a group WUR ID allocation by transmitting a WUR ID action frame to the base wireless communication terminal before entering the PCR doze state. In this case, the corresponding WUR ID action frame may not include a WUR ID element. When the base wireless communication terminal receives a WUR ID action frame requesting group WUR ID allocation from the wireless communication terminal, the base wireless communication terminal may transmit an action frame indicating the group WUR ID allocated to the wireless communication terminal to the wireless communication terminal. In this case, the WUR ID element of the corresponding WUR ID action frame may include a group WUR ID assigned to the corresponding wireless communication terminal. In addition, the base wireless communication terminal may allocate a plurality of group WUR IDs to the wireless communication terminal. Accordingly, the WUR ID element of the WUR ID action frame may include a plurality of group WUR IDs assigned to the corresponding wireless communication terminal.

When the wireless communication terminal communicating with the base wireless communication terminal through PCR is out of the transmission coverage of the base wireless communication terminal, the wireless communication terminal may determine that the connection with the base wireless communication terminal is lost (connection lost). In this case, the wireless communication terminal may perform a scan procedure for association with a new BSS. Specifically, the wireless communication terminal may attempt to connect to the corresponding base wireless communication terminal based on the beacon frame transmitted by the new base wireless communication terminal. In the PCR doze state, the wireless communication terminal cannot receive the beacon frame transmitted by PCR. In addition, the wireless communication terminal cannot transmit any MAC frame through PCR unless turning on the PCR transceiver by receiving a wake-up frame or turning on the PCR transceiver for PCR transmission. Therefore, it may be difficult to determine whether the wireless communication terminal in the PCR doze state is outside the transmission coverage of the base wireless communication terminal. In addition, the wireless communication terminal may maintain the PCR doze state even though it is outside the transmission coverage of the base wireless communication terminal. For efficient operation of the wireless communication terminal, the base wireless communication terminal may transmit a WUR beacon frame periodically through WUR. This will be described with reference to FIG. 19.

Figure 16:
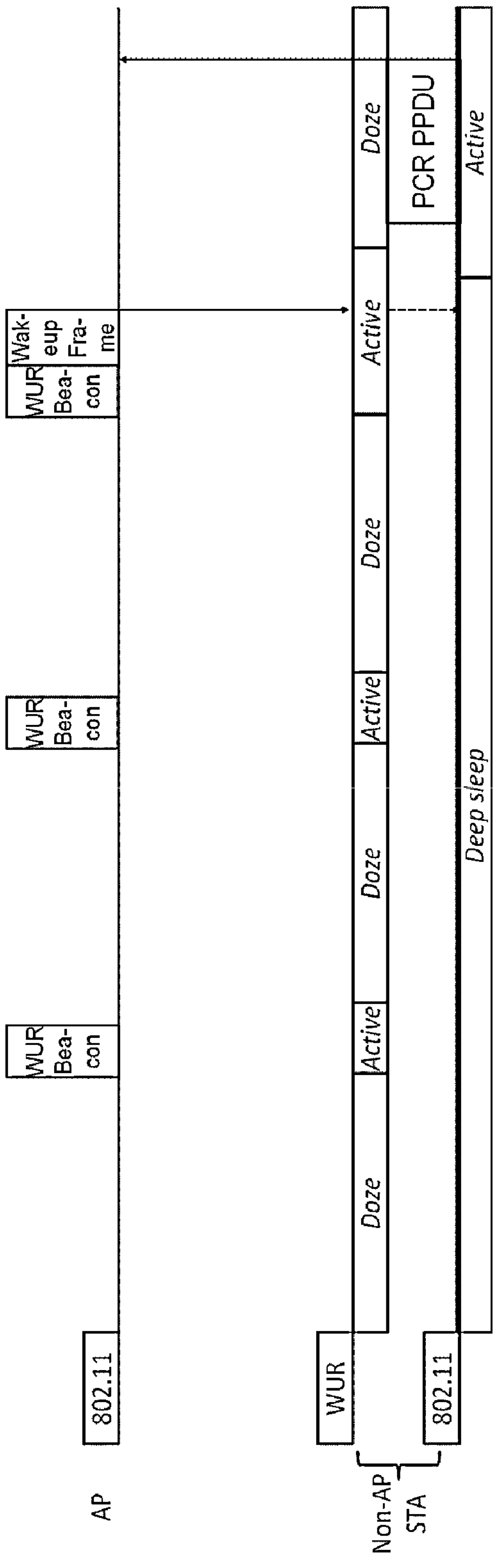
FIG. 16 shows an operation in which a wireless communication terminal receives a WUR beacon frame according to an embodiment of the present invention.

FIG. 16 shows an operation in which a wireless communication terminal receives a WUR beacon frame according to an embodiment of the present invention.

As described above, the WUR beacon frame is a type of WUR frame and may be transmitted through a WUR PPDU. The WUR beacon frame may include information on the TSF so that a wireless communication terminal in PCR doze state can perform accurate time synchronization. In addition, the WUR beacon frame may be transmitted periodically. In this case, the transmission period of the WUR beacon frame may be longer than the transmission period of the PCR beacon frame. In addition, the WUR beacon frame may not include the identifier of the intended recipient of the WUR beacon frame, and may include a TXID that identifies the base wireless communication terminal transmitting the WUR beacon frame. Specifically, the Address field of the WUR beacon frame may indicate the TXID of the base wireless communication terminal transmitting the WUR beacon frame. Further, even when the wireless communication terminal performs a WUR beacon frame, the wireless communication terminal may not turn on the PCR transceiver.

When the wireless communication terminal in PCR doze state has no data to transmit to the base wireless communication terminal, the wireless communication terminal may turn off WURx based on the WUR beacon frame transmission period. Specifically, when the PCR doze state wireless communication terminal has no data to be transmitted to the base wireless communication terminal, the wireless communication terminal may maintain the WURx to be turned on in the time period during which the WUR beacon frame is transmitted and turn off the WURx in the remaining time period. The operation of the wireless communication terminal is a WUR duty-cycle operation, and the operation mode of the wireless communication terminal may be referred to as a WUR duty-cycle mode. Also, a state in which the wireless communication terminal turns off WURx may be referred to as a WUR doze state or a deep sleep state. When the base wireless communication terminal has data to be transmitted through PCR to the wireless communication terminal in the WUR duty-cycle mode, the base wireless communication terminal may transmit a wake-up frame to the corresponding wireless communication terminal immediately after transmitting the WUR beacon frame. In addition, when the base wireless communication terminal has data to be transmitted through PCR to the wireless communication terminal of the WUR duty-cycle mode, the base wireless communication terminal may transmit a traffic indication map (TIM) indicating that there is data to be downlink-transmitted through the WUR beacon frame.

When the wireless communication terminal does not received the WUR beacon frame for a predetermined time, the wireless communication terminal may turn on the PCR transceiver. In this case, when the wireless communication terminal does not receive the PCR beacon frame from the base wireless communication terminal associated with the wireless communication terminal through PCR, the wireless communication terminal may perform a scanning operation. Specifically, the wireless communication terminal may transmit a probe request frame through PCR.

In the embodiment of FIG. 16, the AP periodically transmits a WUR beacon frame. In the WUR duty-cycle mode station, the WUR beacon frame maintains the WURx to be turned on according to the transmission period, and maintains the WUR doze state at other times. When the AP has data to transmit to the station through PCR, the AP transmits a wake-up frame to the station immediately after transmitting the WUR beacon frame. The station receives the wake-up frame and turns on the PCR transceiver.

The WUR beacon frame does not include individual information on the WUR service, but may include information on the TSF. When the base wireless communication terminal operates multiple BSS, it may be inefficient for the base wireless communication terminal to allocate a different TXID for each BSS and transmit a WUR beacon frame for each BSS. Therefore, the base wireless communication terminal may configure a representative TXID of multiple BSSIDs. The base wireless communication terminal may insert the configured representative TXID into the Address field of the WUR beacon frame of all BSSs operated by the base wireless communication terminal. In this case, the representative TXID may be the TXID of the transmitted BSS. Therefore, when the base wireless communication terminal transmits a WUR beacon frame to a non-transmitted BSS, the address field of the corresponding WUR beacon frame may be configured with the TXID of the transmitted BSS.

The base wireless communication terminal may not allocate a TXID to the non-transmitted BSS. When the TXID is not allocated to the non-transmitted BSS, a method of transmitting a broadcast WUR frame to a wireless communication terminal belonging to a non-transmitted BSS may be needed. The base wireless communication terminal may configure a wireless communication terminal belonging to an individual non-transmission BSS as a group identified by one group WUR ID. For this, a wireless communication terminal supporting multiple BSSIDs may be required to support one or more group WUR IDs.

In another specific embodiment, the base wireless communication terminal may allocate a TXID to the non-transmitted BSS. In addition, the base wireless communication terminal may signal the TXID of the transmitted BSS to the non-transmitted BSS through the WUR mode element. In this embodiment, when the base wireless communication terminal transmits a broadcast WUR frame to the wireless communication terminal belonging to the non-transmitted BSS, the base wireless communication terminal configures the address field of the corresponding WUR frame as the TXID of the corresponding non-transmitted BSS. In addition, when the wireless communication terminal belonging to the non-transmitted BSS receives a WUR beacon frame in which the Address field indicates the TXID of the transmitted BSSID, the wireless communication terminal can perform time synchronization based on the WUR beacon frame.

In another specific embodiment, the base wireless communication terminal may allocate a TXID to the non-transmitted BSS according to a predetermined rule. Specifically, the base wireless communication terminal may allocate the TXID to the non-transmitted BSS based on the TXID of the transmit BSS. In a specific embodiment, the base wireless communication terminal may configure the TXID of the non-transmitted BSS as a value obtained by adding a specific value to the TXID of the transmitted BSS. In this case, when the base wireless communication terminal signals the TXID, the base wireless communication terminal may signal the TXID of the transmitted BSS instead of the TXID of the non-transmitted BSS to the wireless communication terminal belonging to the non-transmitted BSS. In addition, the base wireless communication terminal may signal a specific value to be added to the TXID of the transmitted BSS using the bitmap of the TIM element transmitted through PCR. Specifically, a specific bit of the bitmap of the TIM element transmitted through PCR may indicate a predetermined value. In this embodiment, the wireless communication terminal belonging to the non-transmitted BSS may obtain a TXID of the non-transmitted BSS by adding a specific value to the TXID of the transmitted BSS.

Figure 17:
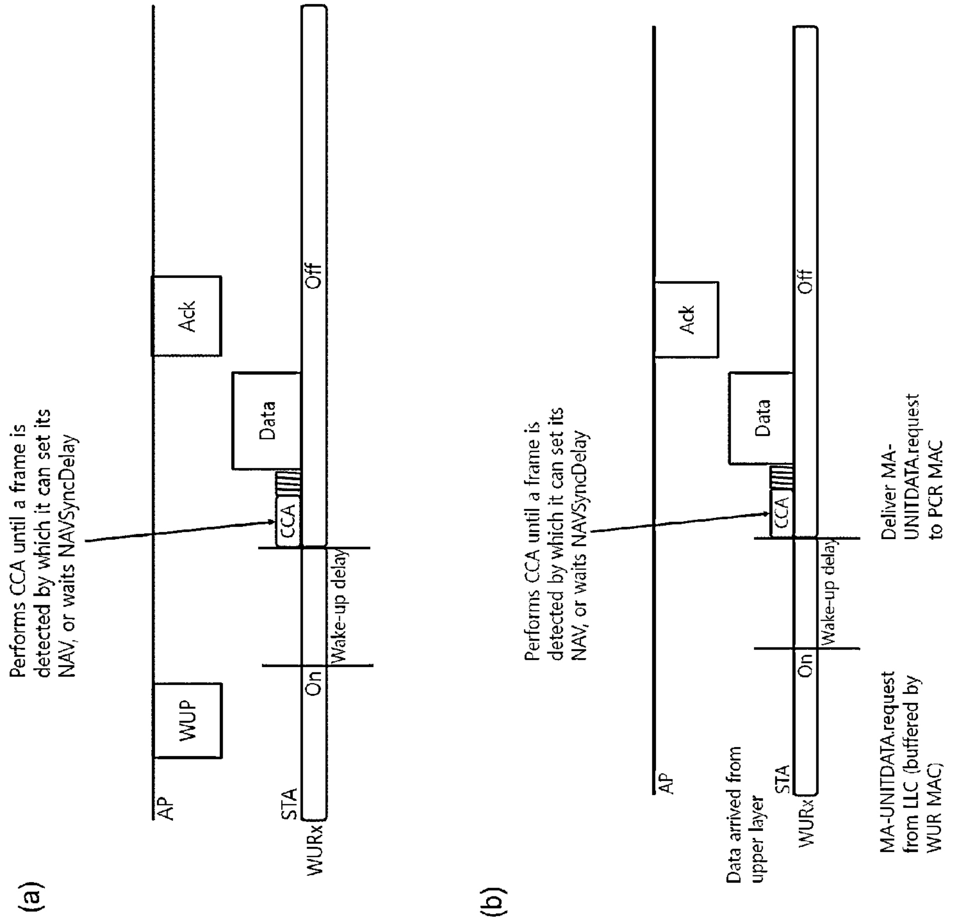
FIG. 17 shows an operation that a wireless communication terminal wakes up according to an embodiment of the present invention.

FIG. 17 shows an operation that a wireless communication terminal wakes up according to an embodiment of the present invention.

The wireless communication terminal in PCR doze state cannot detect the frame transmitted through PCR. Therefore, when the wireless communication terminal in the PCR doze state wakes up in the PCR doze state, the corresponding wireless communication terminal may access the channel without considering the hidden-node. Therefore, the wireless communication terminal may attempt to transmit after detecting a frame or PPDU capable of setting NAV after wake-up in the PCR doze state. In a specific embodiment, after wake-up in the PCR doze state, the wireless communication terminal may hold a transmission attempt until a frame capable of setting NAV is detected or a predetermined time elapses. In this case, the predetermined time may be referred to as NAVSyncDelay. For example, the wireless communication terminal may wake up in the PCR doze state, and then perform a clear channel assembly (CCA) until a predetermined time point, and then attempt transmission when frames capable of setting NAV are not detected up to a predetermined time point. The transmission attempt may indicate allocating the channel according to the channel access procedure.

In the embodiment of FIG. 17(*a*), the station receives a wake-up frame from the AP in the PCR doze state. Upon receiving the wake-up frame, the station turns on the PCR transceiver. The station may attempt to perform transmission after performing CCA when a frame capable of setting the NAV is received, or until the NAVSyncDelay elapses from the wake-up time.

A wireless communication terminal attempting to perform transmission after wake-up in the PCR doze state may need to perform a backoff operation according to an Enhanced Distributed Channel Access (EDCA) rule. In the case of the existing wireless LAN operation, the wireless communication terminal receives primitive, which is MA-UNITDATA.request, from the higher layer and starts the backoff operation according to the EDCA rules. A wireless communication terminal attempting to perform transmission after wake-up in the PCR doze state may receive a MA-UNITDATA.request from a higher layer by a WUR MAC layer operating separately from the PCR MAC layer. Therefore, the PCR MAC layer may not receive the MA-UNITDATA.request primitive. The WUR MAC layer may store the MA-UNITDATA.request primitive up to the time point at which the PCR transceiver is turned on, and deliver the MA-UNITDATA.request primitive to the PCR MAC layer. In another specific embodiment, there may be a MAC Service Access Point (SAP) connecting the PCR MAC layer and the WUR MAC layer. In this case, when the PCR MAC layer wakes up, MAC SAP may deliver MA-UNITDATA.request to the PCR MAC layer.

In the embodiment of FIG. 17(*b*), the station receives a wake-up frame from the AP in the PCR doze state. Upon receiving the wake-up frame, the station turns on the PCR transceiver. The WUR MAC layer of the station stores the MA-UNITDATA.request primitive until the time point at which the PCR transceiver is turned on, and transmits the MA-UNITDATA.request primitive to the PCR MAC layer of the station.

Figure 18:
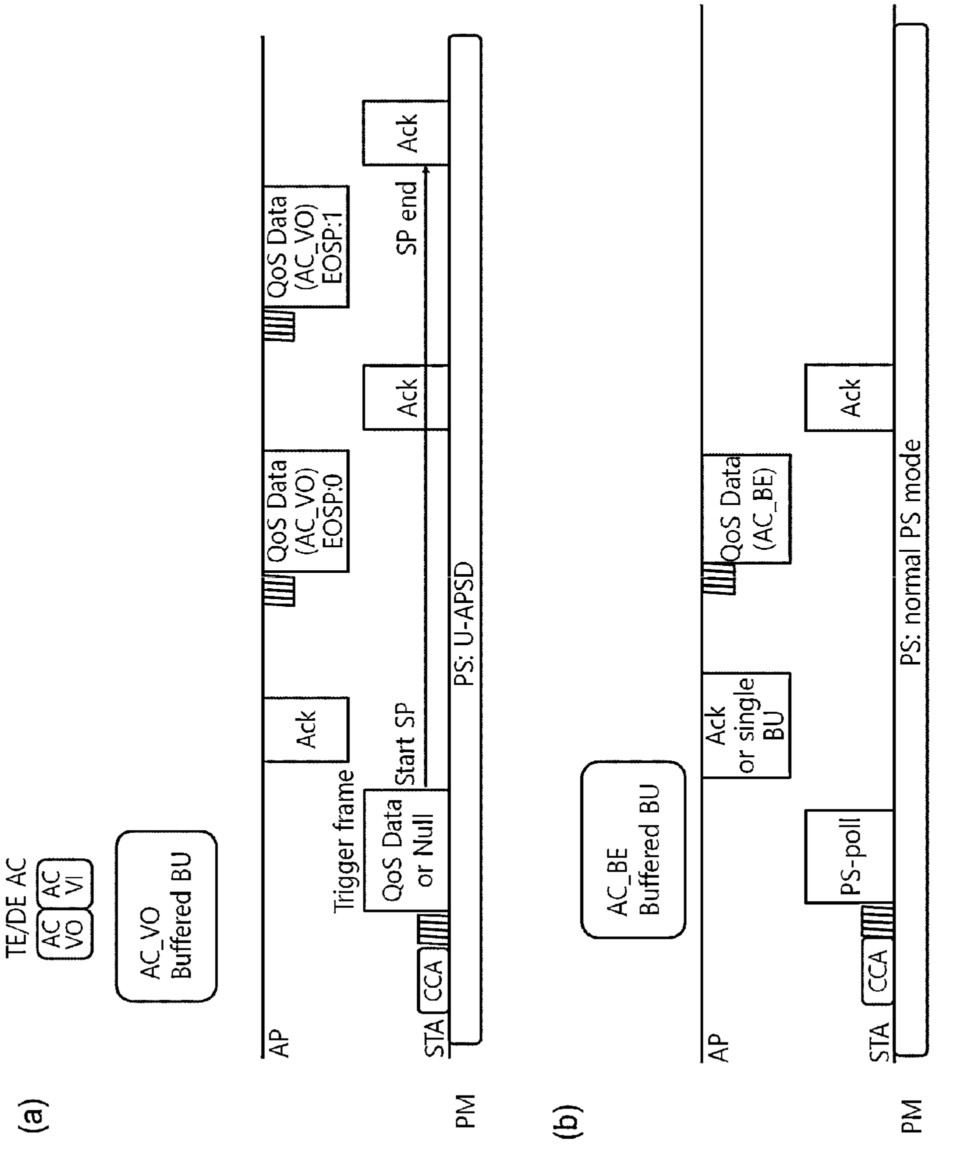
FIG. 18 shows a power save operation of a wireless communication terminal according to an embodiment of the present invention.

FIG. 18 shows a power save operation of a wireless communication terminal according to an embodiment of the present invention.

When a wireless communication terminal uses a power management function in a conventional wireless LAN, the terminal may operate in two modes, that is, an active mode and a power save (PS) mode. In the active mode, the wireless communication terminal always maintains an awake state. When the wireless communication terminal is in the doze state, since the wireless communication terminal cannot receive a frame transmitted by the base wireless communication terminal, the base wireless communication terminal must be able to determine whether the wireless communication terminal is in a power saving state. Therefore, the base wireless communication terminal may record in which mode among the active mode or the PS mode the wireless communication terminal connected to the base wireless communication terminal operates. For this, when the wireless communication terminal switches the mode of power management, the wireless communication terminal may signal a mode switch of power management by setting a value of a Power Management (PM) subfield of a Frame Control field of data transmitted by the wireless communication terminal.

After completion of the transmission sequence initiated by the wireless communication terminal, the wireless communication terminal may switch the power management mode. In addition, the wireless communication terminal may be limited to switching a power management mode using a transmission sequence requesting an immediate response. When the wireless communication terminal transmits data in which the PM subfield is set to 1 and receives an immediate response (ex: ACK frame, BA frame) to the corresponding data, the wireless communication terminal may start a power save mode operation. In addition, when the wireless communication terminal transmits data in which the PM subfield is set to 0 and receives an immediate response (ex: ACK frame, BA frame) to the corresponding data, the wireless communication terminal may start an active mode operation.

The existing wireless LAN standard defines a number of detailed protocols for power save mode operation. Among many detailed protocols, normal power save mode and unscheduled automatic power save delivery (U-APSD) are protocols that do not require a separate scheduling process.

In the power save mode, there may be no restrictions on the uplink transmission of the wireless communication terminal. In the power save mode, the wireless communication terminal may switch from the doze state to the awake state at any time and attempt uplink transmission. However, when the base wireless communication terminal performs downlink transmission, in the case where the wireless communication terminal is in a doze state, downlink transmission cannot be received. Therefore, both the normal power save mode and the U-APSD define the operation of the wireless communication terminal and the base wireless communication terminal based on the downlink transmission situation.

When the wireless communication terminal switches from the active mode to the PS mode in the normal power save mode, the base wireless communication terminal cannot directly transmit data to the wireless communication terminal. The base wireless communication terminal stores data to be transmitted to the wireless communication terminal in a buffer. Then, the base wireless communication terminal signals that there is data to be transmitted to the corresponding terminal using the TIM element of the beacon frame. The wireless communication terminal in PS mode receives a beacon frame in an awake state, and when the bit corresponding to the AID of the wireless communication terminal of the TIM element indicates that there is data to be transmitted, the wireless communication terminal may transmit the PS-poll frame to the base wireless communication terminal. In this case, the wireless communication terminal may perform EDCA backoff in the AC_BE class to transmit the PS-poll frame. The base wireless communication terminal receiving the PS-poll frame may transmit either an ACK frame or a DL Bufferable Unit (BU) to the wireless communication terminal. The wireless communication terminal receiving the ACK frame must maintain the awake state until the base wireless communication terminal transmits BU in the new Transmit Opportunity (TXOP). When the BU More Data field transmitted by the base wireless communication terminal is activated, the wireless communication terminal should transmit the PS-poll frame again. The wireless communication terminal needs to check the beacon frame every specified period of DTIM period.

Whether the U-APSD is used by the wireless communication terminal may be configured for each AC in the link setup step such as the (re) connection step. The AC of the wireless communication terminal using U-APSD is configured as a trigger-enabled AC. The corresponding AC of the base radio communication terminal is regarded as a delivery-enabled AC. The wireless communication terminal may not check the TIM element for AC corresponding to the trigger-enabled AC. The wireless communication terminal may transmit a trigger frame at any time point to open a service period and trigger DL buffered BU transmission. In this case, the trigger frame is one of QoS data or null frames transmitted from the trigger-enabled AC. A service period for a corresponding wireless communication terminal is formed from a time point at which an immediate response to a trigger frame transmitted by the wireless communication terminal is received. In the corresponding service period, the base wireless communication terminal may transmit the buffered BU. Therefore, the wireless communication terminal must maintain an awake state from the BU transmitted by the base wireless communication terminal to a time point at which an End Of Service Period (EOSP) is activated or an end time point of a corresponding service period. When the wireless communication terminal uses U-APSD for some AC, whether there is a buffered BU of the AC is not indicated by the TIM. Only the presence of a buffered BU of AC without U-APSD is displayed in the TIM. Therefore, the wireless communication terminal should check the TIM to receive the buffered BU of AC that does not use the U-APSD, and must follow the operation of the normal power save mode.

In the embodiment of FIG. 18(*a*), the station receives data corresponding to AC_VO and AC_VI using U-APSD. The station starts a service period by transmitting a trigger frame to the AP. The station receives an ACK frame for the trigger frame from the AP. The AP transmits QoS data corresponding to AC_VO and QoS data corresponding to AC_VI to the station. The station remains awake until the service period ends.

In the embodiment of FIG. 18(*b*), the station receives data corresponding to AC_BE through the normal PS mode. The station receives the beacon frame from the AP and checks that the bit of the TIM corresponding to the AID of the station is activated. The station transmits a PS-poll frame to the AP, and receives a BU or ACK frame from the AP. When the station receives the ACK frame for the PS-poll frame, the awake state is maintained until QoS data is received from the AP. Upon receiving the QoS data, the station may transmit an ACK frame and enter the doze state again.

Figure 19:
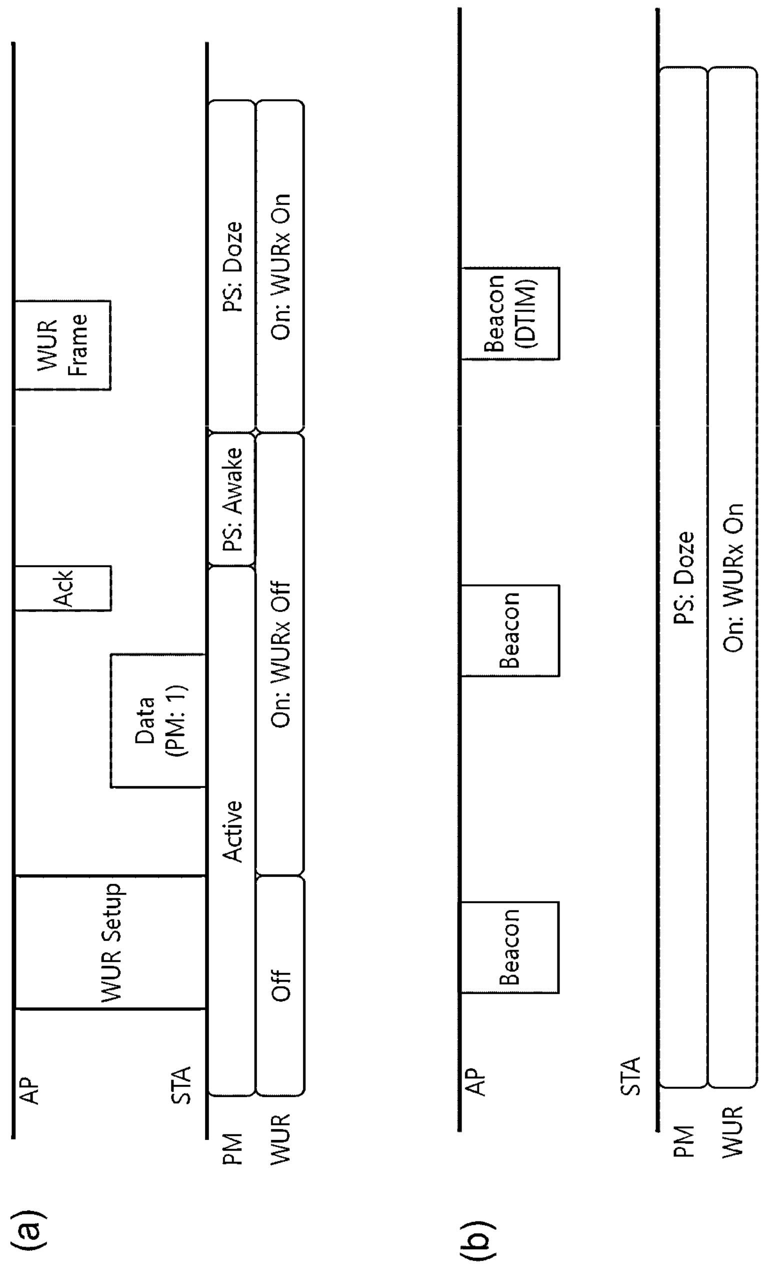
FIG. 19 shows an operation in which a wireless communication terminal interworking a WUR-based power save mode and a general power save mode according to an embodiment of the present invention.

FIG. 19 shows an operation in which a wireless communication terminal interworking a WUR-based power save mode and a general power save mode according to an embodiment of the present invention.

It is necessary to operate the mode conversion so that the power management mode of the wireless LAN does not collide with the WUR-based power save mode. For this, when the WUR mode is activated, it may be defined as indicating that the WURx is in an operational state. In addition, WURx may be regulated to comply with power save mode conversion. Specifically, even if the WUR mode is activated, when the wireless communication terminal is in the active mode, the wireless communication terminal cannot use WURx. In addition, when the wireless communication terminal is in the PS mode and the wireless communication terminal enters the doze state, the wireless communication terminal may use WURx.

The wireless communication terminal in the power save mode may receive a wake-up frame through WUR even when entering the doze state. Therefore, the base wireless communication terminal may induce data reception of the wireless communication terminal using a wake-up frame. Therefore, the wireless communication terminal that operates in the power save mode and that is in the activated WUR mode may not enter the awake state periodically to receive the beacon frame. Specifically, the wireless communication terminal operating in the normal PS mode and the U-APSD may not enter the awake state periodically to receive the beacon frame. This is because the base wireless communication terminal configures the service period when protocols such as WNM Sleep mode and Target Wake Time (TWT) are used. In addition, a DMG wireless communication terminal operating in the 60 GHz band or a wireless communication terminal of the 802.11ay standard may also use a beacon frame of a different form from the existing beacon frame. Accordingly, the wireless communication terminal may enter the awake state periodically to receive the beacon frame.

In the embodiment of FIG. 19, the station operates in a power save mode. As shown in FIG. 19(*a*), the station configures AP and WUR operation-related parameters. Then, the station turns off the PCR transceiver and turns on the WURx. In the embodiment of FIG. 19(*b*), since the WURx is turned on, the station does not enter the awake state periodically in order to receive the beacon frame.

The WUR duty-cycle operation of the wireless communication terminal will be described in detail with reference to FIGS. 20 to 21.

Figure 20:
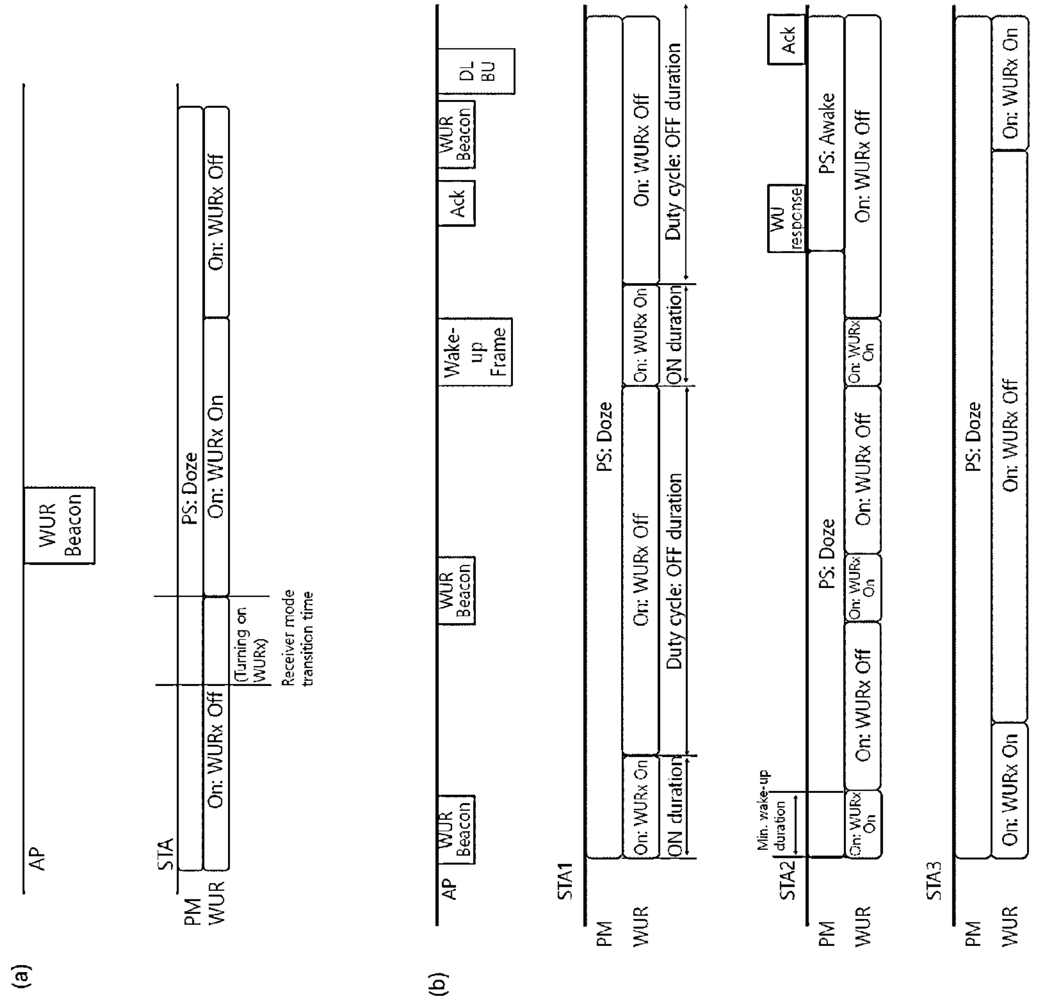
FIG. 20 shows a WUR duty-cycle operation of a wireless communication terminal according to an embodiment of the present invention.

FIG. 20 shows a WUR duty-cycle operation of a wireless communication terminal according to an embodiment of the present invention.

As described above, the wireless communication terminal may designate the duty-cycle of the WURx, thereby maintaining the WURx in the turned on state in negotiation with the base wireless communication terminal. In addition, in the off-duration, the wireless communication terminal can maintain both the PCR transceiver and the WURx in a turn-off state. The wireless communication terminal may maintain the duty-cycle in the WUR-based power save mode. In the embodiment of FIG. 20(*a*), the station performs a WUR duty-cycle operation. When the AP transmits the WUR beacon-frame, the station maintains on duration to receive the WUR beacon frame. Since it takes some time for the station to turn on WURx, the station may transmit a turn-on command to the WURx before starting the on duration in consideration of the time when the WURx is turned on.

In addition, the base wireless communication terminal and the wireless communication terminal may exchange information on duty-cycle parameters. This is because the base wireless communication terminal may transmit the WUR frame to the wireless communication terminal in the on duration. Specifically, the wireless communication terminal and the base wireless communication terminal may exchange information on duty-cycle parameters using the WUR mode element. Information on duty-cycle parameters may include at least one of the above-described duty-cycle basic unit information, minimum wake time information, duty-cycle on duration information, duty-cycle interval information, and duty-cycle start time information. The duty-cycle on duration may be greater than or equal to the minimum wake time.

The period of the duty-cycle may be different for each wireless communication terminal. The duty-cycle period may be configured in multiples of the basic unit. In this case, the basic unit may be determined by the base wireless communication terminal. In another specific embodiment, the basic unit may be a predetermined value. In addition, the basic unit may be configured based on the transmission period of the WUR beacon frame. Since the wireless communication terminal receives the WUR beacon frame according to the duty-cycle period, it may not receive all the WUR beacon frames transmitted by the base wireless communication terminal. In addition, since the period of the duty-cycle may be different for each wireless communication terminal, in order to receive the corresponding WUR beacon frame each time a WUR beacon frame is transmitted, the set of wireless communication terminals maintaining on duration may vary.

In the on duration that the wireless communication terminal is expected to receive the WUR beacon frame, when a WUR frame transmitted to another wireless communication terminal or a corresponding wireless communication terminal is received, the wireless communication terminal may consider that the WUR beacon frame is received.

In the embodiment of FIG. 20(*b*), the first station STA1, the second station STA2, and the third station STA3 operate in the WUR duty-cycle mode. The duty-cycle periods of the first station STA1, the second station STA2, and the third station STA3 are all different. When the AP transmits the first WUR beacon frame, the first station STA1, the second station STA2, and the third station STA3 receive the WUR beacon frame. When transmitting the second WUR beacon frame, the second station STA2 receives the WUR beacon frame. When transmitting the third WUR beacon frame, the third station STA3 receives the WUR beacon frame. Further, when the AP transmits a wake-up frame to the second station STA2, the first station STA1 maintains on duration. The first station STA2 regards the wake-up frame transmitted to the second station STA2 as a WUR beacon frame.

Figure 21:
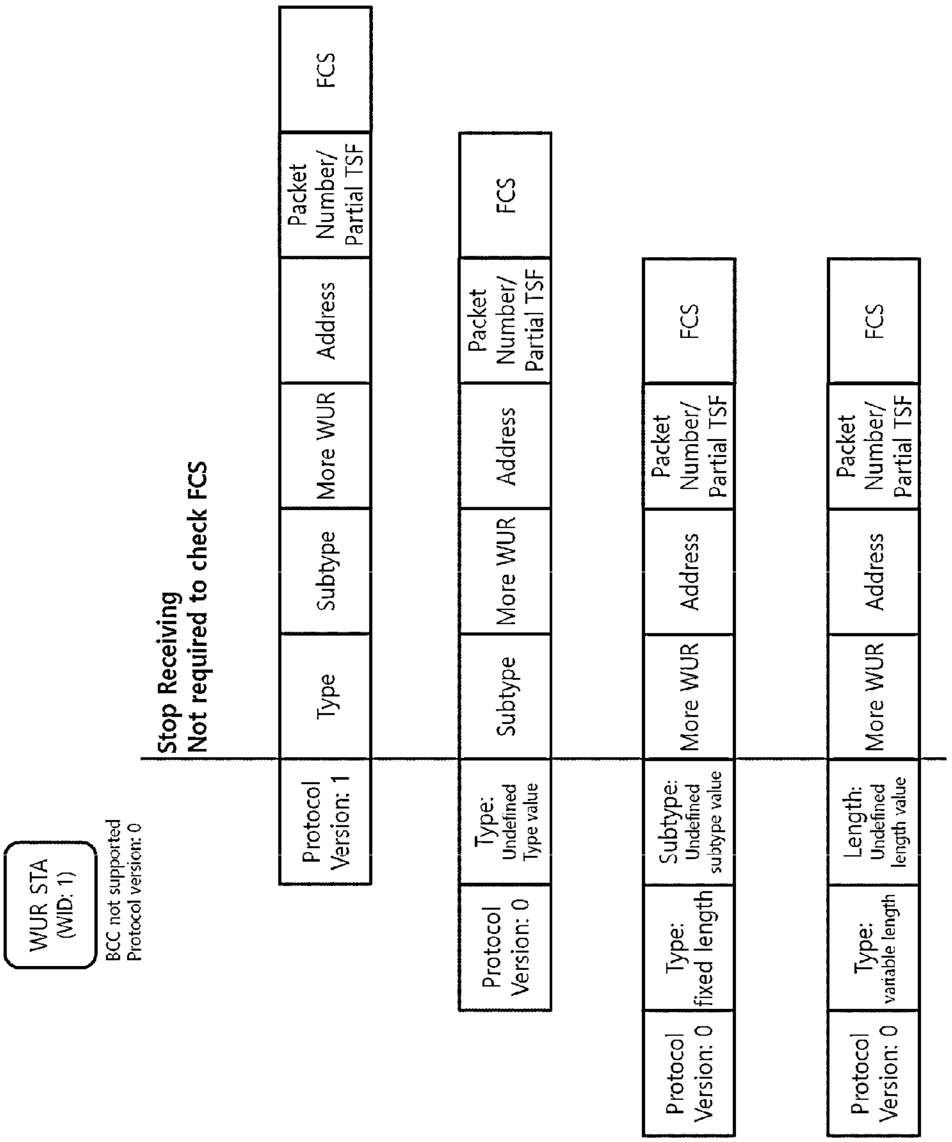
FIG. 21 shows that a wireless communication terminal according to an embodiment of the present invention operates according to a More WUR field during a WUR duty-cycle operation.

FIG. 21 shows that a wireless communication terminal according to an embodiment of the present invention operates according to a More WUR field during a WUR duty-cycle operation.

The base wireless communication terminal may signal to the wireless communication terminal that no further WUR frames are transmitted during the corresponding on duration. Information indicating that no further WUR frames are transmitted during the on duration may be referred to as no-more WUR frame on duration information. Specifically, the base wireless communication terminal may transmit the no-more WUR frame on duration information to the wireless communication terminal by transmitting a WUR frame in which the More WUR field is disabled to the wireless communication terminal. In this case, the fact that the More WUR field is disabled may indicate that the value of the corresponding field is 0. Further, the wireless communication terminal may transmit the no-more WUR frame on duration information to the wireless communication terminal by transmitting a WUR frame in which the sub-type of the fixed-length WUR format is a duty-cycle end to the wireless communication terminal. In this case, the base wireless communication terminal may insert an identifier of the base wireless communication terminal into the Address field of the WUR frame. In addition, the base wireless communication terminal can insert PTSF information into the Type depend Control field of the WUR frame. In addition, when there is no data to transmit until the end of the on duration to the wireless communication terminal in on duration at the time point of transmitting the WUR frame, the base wireless communication terminal may transmit a WUR frame signaling no-more WUR frame on duration information.

When the wireless communication terminal receives the WUR frame signaling the no-more WUR frame on duration information, the wireless communication terminal may determine that the WUR frame will not be transmitted to the wireless communication terminal until the next on duration. When the wireless communication terminal receives the WUR frame signaling the no-more WUR frame on duration information, the wireless communication terminal may turn off WURx before the corresponding on duration ends.

In a specific embodiment, even if the wireless communication terminal receives a WUR frame signaling no-more WUR frame on duration information, the wireless communication terminal may maintain the WURx to be turned on for a minimum awake holding time. Even when the wireless communication terminal receives a wake-up frame or there is data to be uplink-transmitted to the wireless communication terminal, the wireless communication terminal can maintain the WURx to be turned on for a minimum awake holding time. In this case, the wireless communication terminal may turn on the PCR transceiver in advance and start an uplink transmission sequence after a minimum awake holding time elapses.

In another specific embodiment, the base wireless communication terminal may signal that the WUR frame is not transmitted until the next WUR beacon frame is transmitted to the wireless communication terminal. Information indicating that the WUR frame is not transmitted until the next WUR beacon frame is transmitted may be referred to as no-more WUR frame beacon period information. Specifically, the base wireless communication terminal may signal no-more WUR frame beacon period information to the wireless communication terminal by transmitting a WUR frame in which the More WUR field is disabled to the wireless communication terminal. Further, the wireless communication terminal may signal the no-more WUR frame beacon period information to the wireless communication terminal by transmitting a WUR frame in which the sub-type of the fixed-length WUR format is a duty-cycle end to the wireless communication terminal. In this case, the base wireless communication terminal may insert an identifier of the base wireless communication terminal into the Address field of the WUR frame. In addition, the base wireless communication terminal can insert PTSF information into the Type depend Control field of the WUR frame. In addition, when there is no data to be transmitted until the next WUR beacon frame is transmitted to all wireless communication terminals operating in the WUR mode as well as the wireless communication terminal operating in duration on the time point for transmitting the WUR frame, the base wireless communication terminal may transmit a WUR frame signaling no-more WUR frame beacon period information.

When the wireless communication terminal receives the WUR frame signaling the no-more WUR frame beacon period information, and the on duration of the wireless communication terminal before the next WUR beacon frame transmission time point ends, the wireless communication terminal may perform an off duration operation until a next on duration start time point.

When the wireless communication terminal receives the WUR frame signaling the no-more WUR frame beacon period information, and the on duration of the wireless communication terminal after the next WUR beacon frame transmission time point ends, the wireless communication terminal may perform an off duration operation until the next WUR beacon frame transmission time point. In this case, the wireless communication terminal may perform an on duration operation from the next WUR beacon frame transmission time point.

In addition, when the wireless communication terminal not performing the duty-cycle operation receives the WUR frame signaling the no-more WUR frame beacon period information, the wireless communication terminal may turn off the WURx until the next WUR beacon frame transmission time point. Through these operations, the wireless communication terminal can increase power efficiency.

When the wireless communication terminal detects a signal determined to be a wireless LAN Physical Layer Processing Data Unit (PPDU) in a typical wireless LAN, if there is no error in the preamble of the PPDU, the wireless communication terminal receives the corresponding signal until the end of the PPDU. After receiving the corresponding signal to the end of the PPDU, the wireless communication terminal performs decoding on channel coding to deliver a bitstream to the MAC layer. The wireless communication terminal compares the FCS value at the MAC layer to determine whether an error is included in the bitstream, and obtains a MAC frame included in the PPDU. In this way, obtaining information from the PPDU after the wireless communication terminal receives the entire PPDU is that since the bit stream of the PPDU is encoded based on the convolutional code, decoding cannot be performed until the entire PPDU is received. Also, this is because the wireless communication terminal needs to perform additional operations such as network allocation vector (NAV) setting by obtaining information related to the BSS and information related to a NAV from a MAC frame in which the wireless communication terminal is not a recipient.

In the case where Binary Convolution Code (BCC) is not applied when encoding WUR PPDU, only Manchester code and repetition code can be applied when encoding the WUR PPDU. Therefore, the wireless communication terminal can sequentially decode information included in the WUR PPDU even if the entire WUR PPDU is not received. Specifically, the wireless communication terminal may sequentially receive a plurality of fields of the WUR frame included in the WUR PPDU. In addition, when the wireless communication terminal communicates using WUR, the wireless communication terminal does not need to set NAV or the like in consideration of the transmission time of another wireless communication terminal. When the WUR frame is a frame format supported by the wireless communication terminal, and the wireless communication terminal is an intended recipient of the WUR frame, the wireless communication terminal needs to determine whether the WUR frame is valid through the FCS value. For example, when the recipient of the WUR beacon frame includes a wireless communication terminal, the wireless communication terminal needs to determine whether the WUR beacon frame is valid through the FCS value. Meanwhile, a wireless communication terminal other than the intended recipient of the WUR frame does not need to determine the validity of the WUR frame through the FCS value of the WUR frame. In addition, a wireless communication terminal that does not support the WUR frame format included in the received WUR PPDU does not need to determine the validity of the corresponding WUR frame through the FCS value of the corresponding WUR frame. Therefore, the wireless communication terminal may stop receiving the WUR part based on the information of the sequentially decoded WUR frame and restart the CCA. In order to stop receiving the WUR part, the wireless communication terminal may transmit PHY.CCARESET.request from the MAC layer of the WUR receiver to the physical layer. In this case, PHY.CCARESET.request stops receiving the radio signal from the WUR receiver and requests that the WUR receiver restart the CCA. In addition, the wireless communication terminal may not determine the validity of the WUR frame through the FCS value. Through this operation, the wireless communication terminal can reduce power consumption.

The wireless communication terminal may stop receiving the WUR frame based on information of the sequentially decoded WUR frame. Such an operation may be applied when the wireless communication terminal does not support receiving BCC-encoded WUR PPDU or is configured to not use BCC encoding in the WUR operation-related parameter configuration process. In addition, such an operation may be applied when the preamble of the WUR PPDU indicates that BCC encoding is not used.

When the WUR frame is determined to be a WUR frame that is not supported by the wireless communication terminal while the wireless communication terminal receives the WUR part, the wireless communication terminal may stop receiving the corresponding WUR frame. Specifically, when it is determined that the WUR frame is a WUR frame that is not supported by the wireless communication terminal, the wireless communication terminal may stop receiving the WUR frame. In a specific embodiment, the wireless communication terminal may stop receiving the WUR frame and restart CCA for the WUR signal. In this case, the wireless communication terminal may transmit the PHY layer PHY.CCARESET.request in the MAC layer. In this case, PHY.CCARESET.request stops receiving the radio signal from the WUR receiver and requests that the WUR receiver restart the CCA. In addition, when it is determined that the WUR frame is a WUR frame that is not supported by the wireless communication terminal, the wireless communication terminal may not determine the validity of the corresponding WUR frame through the FCS value. Specifically, the wireless communication terminal may not check the field value of the WUR frame. These operations will be described in detail with reference to FIGS. 22 to 23.

Figure 22:
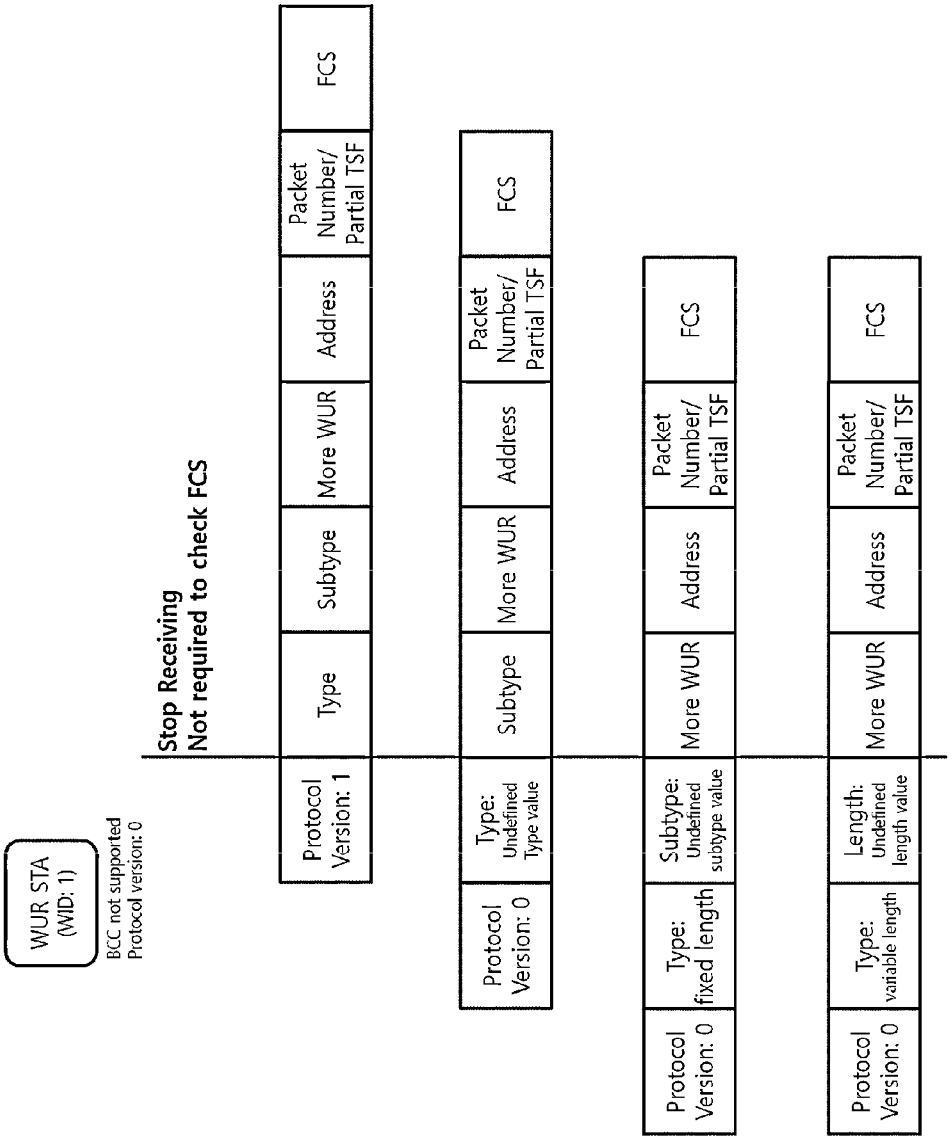
FIG. 22 shows a method for a wireless communication terminal to receive a WUR frame according to whether a wireless communication terminal supports receiving a WUR frame according to an embodiment of the present invention.

FIG. 22 shows a method for a wireless communication terminal to receive a WUR frame according to whether a wireless communication terminal supports receiving a WUR frame according to an embodiment of the present invention.

When the Frame Control field of the MAC header of the WUR frame indicates that the protocol version of the corresponding WUR frame is a protocol version not supported by the wireless communication terminal, the wireless communication terminal may stop receiving the corresponding WUR frame. This is because if the protocol version of the WUR frame is a protocol version that is not supported by the wireless communication terminal, it is highly likely that the wireless communication terminal cannot successfully decode the WUR frame even when the WUR frame is received. Also, a field indicating the protocol version of the WUR frame may be referred to as a Protocol Version field. The protocol version not supported by the wireless communication terminal may include a protocol version not supported by a standard that defines communication using WUR.

In addition, when the Frame Control field of the MAC header of the WUR frame indicates that the type or subtype of the corresponding WUR frame is a type or subtype that is not supported by the wireless communication terminal, the wireless communication terminal may stop receiving the corresponding WUR frame. This is because if the protocol version of the WUR frame is a type or subtype that is not supported by the wireless communication terminal, it is highly likely that the wireless communication terminal cannot successfully decode the WUR frame even when the WUR frame is received. Also, a field indicating the type of the WUR frame may be referred to as a Type field. Also, a field indicating a subtype of the WUR frame may be referred to as a Subtype field. The type or subtype not supported by the wireless communication terminal may include a type or subtype not supported by a standard which defines communication using WUR.

In addition, when the length field of the MAC header of the WUR frame indicates that the length of the corresponding WUR frame is a length not supported by the wireless communication terminal, the wireless communication terminal may stop receiving the corresponding WUR frame. This is because when the length of the WUR frame is a length that is not supported by the wireless communication terminal, there is a high possibility that the wireless communication terminal cannot successfully decode the WUR frame even when the WUR frame is received. The length not supported by the wireless communication terminal may include a length not supported by the standard for defining communication using WUR.

In the embodiment of FIG. 22, the station WUR STA receives the WUR frame. The station WUR STA does not support receiving BCC encoded WUR PPDU. In addition, the station WUR STA supports receiving a WUR frame with a protocol version of 0. Therefore, when the Protocol Version field of the WUR frame indicates that the protocol version is 1, the station WUR STA stops receiving the WUR frame. In addition, when the Type field of the WUR frame indicates a type not defined in a standard for defining communication using WUR, the station WUR STA stops receiving the WUR frame. In addition, when the Subtype field of the WUR frame indicates a subtype not defined in a standard for defining communication using WUR, the station WUR STA stops receiving the WUR frame. In addition, when the Length field of the WUR frame indicates a length value not defined in a standard for defining communication using WUR, the station WUR STA stops receiving the WUR frame.

Figure 23:
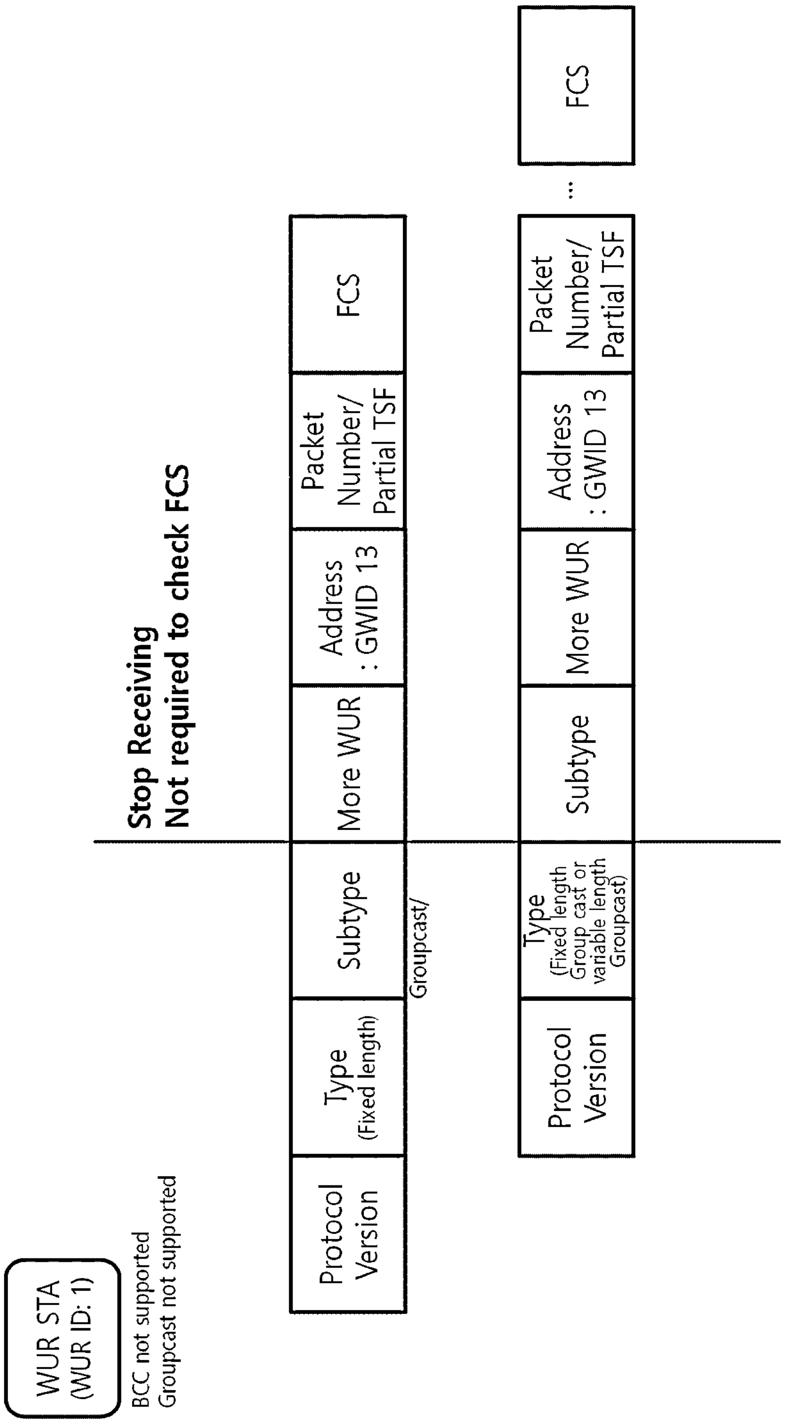
FIG. 23 shows a method of receiving a WUR frame according to whether a wireless communication terminal supports reception of a WUR frame format for groupcast when the WUR frame received by the wireless communication terminal according to an embodiment of the present invention is a WUR frame for groupcast

FIG. 23 shows a method of receiving a WUR frame according to whether a wireless communication terminal supports reception of a WUR frame format for groupcast when the WUR frame received by the wireless communication terminal according to an embodiment of the present invention is a WUR frame for groupcast.

The wireless communication terminal may not support receiving the WUR frame for groupcast. In addition, even when the wireless communication terminal supports receiving the WUR frame for groupcast, it may be determined that the WUR frame for groupcast is not used in the process of configuring WUR operation related parameters. When it is any one of these cases and the wireless communication terminal receives the groupcast WUR frame, the wireless communication terminal may stop receiving the WUR frame. Specifically, when the Type field of the WUR frame indicates a WUR frame for groupcast, the wireless communication terminal may stop receiving the WUR frame. In the embodiment of FIG. 23, the station WUR STA does not support receiving a groupcast WUR frame. When the station WUR STA determines that the Type field or Subtype field of the WUR frame indicates a WUR frame for groupcast, the station WUR STA stops receiving the WUR frame.

Figure 24:
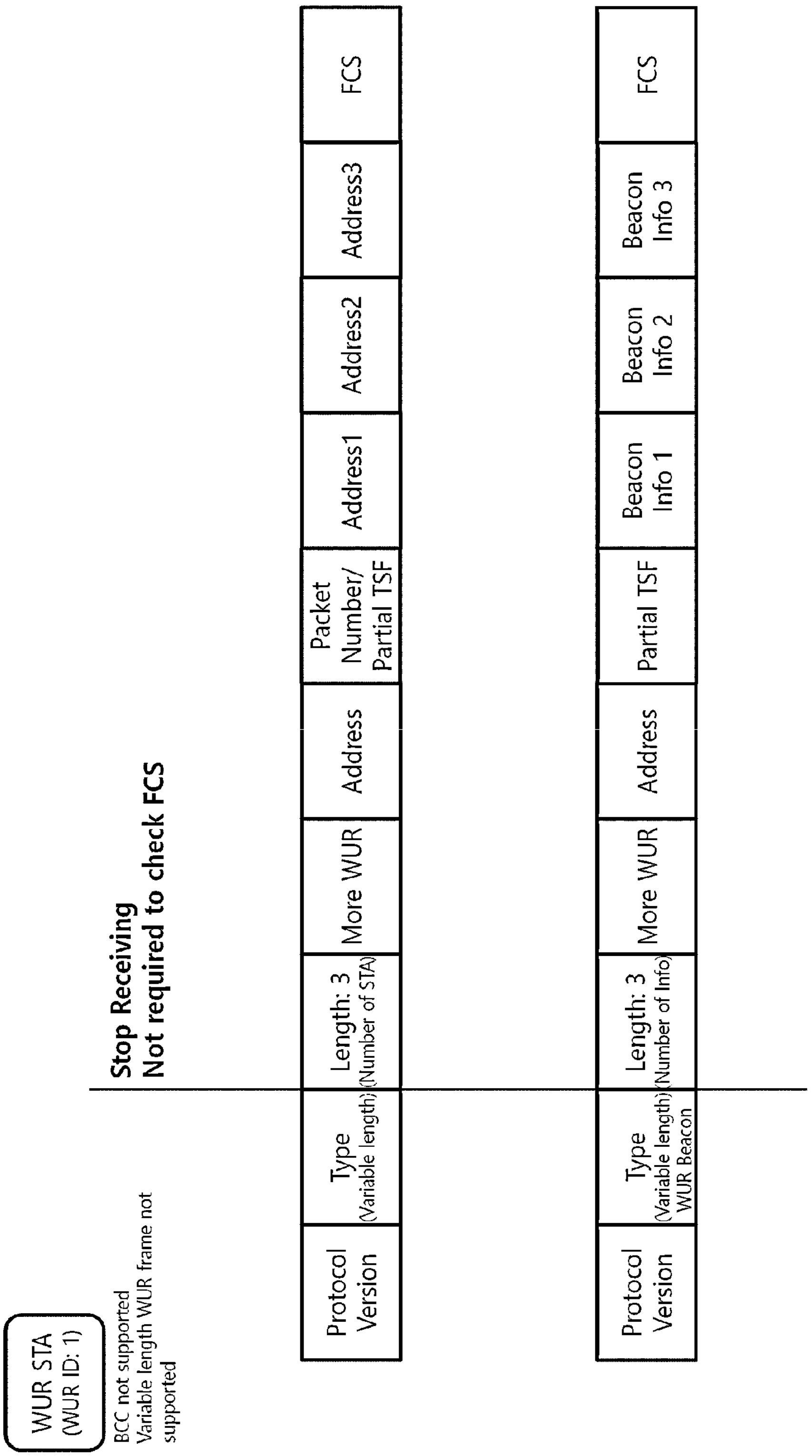
FIG. 24 shows a method of receiving a WUR frame according to whether a wireless communication terminal supports reception of a WUR frame format having a variable length when the WUR frame received by the wireless communication terminal according to an embodiment of the present invention corresponds to a WUR frame format having a variable length.

FIG. 24 shows a method of receiving a WUR frame according to whether a wireless communication terminal supports reception of a WUR frame format having a variable length when the WUR frame received by the wireless communication terminal according to an embodiment of the present invention corresponds to a WUR frame format having a variable length.

The wireless communication terminal may not support the WUR frame format having a variable length. In this case, when the wireless communication terminal receives a WUR frame corresponding to the variable-length WUR frame format, the wireless communication terminal may stop receiving the WUR frame. Specifically, when the Type field of the WUR frame indicates that the WUR frame corresponds to a WUR frame format having a variable length, the wireless communication terminal may stop receiving the WUR frame. In addition, when the Type field of the WUR frame indicates that the WUR frame corresponds to a WUR beacon frame having a variable length, the wireless communication terminal may stop receiving the WUR frame.

In the embodiment of FIG. 24, the station WUR STA does not support reception of a WUR frame corresponding to a WUR frame format having a variable length. When the station WUR STA determines that the Type field of the WUR frame indicates a WUR frame format having a variable length, the station WUR STA stops receiving the WUR frame. When the station WUR STA determines that the Type field of the WUR frame indicates a WUR beacon frame having a variable length, the station WUR STA stops receiving the WUR frame.

When the wireless communication terminal determines that the intended recipient of the corresponding WUR frame is not the wireless communication terminal while receiving the WUR part, the wireless communication terminal may stop receiving the corresponding WUR frame. Specifically, when the WUR frame does not indicate the WUR ID of the wireless communication terminal as a recipient of the WUR frame or the group WUR ID of the group included in the WUR frame, it may be determined that the intended recipient of the WUR frame is not a wireless communication terminal. When the wireless communication terminal determines that the intended recipient of the WUR frame is not a wireless communication terminal, the wireless communication terminal may stop receiving the WUR frame. In a specific embodiment, the wireless communication terminal may stop receiving the WUR frame and restart CCA for the WUR signal. In this case, the wireless communication terminal may transmit the PHY layer PHY.CCARESET.request in the MAC layer. In this case, PHY.CCARESET.request stops receiving the radio signal from the WUR receiver and requests that the WUR receiver restart the CCA. In addition, when the wireless communication terminal determines that the intended recipient of the WUR frame is not the wireless communication terminal, the wireless communication terminal may not determine the validity of the corresponding WUR frame through the FCS value. Specifically, the wireless communication terminal may not check the field value of the WUR frame. These operations will be described in detail with reference to FIGS. 25 to 29.

Figure 25:
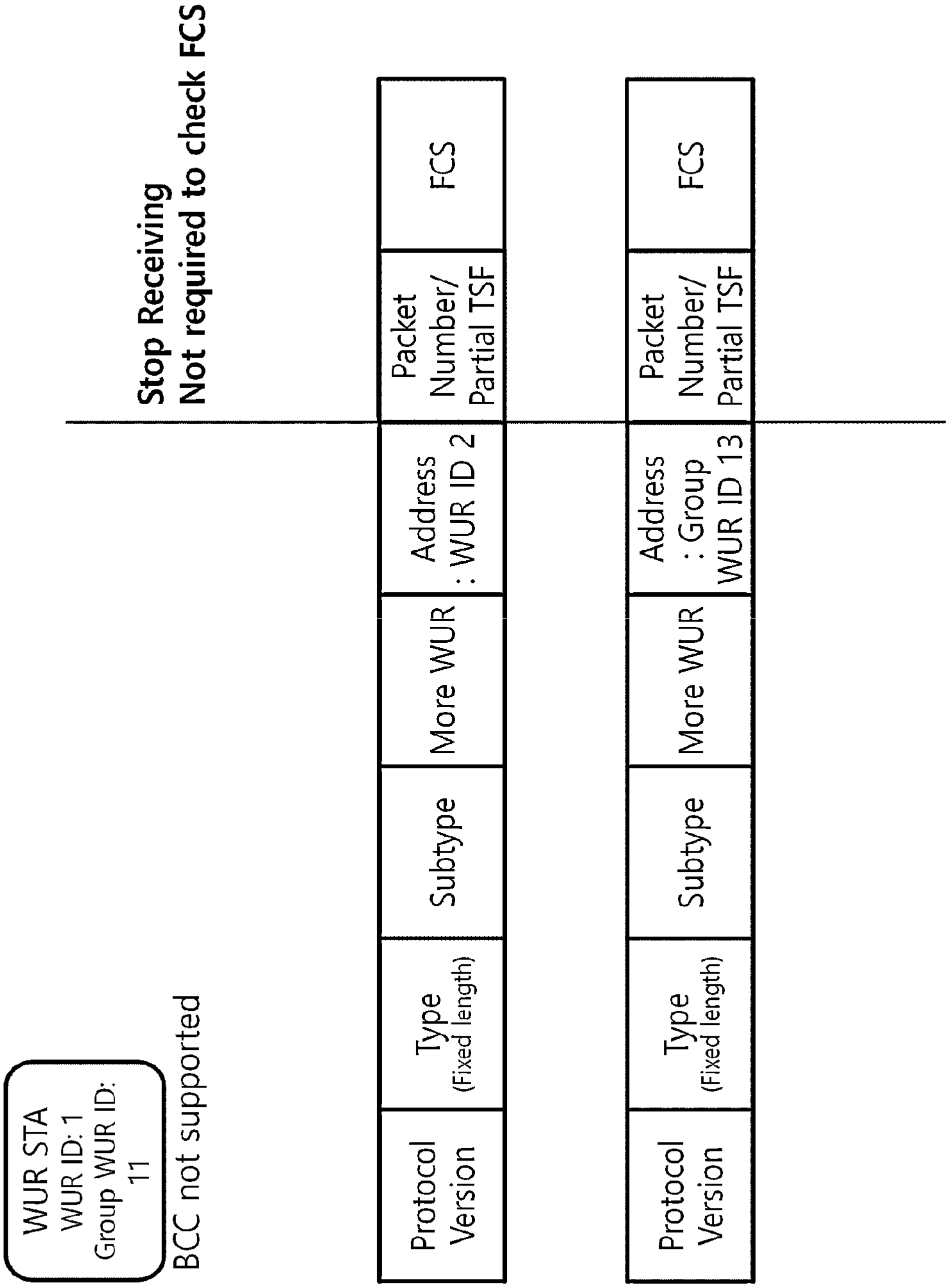
FIG. 25 shows a method of receiving a WUR frame according to whether a wireless communication terminal is an intended recipient of the WUR frame when the format of the WUR frame received by the wireless communication terminal according to an embodiment of the present invention has a fixed length.

FIG. 25 shows a method of receiving a WUR frame according to whether a wireless communication terminal is an intended recipient of the WUR frame when the format of the WUR frame received by the wireless communication terminal according to an embodiment of the present invention has a fixed length.

When the wireless communication terminal receives the WUR frame in the fixed length WUR frame format, and the Address field of the MAC header of the WUR frame does not indicate the wireless communication terminal, the wireless communication terminal may stop receiving the WUR frame. When it is determined that the wireless communication terminal receives the WUR frame in the fixed length WUR frame format, and the Address field of the MAC header of the WUR frame does not indicate the wireless communication terminal, the wireless communication terminal may stop receiving the WUR frame. Based on whether the WUR ID indicated by the Address field of the MAC header of the WUR frame is not the WUR ID of the wireless communication terminal, it may be determined whether the Address field of the MAC header of the WUR frame does not indicate the wireless communication terminal. Based on whether the group WUR ID indicated by the Address field of the MAC header of the WUR frame indicates a group including a wireless communication terminal, it may be determined whether the Address field of the MAC header of the WUR frame does not indicate the wireless communication terminal. Specifically, if the WUR ID indicated by the Address field of the MAC header of the WUR frame is not the WUR ID of the wireless communication terminal, and the group WUR ID indicated by the Address field of the MAC header of the WUR frame does not indicate the group including the wireless communication terminal, it can be determined that the Address field of the MAC header of the WUR frame does not indicate the wireless communication terminal.

In the embodiment of FIG. 25, the WUR ID of the station WUR STA is 1. In addition, the group WUR ID of the group including the station WUR STA is 11. When the station WUR STA checks that the Address field indicates that the value of the WUR ID is 2, the station stops receiving the WUR frame. In addition, when the station WUR STA checks that the Address field indicates that the value of the group WUR ID is 11, the station stops receiving the WUR frame.

Figure 26:
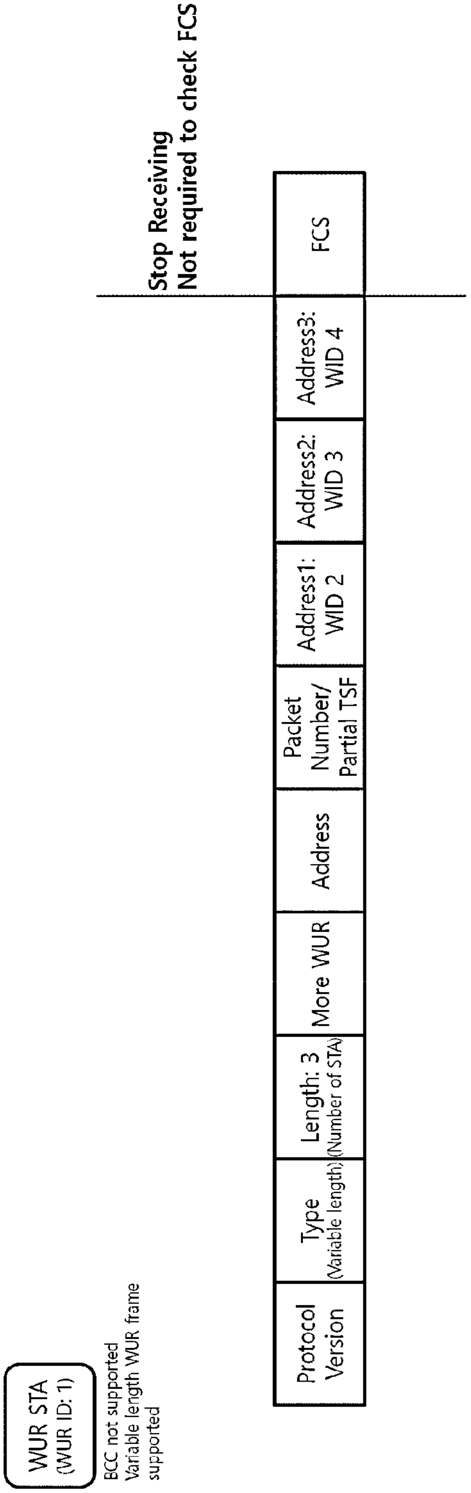
FIG. 26 shows a method of receiving a WUR frame according to whether the wireless communication terminal is an intended recipient of the WUR frame when the format of the WUR frame of the WUR frame received by the wireless communication terminal according to an embodiment of the present invention has a variable length.

FIG. 26 shows a method of receiving a WUR frame according to whether the wireless communication terminal is an intended recipient of the WUR frame when the format of the WUR frame of the WUR frame received by the wireless communication terminal according to an embodiment of the present invention has a variable length.

When the wireless communication terminal supports the reception of a variable length WUR frame format, and the WUR frame received by the wireless communication terminal corresponds to the variable length WUR frame format, even if the Address field of the WUR frame does not indicate the WUR ID of the wireless communication terminal or the group WUR ID of the group containing the wireless communication terminal, the wireless communication terminal may have to continue receiving the WUR frame. Specifically, the wireless communication terminal may check whether the value indicated in the Length field indicates the WUR ID of the wireless communication terminal or the group WUR ID of the group including the wireless communication terminal. If there is no subfield indicating the WUR ID of the wireless communication terminal or the group WUR ID of the group including the wireless communication terminal, the wireless communication terminal may stop receiving the WUR frame. In this case, the wireless communication terminal may not check the validity of the WUR frame through the FCS value. In addition, the wireless communication terminal may determine whether the WUR frame received by the wireless communication terminal corresponds to a variable-length WUR frame format based on the WUR frame Type field.

In the embodiment of FIG. 26, the WUR ID of the station WUR STA is 1. The WUR frame format of the WUR frame received by the station WUR STA has a variable length. In addition, the Length field of the WUR frame indicates that three subfields indicating WUR ID are included in the Frame Body field of the WUR frame. In this case, when it is determined that all three subfields indicating the WUR ID of the Address field and the Frame Body field do not indicate the WUR ID of the station WUR STA, the station WUR STA stops receiving the WUR frame.

Figure 27:
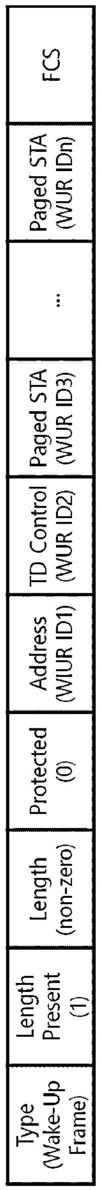
FIG. 27 shows a variable-length WUR frame format according to another embodiment of the present invention.

FIG. 27 shows a variable-length WUR frame format according to another embodiment of the present invention.

In the variable length WUR frame format, the Frame Body field may include a WUR ID or a group WUR ID. When the base wireless communication terminal transmits a WUR frame corresponding to a variable length WUR frame format, the base wireless communication terminal may insert a WUR ID of one of a plurality of wireless communication terminals to receive the WUR frame in the Address field, and insert a WUR ID that identifies each of the remaining wireless communication terminals in the Frame Body field. In this case, the field indicating the WUR ID of the wireless communication terminal in the Frame Body field may be referred to as a Paged STA field. The Frame Body field may include one or more Paged STA fields according to the length indicated by the Length field. The Paged STA field may include information on the WUR ID of the wireless communication terminal corresponding to the Paged STA field and additional control information.

The first subfield of the Frame Body field may be a field indicating control information applied to all intended recipients of the WUR frame. In this case, the corresponding sub-field may be referred to as a TD Control field. In another specific embodiment, the TD Control field may indicate another WUR ID.

When a plurality of Paged STA fields are included in the Frame Body field, the base wireless communication terminal may insert a plurality of WUR IDs from a small value WUR ID to a large value WUR ID in the order of the Address field, the first Paged STA field, and the Paged STA field thereafter. In this case, when the wireless communication terminal receives a WUR frame corresponding to the variable length WUR frame format, in the state where the Paged STA field indicating the WUR ID of the wireless communication terminal is not detected in the Address field and the Frame Body field of the WUR frame, the Address field or the Paged STA field indicating the WUR ID having a value greater than the WUR ID of the wireless communication terminal may be received. In this case, the wireless communication terminal may stop receiving the WUR frame. In another specific embodiment, the base wireless communication terminal may insert a plurality of WUR IDs from a large value WUR ID to a small value WUR ID in the order of Address field, first Paged STA field, and Paged STA field thereafter. In the state where the Paged STA field indicating the WUR ID of the wireless communication terminal is not detected in the Frame Body field, an Address field or a Paged STA field indicating a WUR ID having a value smaller than the WUR ID of the wireless communication terminal may be received. In this case, the wireless communication terminal may stop receiving the WUR frame.

In addition, the base wireless communication terminal may insert the WUR ID of the wireless communication terminal that does not require additional control information into the Address field. The base wireless communication terminal inserts a plurality of WUR IDs from the small-value WUR ID to the large-value WUR ID in order, except for the WUR ID inserted in the Address field, into fields from the first Paged STA field in the Frame Body field to the subsequent Paged STA fields. In this case, when the wireless communication terminal receives a WUR frame corresponding to the variable length WUR frame format, in the state where the Address field of the WUR frame does not indicate the WUR ID of the wireless communication terminal and the wireless communication terminal does not detect the Paged STA field indicating the WUR ID of the wireless communication terminal in the Frame Body field of the WUR frame, a Paged STA field indicating a WUR ID having a value greater than the WUR ID of the wireless communication terminal may be received. In this case, the wireless communication terminal may stop receiving the WUR frame. In another specific embodiment, the base wireless communication terminal may insert a plurality of WUR IDs, except for the WUR ID inserted in the Address field, in order from a WUR ID which value is large to a WUR ID which value is small, into fields from the first Paged STA field in the Frame Body field to the Paged STA field thereafter. In this case, when the wireless communication terminal receives a WUR frame corresponding to the variable length WUR frame format, in the state where the Address field of the WUR frame does not indicate the WUR ID of the wireless communication terminal and the wireless communication terminal does not detect the Paged STA field indicating the WUR ID of the wireless communication terminal in the Frame Body field of the WUR frame, the wireless communication terminal may receive a Paged STA field indicating a WUR ID having a value smaller than the WUR ID of the wireless communication terminal. In this case, the wireless communication terminal may stop receiving the WUR frame.

It has been described with reference to FIG. 9 that a TXID or a group WUR ID may be configured as the value of the Address field of the WUR frame. Furthermore, it has been described that the WUR frame may be transmitted in a variable length WUR frame format. The WUR frame reception operation related to this will be described with reference to FIGS. 28 to 29.

Figure 28:
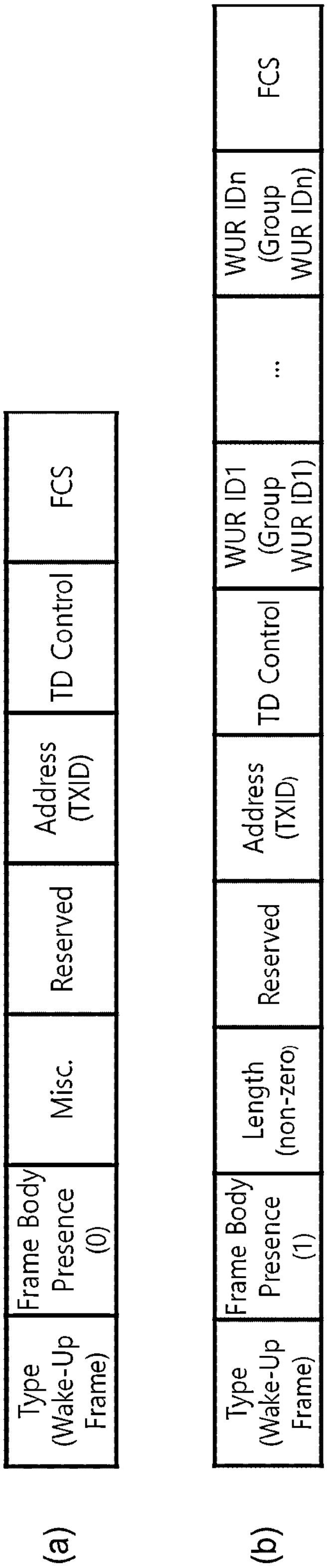
FIG. 28 shows a WUR frame format when TXID is used according to an embodiment of the present invention.

FIG. 28 shows a WUR frame format when TXID is used according to an embodiment of the present invention.

When the Address field of the WUR frame indicates TXID, the wireless communication terminal may perform different WUR frame processing according to the format of the WUR frame. Specifically, when the Address field of the WUR frame indicates TXID, the wireless communication terminal may perform different WUR frame processing according to whether the WUR frame corresponds to a variable length WUR frame format. In this case, the wireless communication terminal may determine whether the WUR frame corresponds to a variable-length WUR frame format based on a value of a field indicating whether there is a Frame Body field of the WUR frame. A field indicating whether there is a frame body field may be referred to as a frame body present field. Specifically, when the Address field of the WUR frame indicates TXID and the WUR frame corresponds to a fixed-length WUR frame format, the wireless communication terminal may determine that the corresponding WUR frame is a broadcast wake-up frame that triggers wake-up of all wireless communication terminals in the PCR doze state in the BSS corresponding to the TXID. FIG. 28(*a*) shows a specific example of a wake-up frame that triggers a wake-up of all wireless communication terminals in a PCR doze state in the BSS corresponding to the TXID.

In addition, when the Address field of the WUR frame indicates TXID and the WUR frame corresponds to a variable-length WUR frame format, the wireless communication terminal may determine that the corresponding WUR frame is a wake-up frame that triggers wake-up of a plurality of wireless communication terminals in the PCR doze state in the BSS. FIG. 28(*b*) shows a specific example of a wake-up frame triggering wake-up of a plurality of wireless communication terminals indicated by the Frame Body field while the Address field indicates TXID.

It may be defined that the WUR ID of the individual wireless communication terminal is not configured in the Address field of the WUR frame corresponding to the variable length WUR frame format. In this case, when the WUR frame corresponds to a variable length WUR frame format and the Address field of the WUR frame does not indicate the TXID of the BSS to which the wireless communication terminal belongs, the wireless communication terminal may stop receiving the corresponding WUR frame. In a specific embodiment, the wireless communication terminal may stop receiving the WUR frame and restart CCA for the WUR signal. In this case, the wireless communication terminal may transmit the PHY layer PHY.CCARESET.request in the MAC layer. In this case, PHY.CCARESET.request stops receiving the radio signal from the WUR receiver and requests that the WUR receiver restart the CCA. This is because it is certain that it is not a wake-up frame transmitted by the base wireless communication terminal connected to the wireless communication terminal. When the WUR frame corresponds to a variable length WUR frame format and the Address field of the WUR frame indicates the TXID of the BSS to which the wireless communication terminal belongs, the wireless communication terminal can check whether the WUR frame is transmitted without error and whether the WUR frame represents a WUR ID or a group WUR ID that identifies the wireless communication terminal. In this case, the wireless communication terminal may determine whether the WUR frame is transmitted without error by generating an FCS value of the WUR frame or using a MIC.

In addition, when a plurality of WUR IDs are included in the Frame Body field, the base wireless communication terminal may sequentially insert a plurality of WUR IDs from a WUR ID which value is small to a WUR ID which value is large in order into the subfields from the front subfield to the next subfield of the Frame Body field. In this case, when the wireless communication terminal receives a WUR frame corresponding to the variable length WUR frame format, in the state where the wireless communication terminal does not detect the subfield indicating the WUR ID of the wireless communication terminal in the Frame Body field of the WUR frame, if a subfield indicating a WUR ID having a value greater than the WUR ID of the wireless communication terminal is received, the wireless communication terminal may stop receiving the WUR frame. In a specific embodiment, the wireless communication terminal may stop receiving the WUR frame and restart CCA for the WUR signal. In this case, the wireless communication terminal may transmit the PHY layer PHY.CCARESET.request in the MAC layer. In this case, PHY.CCARESET.request may stop receiving the radio signal from the WUR receiver and request that the WUR receiver restart the CCA.

In addition, when the WUR ID and the group WUR ID may be included together in the Frame Body field, the base wireless communication terminal may allocate the value of the group WUR ID to a value smaller than the WUR ID. This is because the group WUR ID identifies a plurality of wireless communication terminals.

In another specific embodiment, the base wireless communication terminal may sequentially insert a plurality of WUR IDs from a WUR ID which value is large to a WUR ID which value is small in order in to subfields from the front subfield of the Frame Body field to the subsequent subfields. In this case, when the wireless communication terminal receives a WUR frame corresponding to the variable length WUR frame format, in the state where the wireless communication terminal does not detect the subfield indicating the WUR ID of the wireless communication terminal in the Frame Body field of the WUR frame, if a subfield indicating a WUR ID having a value smaller than the WUR ID of the wireless communication terminal is received, the wireless communication terminal may stop receiving the WUR frame. In addition, when the WUR ID and the group WUR ID may be included together in the Frame Body field, the base wireless communication terminal may allocate the value of the group WUR ID to a value larger than the WUR ID.

Through these operations, the wireless communication terminal can prevent unnecessary receiving and decoding of a WUR frame having a separate length, which takes a relatively long time to receive than a WUR frame corresponding to a fixed-length WUR frame format.

Figure 29:
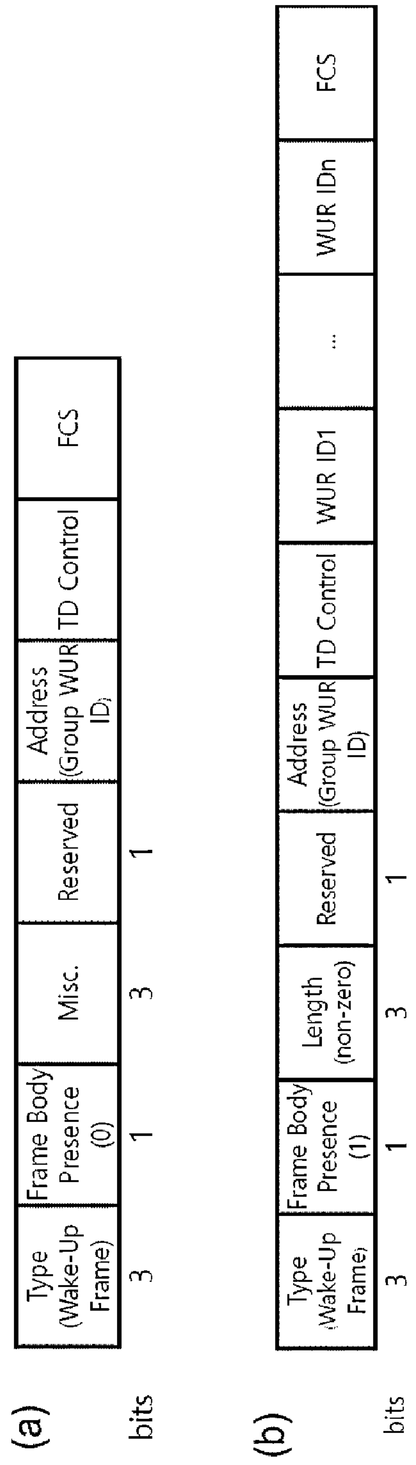
FIG. 29 shows a WUR frame format when a group WUR ID is used according to an embodiment of the present invention.

FIG. 29 shows a WUR frame format when a group WUR ID is used according to an embodiment of the present invention.

When the Address field of the WUR frame indicates the group WUR ID, the wireless communication terminal may perform different WUR frame processing according to the format of the WUR frame. Specifically, when the Address field of the WUR frame indicates group WUR ID, the wireless communication terminal may perform different WUR frame processing according to whether the WUR frame corresponds to a variable length WUR frame format. In this case, the wireless communication terminal may determine whether the WUR frame corresponds to a variable-length WUR frame format based on a value of a field indicating whether there is a Frame Body field of the WUR frame. A field indicating whether there is a frame body field may be referred to as a frame body present field. Specifically, when the Address field of the WUR frame indicates a group WUR ID and the WUR frame corresponds to a fixed-length WUR frame format, the wireless communication terminal may determine that the corresponding WUR frame corresponds to the group WUR ID and is a groupcast wake-up frame that triggers wake-up of all wireless communication terminals in the PCR doze state. FIG. 29(*a*) shows a specific example of a groupcast wake-up frame corresponding to the group WUR ID and triggering wake-up of all wireless communication terminals in the PCR doze state.

When the group WUR ID is configured in the Address field of the WUR frame corresponding to the variable length WUR frame format, the frame body field of the corresponding WUR frame may be limited to include only the WUR ID of the wireless communication terminal identified by the corresponding group WUR ID. FIG. 29(*b*) shows a specific example of a wake-up frame corresponding to a variable length wake-up frame while the Address field indicates a group WUR ID. Therefore, when the base wireless communication terminal configures the group WUR ID in the Address field of the WUR frame corresponding to the variable length WUR frame format, the base wireless communication terminal can insert only the WUR ID of the wireless communication terminal identified by the corresponding group WUR ID in the Frame Body field of the corresponding WUR frame. In this case, if the WUR frame corresponds to a variable length WUR frame format and the Address field of the WUR frame does not indicate the group WUR ID of the group to which the wireless communication terminal belongs, the wireless communication terminal may stop receiving the corresponding WUR frame. In a specific embodiment, the wireless communication terminal may stop receiving the WUR frame and restart CCA for the WUR signal. In this case, the wireless communication terminal may transmit the PHY layer PHY.CCARESET.request in the MAC layer. In this case, PHY.CCARESET.request may stop receiving the radio signal from the WUR receiver and request that the WUR receiver restart the CCA. This is because it is certain that it is not a wake-up frame transmitted to the wireless communication terminal. When the WUR frame corresponds to a variable length WUR frame format and the Address field of the WUR frame indicates the group WUR ID of the group to which the wireless communication terminal belongs, the wireless communication terminal can check whether the WUR frame is transmitted without error and whether the WUR frame represents a WUR ID that identifies the wireless communication terminal. In this case, the wireless communication terminal may determine whether the WUR frame is transmitted without error by generating an FCS value of the WUR frame or using a MIC.

Through these operations, the wireless communication terminal can prevent unnecessary receiving of a WUR frame having a separate length, which takes a relatively long time to receive than a WUR frame corresponding to a fixed-length WUR frame format and decoding of the corresponding WUR frame.

Figure 30:
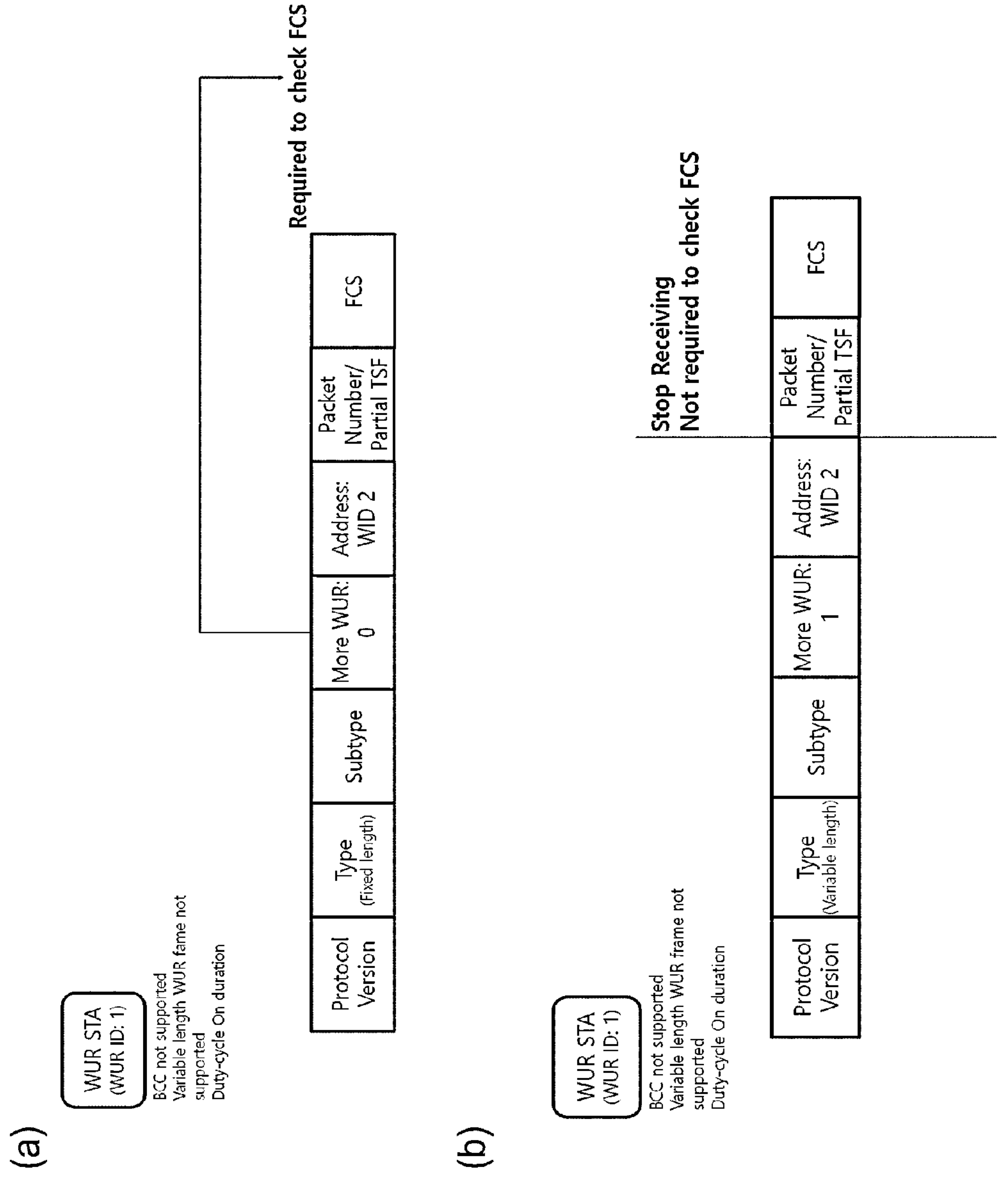
FIG. 30 shows a method for a wireless communication terminal to receive a WUR frame according to a value of a More WUR field according to an embodiment of the present invention.

FIG. 30 shows a method for a wireless communication terminal to receive a WUR frame according to a value of a More WUR field according to an embodiment of the present invention.

As described with reference to FIG. 21, when the wireless communication terminal performing the WUR duty-cycle operation receives the WUR frame in which the More WUR field is disabled, the wireless communication terminal may stop operation in the corresponding on duration. Specifically, when the wireless communication terminal performing the WUR duty-cycle operation receives the WUR frame in which the More WUR field is disabled, the wireless communication terminal may stop the on duration operation before the corresponding on duration is ended. For this operation, the wireless communication terminal needs to determine whether the value of the More WUR field decoded by the wireless communication terminal is valid. Therefore, even if it is clear that the wireless communication terminal is not the intended recipient of the WUR frame received by the wireless communication terminal, when the More WUR field of the corresponding WUR frame is disabled, if it is determined that the wireless communication terminal is not the intended recipient of the WUR frame received, the wireless communication terminal may not be allowed to stop receiving the WUR frame. In this case, the wireless communication terminal may receive the WUR frame to the end and determine the validity of the WUR frame through the FCS value.

In the embodiment of FIG. 30(*a*), the station WUR STA is performing a WUR duty-cycle operation. In addition, the WUR ID of the station WUR STA is 1. When the station WUR STA receives the WUR frame, the station WUR STA is performing an on duration operation. In this case, the value of the More WUR field of the WUR frame is 0, indicating that the More WUR field is disabled. The station WUR STA receives the WUR frame to the end even when the Address field of the WUR frame indicates 2 different from the WUR ID of the station WUR STA. In addition, the station WUR STA generates an FCS value based on the field value of the WUR frame. The station WUR STA verifies the validity of the WUR frame by comparing the generated FCS value with the value of the FCS field.

However, when the More WUR field of the WUR frame received by the wireless communication terminal is activated, and it is clear that the wireless communication terminal is not the intended recipient of the corresponding WUR frame, the wireless communication terminal may stop receiving the WUR frame. This is because the wireless communication terminal does not need to determine whether the value of the More WUR field is valid.

In the embodiment of FIG. 30(*b*), the station WUR STA is performing a WUR duty-cycle operation. In addition, the WUR ID of the station WUR STA is 1. When the station WUR STA receives the WUR frame, the station WUR STA is performing an on duration operation. In this case, the value of the More WUR field of the WUR frame is 1, indicating that the More WUR field is activated. The station WUR STA indicates that the Address field of the WUR frame is different from the WUR ID of the station WUR STA. Since the station WUR STA does not need to determine whether the value of the More WUR field is valid, when the station WUR STA determines that it is clear that the Address field does not indicate the station WUR STA, the station WUR STA stops receiving the WUR frame.

Figure 31:
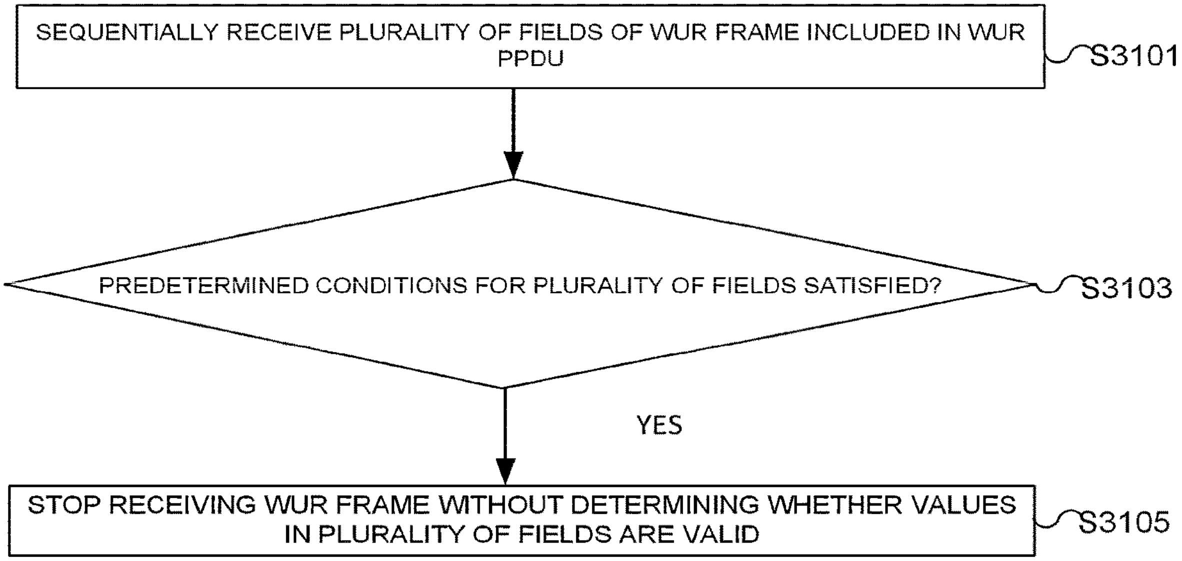
FIG. 31 is a flowchart illustrating an operation in which a wireless communication terminal receives a WUR frame according to an embodiment of the present invention.

FIG. 31 is a flowchart illustrating an operation in which a wireless communication terminal receives a WUR frame according to an embodiment of the present invention.

The wireless communication terminal may sequentially receive a plurality of fields of the WUR frame included in the WUR PPDU (S3101). As described above, when encoding that changes the order of data included in the WUR frame, such as BCC coding, is not applied, the wireless communication terminal may sequentially receive a plurality of fields of the WUR frame. When BCC coding is not applied to the WUR frame, it may be a case where the wireless communication terminal does not support the reception of the BCC coded WUR frame. In addition, when BCC coding is not applied to the WUR frame, it may be a case where BCC coding is determined not to be used in the process of configuring parameters related to WUR operation of the wireless communication terminal and the base wireless communication terminal.

When the wireless communication terminal determines that a plurality of fields satisfy a predetermined condition, the wireless communication terminal may stop receiving the WUR frame without determining whether the values of the plurality of fields are valid (S3103). The predetermined condition may include a case where the wireless communication terminal is not an intended recipient of the WUR frame. The wireless communication terminal may determine whether the wireless communication terminal is not an intended recipient of the WUR frame based on whether the WUR frame does not indicate the identifier of the wireless communication terminal as a recipient of the WUR frame. In addition, the wireless communication terminal may determine whether the wireless communication terminal is not an intended recipient of the WUR frame based on whether the WUR frame does not indicate an identifier of a group including the wireless communication terminal as a recipient of the WUR frame. Specifically, when the WUR frame does not indicate the identifier of the wireless communication terminal as a recipient of the WUR frame, and the WUR frame does not indicate the identifier of the group including the wireless communication terminal as a recipient of the WUR frame, the wireless communication terminal may determine that the wireless communication terminal is not the intended recipient of the WUR frame. In a specific embodiment, the plurality of fields of the WUR frame may include a plurality of fields indicating a wireless communication terminal to receive the WUR frame. For convenience of description, each of a plurality of fields indicating a wireless communication terminal to receive the WUR frame is referred to as a reception terminal field. In this case, the plurality of reception terminal fields may be arranged in the WUR frame based on the size order of the identifier indicated by the reception terminal field. The wireless communication terminal may compare the decoded reception terminal field value with the WUR ID value of the wireless communication terminal. The wireless communication terminal may determine that the WUR wireless communication terminal is not the intended recipient of the WUR frame based on the comparison result. The specific operation of the wireless communication terminal may be the same as that in the embodiments described with reference to FIGS. 25 to 29.

When it is necessary to determine whether any one of the plurality of fields is valid even if the wireless communication terminal is not the intended recipient of the WUR frame, the wireless communication terminal may not stop receiving the WUR frame. Specifically, when the More WUR field of the WUR frame received by the wireless communication terminal operating in the WUR duty-cycle mode is disabled, the wireless communication terminal may receive all fields included in the WUR frame even when the intended recipient of the corresponding WUR frame is not a wireless communication terminal.

The predetermined condition may include a case where the wireless communication terminal does not support the reception of the WUR frame. When the WUR frame has a length not supported by the wireless communication terminal, the wireless communication terminal may determine that the wireless communication terminal does not support the reception of the WUR frame. When the WUR frame has a length not supported by the wireless communication terminal, the wireless communication terminal may determine that the wireless communication terminal does not support the reception of the WUR frame. When the WUR frame is a type not supported by the wireless communication terminal, the wireless communication terminal may determine that the wireless communication terminal does not support the reception of the WUR frame. When the WUR frame indicates a protocol not supported by the wireless communication terminal, the wireless communication terminal may determine that the wireless communication terminal does not support the reception of the WUR frame. The specific operation of the wireless communication terminal may be the same as that in the embodiments described with reference to FIGS. 22 to 24.

The wireless communication terminal may stop receiving the WUR frame by transmitting a command to stop receiving the modulated wireless signal according to the second modulation method from the MAC layer to the physical layer. In a specific embodiment, the wireless communication terminal may stop receiving the WUR frame and restart CCA for the WUR signal. In this case, the wireless communication terminal may transmit the PHY.CCARESET.request from the MAC layer of the WUR receiver to the physical layer. In this case, PHY.CCARESET.request stops receiving the radio signal from the WUR receiver and requests that the WUR receiver restart the CCA. In addition, the wireless communication terminal may not determine the validity of the WUR frame through the FCS value.

When the wireless communication terminal determines that predetermined conditions for a plurality of fields are satisfied, the wireless communication terminal may stop receiving the WUR frame without determining whether the values of the plurality of fields of the WUR frame are valid through the FCS values generated based on the values of the plurality of fields. In addition, when the wireless communication terminal determines that predetermined conditions for a plurality of fields are satisfied, the wireless communication terminal may stop receiving the WUR frame without determining whether values of a plurality of fields of the WUR frame are valid through the MIC.

The above-mentioned description of the present disclosure is for illustrative purposes only, and it will be understood that those of ordinary skill in the art to which the present disclosure belongs may make changes to the present disclosure without altering the technical ideas or essential characteristics of the present disclosure and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present disclosure is defined by the appended claims rather than the above detailed description, and all changes or modifications derived from the meaning and range of the appended claims and equivalents thereof are to be interpreted as being included within the scope of present disclosure.

The invention claimed is:

1. A wireless communication terminal to communicate wirelessly, the wireless communication terminal comprising:

a first wireless transceiver configured to transmit and receive signals modulated by a first modulation method;

a second wireless receiver configured to receive a signal modulated by a second modulation method which is different from the first modulation method; and a processor, wherein the processor is configured to:

sequentially receive a plurality of fields of a wake-up radio (WUR) frame included in a WUR physical layer protocol data unit (PPDU) transmitted by the second modulation method, and when one or more predetermined conditions for the plurality of fields are satisfied, stop receiving the WUR frame without determining whether values of the plurality of fields are valid, wherein the one or more predetermined conditions comprise a case where the wireless communication terminal is not an intended recipient of the WUR frame, and wherein the plurality of fields comprises a plurality of reception terminal fields which are arranged in the WUR frame according to an increasing order of a value of an identifier of the wireless communication terminal indicated by each of the plurality of reception terminal fields, and wherein the wireless communication terminal determines that the wireless communication terminal is not the intended recipient of the WUR frame when the wireless communication terminal finds a reception terminal field which has a value greater than a value of an identifier of the wireless communication terminal before obtaining a reception terminal field corresponding to the wireless communication terminal.

2. The wireless communication terminal of claim 1, wherein the processor is configured to determine whether the wireless communication terminal is not the intended recipient of the WUR frame based on whether the WUR frame does not indicate an identifier of a group including the wireless communication terminal as the recipient of the WUR frame.

3. The wireless communication terminal of claim 1, wherein when it is necessary to determine whether any one of the plurality of fields is valid even if the wireless communication terminal is not the intended recipient of the WUR frame, the processor is configured not to stop receiving the WUR frame.

4. The wireless communication terminal of claim 1, wherein the one or more predetermined conditions comprise a case where the wireless communication terminal does not support a reception of the WUR frame.

5. The wireless communication terminal of claim 4, wherein when the WUR frame has a length not supported by the wireless communication terminal, the processor is configured to determine that the wireless communication terminal does not support a reception of the WUR frame.

6. The wireless communication terminal of claim 4, wherein when the WUR frame is a type not supported by the wireless communication terminal, the processor is configured to determine that the wireless communication terminal does not support a reception of the WUR frame.

7. The wireless communication terminal of claim 4, wherein when the WUR frame indicates a protocol not supported by the wireless communication terminal, the processor is configured to determine that the wireless communication terminal does not support a reception of the WUR frame.

8. The wireless communication terminal of claim 1, wherein when the one or more predetermined conditions for the plurality of fields are satisfied, the processor is configured to stop receiving the WUR frame without determining whether values of the plurality of fields of the WUR frame are valid through a frame check sequence (FCS) value generated based on the values of the plurality of fields.

9. The wireless communication terminal of claim 1, wherein the processor is configured to stop receiving a radio signal modulated according to the second modulation method, and stops receiving the WUR frame by transmitting a command for requesting to restart clear channel assessment (CCA) from a medium access control (MAC) layer to a physical layer.

10. A method of operating a wireless communication terminal for wirelessly transmitting and receiving a signal modulated by a first modulation method, and receiving a signal modulated by a second modulation method which is different from the first modulation method, the method comprising:

sequentially receiving a plurality of fields of a wake-up radio (WUR) frame included in a WUR physical layer protocol data unit (PPDU) transmitted by the second modulation method, and when one or more predetermined conditions for the plurality of fields are satisfied, stopping receiving the WUR frame without determining whether values of the plurality of fields are valid, wherein the one or more predetermined conditions comprise a case where the wireless communication terminal is not an intended recipient of the WUR frame, and wherein the plurality of fields comprises a plurality of reception terminal fields which are arranged in the WUR frame according to an increasing order of a value of an identifier of the wireless communication terminal indicated by each of the plurality of reception terminal fields, and wherein the wireless communication terminal determines that the wireless communication terminal is not the intended recipient of the WUR frame when the wireless communication terminal finds a reception terminal field which has a value greater than a value of an identifier of the wireless communication terminal before obtaining a reception terminal field corresponding to the wireless communication terminal.

11. The method of claim 10, wherein the stopping the receiving the WUR frame comprises determining whether the wireless communication terminal is not the intended recipient of the WUR frame based on whether the WUR frame does not indicate an identifier of a group including the wireless communication terminal as the recipient of the WUR frame.

12. The method of claim 10, wherein the stopping the receiving the WUR frame comprises not stopping receiving the WUR frame when it is necessary to determine whether any one of the plurality of fields is valid even if the wireless communication terminal is not the intended recipient of the WUR frame.

13. The method of claim 10, wherein the one or more predetermined conditions comprise a case where the wireless communication terminal does not support a reception of the WUR frame.

* * * * *